US012732847B2

(12) United States Patent
Hu

(10) Patent No.: US 12,732,847 B2
(45) Date of Patent: Sep. 8, 2026

(54) QUALITY OF EXPERIENCE MEASUREMENT METHOD AND COMMUNICATION APPARATUS

(71) Applicant: HUAWEI TECHNOLOGIES CO., LTD., Shenzhen (CN)

(72) Inventor: Xingxing Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 18/363,678

(22) Filed: Aug. 1, 2023

(65) Prior Publication Data

US 2023/0379743 A1 Nov. 23, 2023

Related U.S. Application Data

(63) Continuation of application No. PCT/CN2021/076572, filed on Feb. 10, 2021.

(51) Int. Cl.

*H04W 24/10* (2009.01)
*H04W 24/04* (2009.01)
*H04W 48/02* (2009.01)
*H04W 88/06* (2009.01)

(52) U.S. Cl.

CPC ........... *H04W 24/10* (2013.01); *H04W 24/04* (2013.01); *H04W 48/02* (2013.01); *H04W 88/06* (2013.01)

(58) Field of Classification Search

None
See application file for complete search history.

(56) References Cited

U.S. PATENT DOCUMENTS

2022/0046503 A1* 2/2022 Kumar .................. H04W 28/24
2022/0417780 A1* 12/2022 Liu ....................... H04W 24/10
2023/0247504 A1* 8/2023 Haustein .............. H04W 76/19 455/436

(Continued)

FOREIGN PATENT DOCUMENTS

CN 112352448 A 2/2021
EP 4221284 A1 8/2023

(Continued)

OTHER PUBLICATIONS

Author Unknown, Summary document on AI 8.14 NR QoE SI, Doc. No. R2-2102243, pp. 1-13, Feb. 5 (Year: 2021).*

(Continued)

*Primary Examiner* — Christopher M Crutchfield

(57) ABSTRACT

This application provides a quality of experience measurement method and apparatus. A terminal device reports, to a network side, quality of experience measurement configuration related information corresponding to a first user identity or a second user identity that has been configured or negotiated in advance, or specifies that application layer measurement corresponding to different user identities are independent of each other in an upper layer of an access stratum of the terminal device, or when application layer measurement corresponding to the first user identity is interrupted or terminated due to impact of a service corresponding to the second user identity, the terminal device reports the interruption or termination to the network side.

14 Claims, 12 Drawing Sheets

(56) References Cited

U.S. PATENT DOCUMENTS

| | | | | |
|---|---|---|---|---|
| 2023/0262811 | A1* | 8/2023 | Li | H04W 8/22 370/329 |
| 2024/0031832 | A1* | 1/2024 | Parichehrehteroujeni | H04W 24/08 |
| 2024/0098532 | A1* | 3/2024 | Rune | H04W 24/08 |

FOREIGN PATENT DOCUMENTS

| | | | |
|---|---|---|---|
| WO | PCT/CN2021/071872 | * | 1/2020 |
| WO | PCT/CN2020/076905 | * | 2/2020 |
| WO | 2020164082 | A1 | 8/2020 |
| WO | PCT/EP2021/078705 | * | 8/2021 |

OTHER PUBLICATIONS

Author Unknown, Solution for QoE Management, Doc. No. R R2-2101271, pp. 1-3, Feb. 5 (Year: 2021).*
Author Unknown, Discussion on QoE measurement configuration and reporting, Doc. No. R2-2101189, pp. 1-9, Feb. 5 (Year: 2021).*
Author Unknown, QoE measurements in NR, Doc. No. R2-2100995, pp. 1-3, Feb. 5 (Year: 2021).*
Author Unknown, Discussion on QoE configuration and reporting, Doc. No. R2-2100706, pp. 1-3, Feb. 5 (Year: 2021).*
Qualcomm Inc., QoE metrics correlation with radio, R3-206173, Nov. 2-12, 2020, total 2 pages.
3GPP TS 36.413 V16.4.0 (Jan. 2021), 3rd Generation Partnership Project; Technical Specification Group Radio Access Network; Evolved Universal Terrestrial Radio Access Network (E-UTRAN); S1 Application Protocol (S1AP) (Release 16), total 423 pages.
3GPP TR 22.834 V17.2.0 (Feb. 2019), 3rd Generation Partnership Project; Technical Specification Group Services and System Aspects; Study on Support for Multi-USIM Devices (Release 17), total 17 pages.
3GPP TS 26.247 V16.4.1 (Oct. 2020), 3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16), total 140 pages.
3GPP TS 26.114 V16.8.2 (Jan. 2021), 3rd Generation Partnership Project; Technical Specification Group Services and System Aspects; IP Multimedia Subsystem (IMS); Multimedia Telephony; Media handling and interaction (Release 16), total 445 pages.

* cited by examiner

QUALITY OF EXPERIENCE MEASUREMENT METHOD AND COMMUNICATION APPARATUS

CROSS-REFERENCE TO RELATED APPLICATIONS

This application is a continuation of International Application No. PCT/CN2021/076572, filed on Feb. 10, 2021, the disclosure of which is hereby incorporated by reference in its entirety.

TECHNICAL FIELD

This application relates to the communication field, and specifically, to a quality of experience measurement method and a communication apparatus.

BACKGROUND

To better optimize a network and improve quality of experience, an operator may perform quality of experience (QoE) measurement collection. The QoE may also be referred to as user experience or user quality of experience. The QoE measurement collection is also referred to as application layer measurement collection. A core network (CN) or an operation, administration, and maintenance (OAM) entity or device may send QoE measurement configuration information to a base station, and then the base station sends the configuration information to user equipment (UE). The UE performs QoE measurement based on the configuration information to obtain measurement results, and sends the measurement results to the base station.

When the QoE measurement collection is performed on UE that supports a multi-subscriber identity module (MUSIM), because MUSIMs of the UE affect each other, a network side cannot collect accurate QoE measurement results, and even cannot collect the QoE measurement results.

SUMMARY

This application provides a quality of experience measurement method and a communication apparatus, to reduce mutual impact on QoE measurement corresponding to a plurality of user identities of a terminal device.

According to a first aspect, a quality of experience measurement method is provided, including: A terminal device receives first information from a first radio access network device with a first user identity, where the first information includes first related information of application layer measurement corresponding to the first user identity. The terminal device sends second information to a second radio access network device with a second user identity, where the second information indicates second related information of the application layer measurement corresponding to the first user identity or second related information of application layer measurement corresponding to the second user identity.

It should be noted that the application layer measurement mentioned in the first information and the second information may alternatively be represented as an application layer measurement configuration in this application, or may alternatively be represented as application layer measurement configuration information. This is not limited in this application.

According to this solution, a terminal device reports application layer measurement configuration related information corresponding to a first user identity or a second user identity to a network side corresponding to a second user identity. The network side may determine the application layer measurement that can be configured for the second user identity based on the information reported by the terminal device. Mutual impact on application layer measurement corresponding to two user identities can be reduced, thereby avoiding a problem that a network side cannot collect a quality of experience measurement result or the collected quality of experience measurement result is inaccurate.

With reference to a first aspect, in some implementations of the first aspect, the first related information includes an application layer measurement configuration corresponding to the first user identity; and the second related information includes configuring the application layer measurement by the terminal device with the first user identity, or prohibiting the terminal device from configuring the application layer measurement with the second user identity.

With reference to a first aspect, in some implementations of the first aspect, the first related information includes an application layer measurement configuration corresponding to the first user identity and a first service type corresponding to the application layer measurement configuration, the second related information includes configuring, by the terminal device with the first user identity, application layer measurement corresponding to the first service type; or the second related information includes prohibiting the terminal device from configuring, with the second user identity, application layer measurement corresponding to the first service type, or allowing the terminal device to configure, with the second user identity, application layer measurement corresponding to a second service type, where the second service type is a service type other than the first service type.

It should be noted that in this application, "a terminal device configures application layer measurement with a first identity" means that a terminal device performs an application layer measurement configuration for a subscriber identity module corresponding to the first identity. In this application, "QoE measurement has been configured for SIM1" means that a QoE measurement configuration has been performed for SIM1. Similarly, similar expressions mentioned in this application also express corresponding meanings.

With reference to a first aspect, in some implementations of the first aspect, the first related information indicates that the terminal device is prohibited from configuring, with the first user identity, an application layer measurement, the second related information indicates that the terminal device is prohibited from configuring, with the first user identity; application layer measurement, or that the second related information indicates that the terminal device is allowed to configure, with a second user identity, an application layer measurement.

With reference to a first aspect, in some implementations of the first aspect, the first related information includes allowing the terminal device to configure, with the first user identity, application layer measurement corresponding to a first service type; and the second related information includes allowing the terminal device to configure, with the first user identity, application layer measurement corresponding to a first service type; or the second related information includes prohibiting the terminal device from configuring, with the second user identity, application layer measurement corresponding to a first service type, or allowing the terminal device to configure, with the second user identity, application layer measurement corresponding to a second service type, where the second service type is a service type other than the first service type.

With reference to the first aspect, in some implementations of the first aspect, the first related information includes prohibiting the terminal device from configuring, with the first user identity, application layer measurement corresponding to a first service type, the second related information includes prohibiting the terminal device from configuring, with the first user identity, application layer measurement corresponding to the first service type; or the second related information includes allowing the terminal device to configure, with the first user identity, application layer measurement corresponding to the second service type; or allowing the terminal device to configure, with the second user identity, an application layer measurement, where the second service type is a service type other than the first service type.

With reference to a first aspect, in some implementations of the first aspect, the first related information includes an application layer measurement configuration and a first measurement type corresponding to the application layer measurement configuration; and the second related information includes configuring, by the terminal device with the first user identity, application layer measurement corresponding to the first measurement type, or the second related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

According to this solution, a terminal device notifies a network device corresponding to a second user identity of a measurement type of application layer measurement corresponding to a first user identity, which can realize that only signaling-based QoE measurement is allowed to cover management-based QoE measurement.

With reference to a first aspect, in some implementations of the first aspect, the first related information indicates that the terminal device is allowed to configure, with the first user identity, application layer measurement corresponding to the first measurement type; and the second related information includes allowing the terminal device to configure, with the first user identity, application layer measurement corresponding to the first measurement type, or the second related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

With reference to a first aspect, in some implementations of the first aspect, the first related information indicates that the terminal device is prohibited from configuring, with the first user identity, application layer measurement corresponding to the first measurement type; and the second related information includes prohibiting the terminal device from configuring, with the first user identity, application layer measurement corresponding to the first measurement type, or the second related information includes allowing the terminal device to configure, with the second user identity, an application layer measurement; or allowing the terminal device to configure, with the first user identity, application layer measurement corresponding to the second measurement type, where a priority of the second measurement type is higher than that of the first measurement type.

With reference to a first aspect, in some implementations of the first aspect, the first related information includes an application layer measurement configuration, and a first service type and a first measurement type corresponding to the application layer measurement configuration; and the second related information includes configuring, by the terminal device with the first user identity, application layer measurement corresponding to both the first measurement type and the first service type; or the second related information includes prohibiting the terminal device from configuring, with the second user identity, application layer measurement corresponding to both the first measurement type and the first service type, or allowing the terminal device to configure, with the second user identity, application layer measurement corresponding to both a second measurement type and the first service type, where a priority of the second measurement type is higher than that of the first measurement type.

With reference to a first aspect, in some implementations of the first aspect, the first related information indicates that the terminal device is allowed to configure, with the first user identity, application layer measurement corresponding to both the first measurement type and the first service type; and the second related information includes allowing the terminal device to configure, with the first user identity, application layer measurement corresponding to both the first measurement type and the first service type; or the second related information includes prohibiting the terminal device from configuring, with the second user identity, application layer measurement corresponding to both the first measurement type and the first service type, or allowing the terminal device to configure, with the second user identity, application layer measurement corresponding to both a second measurement type and the first service type, where a priority of the second measurement type is higher than that of the first measurement type.

With reference to a first aspect, in some implementations of the first aspect, the first related information indicates that the terminal device is prohibited from configuring, with the first user identity, application layer measurement corresponding to both the first measurement type and the first service type; and the second related information includes prohibiting the terminal device from configuring, with the first user identity, application layer measurement corresponding to both the first measurement type and the first service type; or the second related information includes allowing the terminal device to configure, with the second user identity, an application layer measurement; or allowing the terminal device to configure, with the first user identity, application layer measurement corresponding to both a second measurement type and the first service type, where a priority of the second measurement type is higher than that of the first measurement type.

With reference to a first aspect, in some implementations of the first aspect, the measurement type includes: management-based application layer measurement, signaling-based application layer measurement, and application layer measurement triggered by a radio access network device.

According to a second aspect, a quality of experience measurement method is provided, including: A second radio access network device receives second information from a terminal device, where the second information includes second related information of application layer measurement corresponding to a first user identity or a second user identity. The second radio access network device determines, based on the second information, third related information of the application layer measurement corresponding to the first user identity or the second user identity, where the terminal device connects to the second radio access network device with the second user identity. According to this solution, a network side corresponding to a second user identity determines, based on the information reported by a terminal device, an application layer measurement that can be configured for a second user identity. Mutual impact on application layer measurement corresponding to two user identities can be reduced, thereby avoiding a problem that a network side cannot collect a quality of experience measurement result or the collected quality of experience measurement result is inaccurate.

With reference to a second aspect, in some implementations of the second aspect, the method further includes: The second radio access network device sends third information to a core network device, where the third information indicates fourth related information of the application layer measurement corresponding to the first user identity or the second user identity, and the core network device corresponds to the second user identity.

With reference to a second aspect, in some implementations of the second aspect, the second related information includes configuring application layer measurement by the terminal device, or prohibiting the terminal device from configuring application layer measurement with the second user identity; and the fourth related information includes configuring application layer measurement by the terminal device with the first user identity, or prohibiting the terminal device from configuring application layer measurement with the second user identity.

With reference to a second aspect, in some implementations of the second aspect, the second related information includes configuring, by the terminal device with the first user identity, application layer measurement corresponding to a first service type; or the second related information includes prohibiting the terminal device from configuring, with the second user identity, application layer measurement corresponding to the first service type; or allowing the terminal device to configure, with the second user identity, application layer measurement corresponding to a second service type; and the fourth related information includes configuring, by the terminal device with the first user identity, application layer measurement corresponding to a first service type; or the fourth related information includes prohibiting the terminal device from configuring, with the second user identity, application layer measurement corresponding to the first service type; or allowing the terminal device to configure, with the second user identity, application layer measurement corresponding to a second service type, where the second service type is a service type other than the first service type.

With reference to a second aspect, in some implementations of the second aspect, the second related information includes allowing the terminal device to configure, with the first user identity, application layer measurement corresponding to a first service type; or the second related information includes prohibiting the terminal device from configuring, with the second user identity, application layer measurement corresponding to a first service type, or allowing the terminal device to configure, with the second user identity, application layer measurement corresponding to a second service type, the fourth related information includes allowing the terminal device to configure, with the first user identity, application layer measurement corresponding to a first service type; or the fourth related information includes prohibiting the terminal device from configuring, with the second user identity, application layer measurement corresponding to a first service type; or allowing the terminal device to configure, with the second user identity, application layer measurement corresponding to a second service type, where the second service type is a service type other than the first service type.

With reference to a second aspect, in some implementations of the second aspect, the second related information includes configuring, by the terminal device with the first user identity, application layer measurement corresponding to the first measurement type; or the second related information includes prohibiting the terminal device from configuring, with the second user identity, application layer measurement corresponding to the first measurement type, or allowing the terminal device to configure, with the second user identity, application layer measurement corresponding to the second measurement type; and the fourth related information includes configuring, by the terminal device with the first user identity, application layer measurement corresponding to the first measurement type, or the fourth related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

According to this solution, a terminal device notifies a network device corresponding to a second user identity of a measurement type of application layer measurement corresponding to a first user identity, which can realize that only signaling-based QoE measurement is allowed to cover management-based QoE measurement.

With reference to a second aspect, in some implementations of the second aspect, the second related information includes allowing the terminal device to configure, with the first user identity, application layer measurement corresponding to the first measurement type; or the second related information includes prohibiting the terminal device from configuring, with the second user identity, application layer measurement corresponding to the first measurement type, or allowing the terminal device to configure, with the second user identity, application layer measurement corresponding to the second measurement type; and the fourth related information includes allowing the terminal device to configure, with the first user identity, application layer measurement corresponding to the first measurement type, or the fourth related information includes prohibiting the terminal device from configuring, with the second user identity, application layer measurement corresponding to the first measurement type, or allowing the terminal device to configure, with the second user identity, application layer measurement corresponding to the second measurement type, where a priority of the second measurement type is higher than that of the first measurement type.

With reference to a second aspect, in some implementations of the second aspect, the second related information includes configuring, by the terminal device with the first user identity, application layer measurement corresponding to both a first measurement type and a first service type, or the second related information includes prohibiting the terminal device from configuring, with the second user identity, application layer measurement corresponding to both a first measurement type and a first service type, or allowing the terminal device to configure, with the second user identity, application layer measurement corresponding to both a second measurement type and a first service type, the fourth related information includes configuring, by the terminal device with the first user identity; application layer measurement corresponding to both a first measurement type and a first service type, or the fourth related information includes prohibiting the terminal device from configuring application layer measurement corresponding to both the first measurement type and the first service type, or allowing the terminal device to configure application layer measurement corresponding to both a second measurement type and a first service type, where a priority of the second measurement type is higher than that of the first measurement type.

With reference to a second aspect, in some implementations of the second aspect, the second related information includes allowing the terminal device to configure, with the first user identity, application layer measurement corresponding to both a first measurement type and a first service type; or the second related information includes prohibiting the terminal device from configuring, with the second user identity, application layer measurement corresponding to both a first measurement type and a first service type, or allowing the terminal device to configure, with the second user identity, application layer measurement corresponding to both a second measurement type and a first service type; and the fourth related information includes allowing the terminal device to configure, with the first user identity, application layer measurement corresponding to both a first measurement type and a first service type, or the fourth related information includes prohibiting the terminal device from configuring application layer measurement corresponding to both a first measurement type and a first service type, or enabling the terminal device to configure application layer measurement corresponding to both a second measurement type and a first service type, where a priority of the second measurement type is higher than that of the first measurement type.

With reference to a second aspect, in some implementations of the second aspect, the method further includes: The second radio access network device receives fourth information from a core network device. The second radio access network device sends a rejection message to the core network device, where the core network device corresponds to the second user identity.

With reference to a second aspect, in some implementations of the second aspect, the determining, by the second radio access network device based on the second information, third related information of application layer measurement corresponding to the first user identity or the second user identity includes: determining, by the second radio access network device based on the second information, prohibiting the terminal device from performing application layer measurement corresponding to the second user identity, where the fourth information indicates that the second radio access network device configures, for the terminal device, the application layer measurement corresponding to the second user identity.

With reference to a second aspect, in some implementations of the second aspect, the determining, by the second radio access network device based on the second information, third related information of application layer measurement corresponding to the first user identity or the second user identity includes: determining, by the second radio access network device based on the second information, prohibiting the terminal device from configuring, with a second user identity, application layer measurement corresponding to a first service type, or allowing the terminal device to configure, with a second user identity, application layer measurement corresponding to a second service type, where the fourth information indicates that the second radio access network device configures, for the terminal device, the application layer measurement corresponding to the first service type, and the second service type is a service type other than the first service type.

With reference to a second aspect, in some implementations of the second aspect, the determining, by the second radio access network device based on the second information, third related information of application layer measurement corresponding to the first user identity or the second user identity includes: determining, by the second radio access network device based on the second information, prohibiting the terminal device from configuring, with a second user identity, application layer measurement corresponding to a first measurement type, where the fourth information indicates that the second radio access network device configures application layer measurement corresponding to the first measurement type for the terminal device, where a priority of the second measurement type is higher than that of the first measurement type.

With reference to a second aspect, in some implementations of the second aspect, the determining, by the second radio access network device based on the second information, third related information of application layer measurement corresponding to the first user identity or the second user identity includes: determining, by the second radio access network device based on the second information, prohibiting the terminal device from configuring, with a second user identity, application layer measurement corresponding to both a first measurement type and a first service, where the fourth information indicates that the second radio access network device configures application layer measurement corresponding to both a first measurement type and a first service for the terminal device, where a priority of the second measurement type is higher than that of the first measurement type.

According to a third aspect, a quality of experience measurement method is provided, including: An upper layer of an access stratum AS of a terminal device receives first application layer measurement from an AS of the terminal device, where the first application layer measurement corresponds to a first user identity. An upper layer of the AS receives second application layer measurement from the AS, where the second application layer measurement corresponds to a second user identity. An upper layer of the AS performs, based on the first application layer measurement, an application layer measurement of a service corresponding to the first user identity. An upper layer of the AS performs, based on the second application layer measurement, an application layer measurement of a service corresponding to the second user identity.

According to this solution, through specifying that application layer measurement corresponding to a plurality of user identities are independent of each other in an upper layer of an AS of a terminal device, mutual impact on application layer measurement corresponding to a plurality of user identities of a terminal device can be reduced, thereby avoiding a problem that a network side cannot collect a quality of experience measurement result or the collected quality of experience measurement result is inaccurate.

With reference to a third aspect, in some implementations of the third aspect, the method further includes: An upper layer of the AS determines that the first application layer measurement corresponds to the first user identity, and that the second application layer measurement corresponds to the second user identity.

With reference to a third aspect, in some implementations of the third aspect, the determining, by an upper layer of the AS, that the first application layer measurement corresponds to the first user identity, and that the second application layer measurement corresponds to the second user identity includes: receiving, by an upper layer of the AS, one or more pieces of indication information from the AS; determining, based on the one or more pieces of indication information, that the first application layer measurement corresponds to the first user identity, and that the second application layer measurement corresponds to the second user identity.

With reference to a third aspect, in some implementations of the third aspect, the determining, by an upper layer of the AS, that the first application layer measurement corresponds to the first user identity, and that the second application layer measurement corresponds to the second user identity includes: receiving, by an upper layer of the AS, the first application layer measurement and the second application layer measurement from the AS through different interfaces. An upper layer of the AS determines, based on the different interfaces, that the first application layer measurement corresponds to the first user identity, and that the second application layer measurement corresponds to the second user identity.

With reference to a third aspect, in some implementations of the third aspect, the determining, by an upper layer of the AS, that the first application layer measurement corresponds to the first user identity, and that the second application layer measurement corresponds to the second user identity includes: An upper layer of the AS determines, based on the correspondence between the first application layer measurement and the second application layer measurement and a service, that the first application layer measurement corresponds to the first user identity, and that the second application layer measurement corresponds to the second user identity.

According to a fourth aspect, a quality of experience measurement method is provided, including: An access stratum AS of a terminal device receives first application layer measurement from a first radio access network device, where the first application layer measurement corresponds to a first user identity. The AS receives second application layer measurement from the second radio access network device, where the second application layer measurement corresponds to a second user identity. The AS sends the first application layer measurement to an upper layer of an AS of the terminal device. The AS sends the second application layer measurement to an upper layer of the AS.

With reference to a fourth aspect, in some implementations of the fourth aspect, the method further includes: The AS sends one or more pieces of indication information to an upper layer of the AS, where the one or more pieces of indication information indicates that the first application layer measurement corresponds to the first user identity, and the second application layer measurement corresponds to the second user identity.

According to this solution, through specifying that application layer measurement corresponding to a plurality of user identities are independent of each other in an upper layer of an AS of a terminal device, mutual impact on application layer measurement corresponding to a plurality of user identities of a terminal device can be reduced, thereby avoiding a problem that a network side cannot collect a quality of experience measurement result or the collected quality of experience measurement result is inaccurate.

With reference to a fourth aspect, in some implementations of the fourth aspect, the method further includes: The AS sends the first application layer measurement and the second application layer measurement to an upper layer of the AS through different interfaces.

According to a fifth aspect, a quality of experience measurement method is provided, including: An upper layer of an access stratum AS of a terminal device receives first application layer measurement and second application layer measurement from an AS of the terminal device, where both the first application layer measurement and the second application layer measurement correspond to a first user identity. An upper layer of the AS receives a third application layer measurement from the AS, where the third application layer measurement corresponds to a second user identity. An upper layer of the AS sends fifth information to an AS of the terminal device, where the fifth information indicates that application layer measurement using first application layer measurement is suspended or terminated, or application layer measurement using second application layer measurement is started. The suspension or termination is triggered by application layer measurement corresponding to the second user identity.

It should be understood that an execution sequence of all steps in this solution is not limited by a writing order, and an upper layer of an AS of a terminal device may receive second application layer measurement before or after sending fifth information. Specifically, if an upper layer of an AS receives second application layer measurement before sending fifth information, the fifth information can only indicate that application layer measurement using first application layer measurement is suspended. If an upper layer of an AS receives second application layer measurement before sending fifth information, the fifth information indicates that application layer measurement using first application layer measurement is suspended or terminated, or application layer measurement using second application layer measurement is started.

According to this solution, when application layer measurement corresponding to a first user identity is interrupted, terminated, or restarted due to a service corresponding to a second user identity, a terminal device reports to a network side that application layer measurement is affected, thereby reducing errors in subsequent analysis of application layer measurement results by the network side.

With reference to a fifth aspect, in some implementations of the fifth aspect, the method further includes: An upper layer of the AS receives seventh information from the AS, where the seventh information includes second application layer measurement, and the seventh information indicates that an upper layer of the AS performs application layer measurement with the second application layer measurement. When the first application layer measurement is the same as the second application layer measurement, the fifth information indicates that application layer measurement using first application layer measurement is suspended, or the fifth information indicates that application layer measurement using second application layer measurement is started. When the first application layer measurement is different from the second application layer measurement, the fifth information indicates that application layer measurement using first application layer measurement is terminated, or the fifth information indicates that application layer measurement using second application layer measurement is started.

With reference to a fifth aspect, in some implementations of the fifth aspect, the method further includes: An upper layer of the AS receives seventh information from the AS, where the seventh information indicates that an upper layer of the AS continues performs application layer measurement with the first application layer measurement; and the fifth information indicates that the application layer measurement using first application layer measurement is suspended, or the application layer measurement using second application layer measurement is started, where the first application layer measurement is the same as the second application layer measurement.

With reference to a fifth aspect, in some implementations of the fifth aspect, the method further includes: An upper layer of the AS, performs, based on the first application layer measurement or the second application layer measurement, an application layer measurement of a service corresponding to the first user identity. An upper layer of the AS performs, based on the third application layer measurement, an application layer measurement of a service corresponding to the second user identity.

According to a sixth aspect, a quality of experience measurement method is provided, including: An access stratum AS of a terminal device receives first application layer measurement and second application layer measurement from a first radio access network device, where both the first application layer measurement and the second application layer measurement correspond to a first user identity. The AS sends the first application layer measurement and the second application layer measurement to an upper layer of an AS of the terminal device. The AS receives a third application layer measurement from a second radio access network device, where the third application layer measurement corresponds to a second user identity. The AS sends a third application layer measurement to an upper layer of the AS. The AS receives fifth information from an upper layer of the AS, where the fifth information indicates that application layer measurement using first application layer measurement is suspended or terminated, or application layer measurement using second application layer measurement is started. The AS sends sixth information to the first radio access network device, where the sixth information is consistent with the content indicated by the fifth information. The suspension or termination is triggered by application layer measurement corresponding to the second user identity.

It should be understood that an execution sequence of all steps in this solution is not limited by a writing order, and an AS of a terminal device may send second application layer measurement before or after receiving fifth information. Specifically, if an AS sends second application layer measurement before receiving fifth information, the fifth information can only indicate that application layer measurement using first application layer measurement is suspended. If an AS sends second application layer measurement before receiving fifth information, the fifth information indicates that application layer measurement using first application layer measurement is suspended or terminated, or application layer measurement using second application layer measurement is started.

According to this solution, when application layer measurement corresponding to a first user identity is interrupted, terminated, or restarted due to a service corresponding to a second user identity, a terminal device reports to a network side that application layer measurement is affected, thereby reducing errors in subsequent analysis of application layer measurement results by the network side.

With reference to a sixth aspect, in some implementations of the sixth aspect, the method further includes: The AS sends seventh information to an upper layer of the AS, where the seventh information includes the second application layer measurement, and the seventh information indicates that an upper layer of the AS performs application layer measurement with the second application layer measurement. When the first application layer measurement is the same as the second application layer measurement, the fifth information indicates that application layer measurement using first application layer measurement is suspended, or the fifth information indicates that application layer measurement using second application layer measurement is started. When the first application layer measurement is different from the second application layer measurement, the fifth information indicates that application layer measurement using first application layer measurement is terminated, or the fifth information indicates that application layer measurement using second application layer measurement is started. With reference to a sixth aspect, in some implementations of the sixth aspect, the method further includes: The AS sends seventh information to an upper layer of the AS, where the seventh information indicates that an upper layer of the AS continues to perform application layer measurement with the first application layer measurement; and the fifth information indicates that the application layer measurement using first application layer measurement is suspended, or the application layer measurement using second application layer measurement is started, where the first application layer measurement is the same as the second application layer measurement.

According to a seventh aspect, a quality of experience measurement apparatus is provided, including: a transceiver module, configured to receive first information from a first radio access network device with a first user identity, where the first information includes first related information of application layer measurement corresponding to a first user identity; and the transceiver module is further configured to send second information to a second radio access network device with a second user identity, where the second information indicates second related information of application layer measurement corresponding to the first user identity or the second user identity.

According to this solution, a terminal device reports application layer measurement configuration related information corresponding to a first user identity or a second user identity to a network side corresponding to a second user identity. The network side may determine application layer measurement that can be configured for the second user identity based on the information reported by the terminal device. Mutual impact on application layer measurement corresponding to two user identities can be reduced, thereby avoiding a problem that a network side cannot collect a quality of experience measurement result or the collected quality of experience measurement result is inaccurate.

With reference to a seventh aspect, in some implementations of the seventh aspect, the first related information includes application layer measurement corresponding to the first user identity; and the second related information includes that the terminal device configures application layer measurement with the first user identity, or the terminal device is prohibited from configuring application layer measurement with the second user identity.

With reference to a seventh aspect, in some implementations of the seventh aspect, the first related information includes application layer measurement corresponding to the first user identity and a first service type corresponding to the application layer measurement. The second related information includes configuring, by the terminal device with the first user identity, application layer measurement corresponding to the first service type; or the second related information includes prohibiting the terminal device from configuring, with a second user identity, application layer measurement corresponding to the first service type; or allowing the terminal device to configure, with a second user identity, application layer measurement corresponding to a second service type, where the second service type is a service type other than a first service type.

With reference to a seventh aspect, in some implementations of the seventh aspect, the first related information includes allowing the terminal device to configure, with the first user identity, application layer measurement corresponding to a first service type; and the second related information includes that the terminal device is allowed to configure, with the first user identity, application layer measurement corresponding to a first service type; or the second related information includes prohibiting the terminal device from configuring, with a second user identity, application layer measurement corresponding to a first service type, or allowing the terminal device to configure, with a second user identity, application layer measurement corresponding to a second service type, where the second service type is a service type other than a first service type.

With reference to a seventh aspect, in some implementations of the seventh aspect, the first related information indicates prohibiting the terminal device from configuring application layer measurement with the first user identity, and the second related information indicates prohibiting the terminal device from configuring application layer measurement with the first user identity; or the second related information indicates that the terminal device is allowed to configure application layer measurement with a second user identity.

With reference to a seventh aspect, in some implementations of the seventh aspect, the first related information includes application layer measurement and a first measurement type corresponding to the application layer measurement; and the second related information includes configuring, by the terminal device with the first user identity, application layer measurement corresponding to the first measurement type, or the second related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

With reference to a seventh aspect, in some implementations of the seventh aspect, the first related information includes allowing the terminal device to configure, with the first user identity, application layer measurement corresponding to the first measurement type; and the second related information includes allowing the terminal device to configure, with the first user identity, application layer measurement corresponding to the first measurement type, or the second related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

With reference to a seventh aspect, in some implementations of the seventh aspect, the first related information includes prohibiting the terminal device from configuring, with the first user identity, application layer measurement corresponding to a first service type; and the second related information includes prohibiting the terminal device from configuring, with the first user identity, application layer measurement corresponding to a first service type; or the second related information includes allowing the terminal device to configure, with a first user identity, application layer measurement corresponding to a second service type; or allowing the terminal device to configure, with a second user identity, an application layer measurement, where the second service type is a service type other than a first service type.

With reference to a seventh aspect, in some implementations of the seventh aspect, the first related information includes application layer measurement, and a first service type and a first measurement type that correspond to the application layer measurement; and the second related information includes configuring, by the terminal device with the first user identity, application layer measurement corresponding to both the first measurement type and the first service type; or the second related information includes prohibiting the terminal device from configuring, with the second user identity, application layer measurement corresponding to both the first measurement type and the first service type, or allowing the terminal device to configure, with the second user identity, application layer measurement corresponding to both a second measurement type and the first service type, where a priority of the second measurement type is higher than that of the first measurement type.

With reference to a seventh aspect, in some implementations of the seventh aspect, the first related information includes allowing the terminal device to configure, with the first user identity, application layer measurement corresponding to both the first measurement type and the first service type; and the second related information includes allowing the terminal device to configure, with the first user identity, application layer measurement corresponding to both the first measurement type and the first service type; or the second related information includes prohibiting the terminal device from configuring, with the second user identity, application layer measurement corresponding to both the first measurement type and the first service type, or allowing the terminal device to configure, with the second user identity, application layer measurement corresponding to both a second measurement type and the first service type, where a priority of the second measurement type is higher than that of the first measurement type.

With reference to a seventh aspect, in some implementations of the seventh aspect, the first related information indicates prohibiting the terminal device from configuring, with the first user identity, application layer measurement corresponding to both the first measurement type and the first service type; and the second related information includes prohibiting the terminal device from configuring, with the first user identity, application layer measurement corresponding to both the first measurement type and the first service type; or the second related information includes allowing the terminal device to configure, with the second user identity, an application layer measurement; or allowing the terminal device to configure, with the first user identity, application layer measurement corresponding to both a second measurement type and the first service type, where a priority of the second measurement type is higher than that of the first measurement type.

With reference to a seventh aspect, in some implementations of the seventh aspect, the measurement type includes: a management-based application layer measurement, a signaling-based application layer measurement, and application layer measurement triggered by a radio access network device.

According to an eighth aspect, a quality of experience measurement apparatus is provided, including: a transceiver module, configured to receive second information from a terminal device, where the second information includes second related information of application layer measurement corresponding to a first user identity or a second user identity; a processing module, configured to determine, according to the second information, third related information of application layer measurement corresponding to the first user identity or the second user identity, where the terminal device, with the second user identity, is connected to the second radio access network device.

According to this solution, a network side corresponding to a second user identity determines, based on the information reported by a terminal device, an application layer measurement that can be configured for a second user identity. Mutual impact on application layer measurement corresponding to two user identities can be reduced, thereby avoiding a problem that a network side cannot collect a quality of experience measurement result or the collected quality of experience measurement result is inaccurate.

With reference to an eighth aspect, in some implementations of the eighth aspect, the transceiver module is further configured to: send third information to a core network device, where the third information includes fourth related information of application layer measurement corresponding to the first user identity or the second user identity, and the core network device corresponds to the second user identity.

With reference to an eighth aspect, in some implementations of the eighth aspect, the second related information includes that the terminal device configures application layer measurement, or the terminal device is prohibited from configuring application layer measurement with the second user identity; and the third information includes that the terminal device configures application layer measurement with the first user identity, or the terminal device is prohibited from configuring application layer measurement with the second user identity.

With reference to an eighth aspect, in some implementations of the eighth aspect, the second related information includes configuring, by the terminal device with the first user identity, application layer measurement corresponding to a first service type; or the second related information includes prohibiting the terminal device from configuring, with the second user identity, application layer measurement corresponding to the first service type; or allowing the terminal device to configure, with the second user identity, application layer measurement corresponding to a second service type; and the fourth related information includes configuring, by the terminal device with the first user identity, application layer measurement corresponding to a first service type; or the fourth related information includes prohibiting the terminal device from configuring, with the second user identity, application layer measurement corresponding to the first service type; or allowing the terminal device to configure, with the second user identity, application layer measurement corresponding to a second service type, where the second service type is a service type other than the first service type.

With reference to an eighth aspect, in some implementations of the eighth aspect, the second related information includes allowing the terminal device to configure, with the first user identity, application layer measurement corresponding to a first service type; or the second related information includes prohibiting the terminal device from configuring, with the second user identity, application layer measurement corresponding to a first service type, or allowing the terminal device to configure, with the second user identity, application layer measurement corresponding to a second service type. The fourth related information includes allowing the terminal device to configure, with the first user identity, application layer measurement corresponding to a first service type; or the fourth related information includes prohibiting the terminal device from configuring, with the second user identity, application layer measurement corresponding to a first service type; or allowing the terminal device to configure, with the second user identity, application layer measurement corresponding to a second service type, where the second service type is a service type other than the first service type.

With reference to an eighth aspect, in some implementations of the eighth aspect, the second related information includes configuring, by the terminal device with the first user identity, application layer measurement corresponding to the first measurement type; or the second related information includes prohibiting the terminal device from configuring, with the second user identity, application layer measurement corresponding to the first measurement type, or allowing the terminal device to configure, with the second user identity, application layer measurement corresponding to the second measurement type; and the fourth related information includes configuring, by the terminal device with the first user identity, application layer measurement corresponding to the first measurement type, or the fourth related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

With reference to an eighth aspect, in some implementations of the eighth aspect, the second related information includes allowing the terminal device to configure, with the first user identity, application layer measurement corresponding to the first measurement type; or the second related information includes prohibiting the terminal device from configuring, with the second user identity, application layer measurement corresponding to the first measurement type, or allowing the terminal device to configure, with the second user identity, application layer measurement corresponding to the second measurement type; and the fourth related information includes allowing the terminal device to configure, with the first user identity, application layer measurement corresponding to the first measurement type, or the fourth related information includes prohibiting the terminal device from configuring, with the second user identity, application layer measurement corresponding to the first measurement type, or allowing the terminal device to configure, with the second user identity, application layer measurement corresponding to the second measurement type, where a priority of the second measurement type is higher than that of the first measurement type.

With reference to an eighth aspect, in some implementations of the eighth aspect, the second related information includes configuring, by the terminal device with the first user identity, application layer measurement corresponding to both a first measurement type and a first service type, or the second related information includes prohibiting the terminal device from configuring, with the second user identity, application layer measurement corresponding to both a first measurement type and a first service type, or allowing the terminal device to configure, with the second user identity, application layer measurement corresponding to both a second measurement type and a first service type. The fourth related information includes configuring, by the terminal device with the first user identity; application layer measurement corresponding to both a first measurement type and a first service type, or the fourth related information includes prohibiting the terminal device from configuring application layer measurement corresponding to both the first measurement type and the first service type, or the terminal device is allowed to configure application layer measurement corresponding to both a second measurement type and a first service type, where a priority of the second measurement type is higher than that of the first measurement type.

With reference to an eighth aspect, in some implementations of the eighth aspect, the second related information includes allowing the terminal device to configure, with the first user identity, application layer measurement corresponding to both a first measurement type and a first service type, or the second related information includes prohibiting the terminal device from configuring, with the second user identity, application layer measurement corresponding to both a first measurement type and a first service type, or allowing the terminal device to configure, with the second user identity, application layer measurement corresponding to both a second measurement type and a first service type. The fourth related information includes allowing the terminal device to configure, with the first user identity; application layer measurement corresponding to both a first measurement type and a first service type, or the fourth related information includes prohibiting the terminal device from configuring application layer measurement corresponding to both a first measurement type and a first service type, or the terminal device can configure application layer measurement corresponding to both a second measurement type and a first service type, where a priority of the second measurement type is higher than that of the first measurement type.

With reference to an eighth aspect, in some implementations of the eighth aspect, the apparatus further includes: the second radio access network device receiving fourth information from a core network device; sending, by the second radio access network device, a rejection message to the core network device, where the core network device corresponds to the second user identity.

With reference to an eighth aspect, in some implementations of the eighth aspect, the processing module is further specifically configured to determine, based on the second information, that the terminal device is prohibited from configuring application layer measurement corresponding to the second user identity, where the fourth information indicates that the second radio access network device configures application layer measurement corresponding to the second user identity for the terminal device.

With reference to an eighth aspect, in some implementations of the eighth aspect, the processing module is further specifically configured to: determine, based on the second information, prohibiting the terminal device from configuring, with a second user identity, application layer measurement corresponding to a first service type, or allowing the terminal device to configure, with a second user identity, application layer measurement corresponding to a second service type, where the fourth information indicates that the second radio access network device configures application layer measurement corresponding to the first service type for the terminal device, where the second service type is a service type other than the first service type.

With reference to an eighth aspect, in some implementations of the eighth aspect, the processing module is further specifically configured to determine, based on the second information, prohibiting the terminal device from configuring, with a second user identity, application layer measurement corresponding to a first measurement type, where the fourth information indicates that the second radio access network device configures application layer measurement corresponding to the first measurement type for the terminal device, where a priority of the second measurement type is higher than that of the first measurement type.

With reference to an eighth aspect, in some implementations of the eighth aspect, the processing module is further specifically configured to determine, based on the second information, prohibiting the terminal device from configuring, with a second user identity, application layer measurement corresponding to both a first measurement type and a first service, where the fourth information indicates that the second radio access network device configures application layer measurement corresponding to both a first measurement type and a first service for the terminal device, where a priority of the second measurement type is higher than that of the first measurement type.

According to a ninth aspect, a quality of experience measurement apparatus is provided, including: a transceiver module, configured to receive first application layer measurement from an AS of the terminal device, where the first application layer measurement corresponds to a first user identity; the transceiver module is further configured to receive second application layer measurement from the AS, where the second application layer measurement corresponds to a second user identity; a processing module, configured to perform, based on the first application layer measurement, an application layer measurement of a service corresponding to the first user identity; a processing module, configured to perform, based on the second application layer measurement, an application layer measurement of a service corresponding to the second user identity.

With reference to a ninth aspect, in some implementations of the ninth aspect, the processing module is further configured to: determine that the first application layer measurement corresponds to the first user identity, and that the second application layer measurement corresponds to the second user identity.

According to this solution, through specifying that application layer measurement corresponding to a plurality of user identities are independent of each other in an upper layer of an AS of a terminal device, mutual impact on application layer measurement corresponding to a plurality of user identities of a terminal device can be reduced, thereby avoiding a problem that a network side cannot collect a quality of experience measurement result or the collected quality of experience measurement result is inaccurate.

With reference to a ninth aspect, in some implementations of the ninth aspect, the processing module is further configured to: receive, through an upper layer of the AS, one or more pieces of indication information from the AS; and determine, based on the one or more pieces of indication information, that the first application layer measurement corresponds to the first user identity, and that the second application layer measurement corresponds to the second user identity.

With reference to a ninth aspect, in some implementations of the ninth aspect, the processing module is further configured to: receive, by an upper layer of the AS, the first application layer measurement and the second application layer measurement from the AS through different interfaces; and determine, by the upper layer of the AS, based on the different interfaces, that the first application layer measurement corresponds to the first user identity, and that the second application layer measurement corresponds to the second user identity.

With reference to a ninth aspect, in some implementations of the ninth aspect, the processing module is further configured to: determine, by the upper layer of the AS, based on the correspondence between the first application layer measurement and the second application layer measurement and a service, that the first application layer measurement corresponds to the first user identity, and that the second application layer measurement corresponds to the second user identity.

According to a tenth aspect, a quality of experience measurement apparatus is provided, including: a transceiver module, configured to receive first application layer measurement from a first radio access network device, where the first application layer measurement corresponds to a first user identity; the transceiver module is further configured to receive second application layer measurement from the second radio access network device, where the second application layer measurement corresponds to a second user identity; the transceiver module is further configured to send the first application layer measurement to an upper layer of an AS of the terminal device; the transceiver module is further configured to send the second application layer measurement to an upper layer of the AS.

According to this solution, through specifying that application layer measurement corresponding to a plurality of user identities are independent of each other in an upper layer of an AS of a terminal device, mutual impact on application layer measurement corresponding to a plurality of user identities of a terminal device can be reduced, thereby avoiding a problem that a network side cannot collect a quality of experience measurement result or the collected quality of experience measurement result is inaccurate.

With reference to a tenth aspect, in some implementations of the tenth aspect, the transceiver module is further configured to: send one or more pieces of indication information to an upper layer of the AS, where the one or more pieces of indication information indicates that the first application layer measurement corresponds to the first user identity, and the second application layer measurement corresponds to the second user identity.

With reference to a tenth aspect, in some implementations of the tenth aspect, the transceiver module is further configured to: send the first application layer measurement and the second application layer measurement to an upper layer of the AS through different interfaces.

According to an eleventh aspect, a quality of experience measurement apparatus is provided, including: a transceiver module, configured to receive first application layer measurement and second application layer measurement from an AS of the terminal device, where both the first application layer measurement and the second application layer measurement correspond to a first user identity; the transceiver module is further configured to receive a third application layer measurement from the AS, where the third application layer measurement corresponds to a second user identity; and the transceiver module is further configured to send fifth information to an AS of the terminal device, where the fifth information indicates that application layer measurement using first application layer measurement is suspended or terminated, or application layer measurement using second application layer measurement is started, where the suspension or termination is triggered by application layer measurement corresponding to the second user identity.

According to this solution, when application layer measurement corresponding to a first user identity is interrupted, terminated, or restarted due to a service corresponding to a second user identity, a terminal device reports to a network side that application layer measurement is affected, thereby reducing errors in subsequent analysis of application layer measurement results by the network side.

With reference to an eleventh aspect, in some implementations of the eleventh aspect, the transceiver module is further configured to: receive seventh information from the AS, where the seventh information includes second application layer measurement, and the seventh information indicates that an upper layer of the AS performs application layer measurement with the second application layer measurement. When the first application layer measurement is the same as the second application layer measurement, the fifth information indicates that application layer measurement using first application layer measurement is suspended, or the fifth information indicates that application layer measurement using second application layer measurement is started. When the first application layer measurement is different from the second application layer measurement, the fifth information indicates that application layer measurement using first application layer measurement is terminated, or the fifth information indicates that application layer measurement using second application layer measurement is started.

With reference to an eleventh aspect, in some implementations of the eleventh aspect, the transceiver module is further configured to: receive seventh information from the AS, where the seventh information indicates that an upper layer of the AS continues to perform application layer measurement with the first application layer measurement. The fifth information indicates that the application layer measurement using first application layer measurement is suspended, or the application layer measurement using second application layer measurement is started, where the first application layer measurement is the same as the second application layer measurement.

With reference to an eleventh aspect, in some implementations of the eleventh aspect, the apparatus further includes: a processing module, configured to perform, based on the first application layer measurement or the second application layer measurement, an application layer measurement of a service corresponding to the first user identity, where the processing module is further configured to perform, based on the third application layer measurement, an application layer measurement of a service corresponding to the second user identity.

According to a twelfth aspect, a quality of experience measurement apparatus is provided, including: a transceiver module, configured to receive first application layer measurement and second application layer measurement from a first radio access network device, where both the first application layer measurement and the second application layer measurement correspond to a first user identity; the transceiver module is further configured to send the first application layer measurement and the second application layer measurement; the transceiver module is further configured to receive a third application layer measurement from a second radio access network device, where the third application layer measurement corresponds to a second user identity; the transceiver module is further configured to send a third application layer measurement to an upper layer of the AS; the transceiver module is further configured to receive fifth information from an upper layer of the AS, where the fifth information indicates that application layer measurement using first application layer measurement is suspended or terminated, or application layer measurement using second application layer measurement is started; the transceiver module is further configured to send sixth information to the first radio access network device, where the sixth information is consistent with the content indicated by the fifth information, where the suspension or termination is triggered by application layer measurement corresponding to the second user identity.

According to this solution, when application layer measurement corresponding to a first user identity is interrupted, terminated, or restarted due to a service corresponding to a second user identity, a terminal device reports to a network side that application layer measurement is affected, thereby reducing errors in subsequent analysis of application layer measurement results by the network side.

With reference to a twelfth aspect, in some implementations of the twelfth aspect, the apparatus further includes: the transceiver module is further configured to send seventh information to an upper layer of the AS, where the seventh information includes the second application layer measurement, and the seventh information indicates that an upper layer of the AS performs application layer measurement with the second application layer measurement. When the first application layer measurement is the same as the second application layer measurement, the fifth information indicates that application layer measurement using first application layer measurement is suspended, or the fifth information indicates that application layer measurement using second application layer measurement is started. When the first application layer measurement is different from the second application layer measurement, the fifth information indicates that application layer measurement using first application layer measurement is terminated, or the fifth information indicates that application layer measurement using second application layer measurement is started.

According to this solution, a terminal device reports application layer measurement configuration related information corresponding to a first user identity or a second user identity to a network side corresponding to a second user identity. The network side may determine application layer measurement that can be configured for the second user identity based on the information reported by the terminal device. Mutual impact on application layer measurement corresponding to two user identities can be reduced, thereby avoiding a problem that a network side cannot collect a quality of experience measurement result or the collected quality of experience measurement result is inaccurate.

With reference to a twelfth aspect, in some implementations of the twelfth aspect, the apparatus further includes: the transceiver module is further configured to send seventh information to an upper layer of the AS, where the seventh information indicates that an upper layer of the AS continues to perform application layer measurement with the first application layer measurement; and the fifth information indicates that the application layer measurement using first application layer measurement is suspended, or the application layer measurement using second application layer measurement is started, where the first application layer measurement is the same as the second application layer measurement.

According to a thirteenth aspect, a communication apparatus is provided, including a processor and a memory; the memory is configured to store a computer program; the processor is configured to execute the computer programs stored in the memory, to enable the communication apparatus to perform the method and the embodiment according to any one of aspects 1 to 6.

According to a fourteenth aspect, a computer readable storage medium is provided. The computer readable storage medium stores a computer program. When the computer program is run on a computer, the computer is enabled to perform the method and the embodiment according to any one of aspects 1 to 6.

According to a fifteenth aspect, a chip system is provided, including a processor, configured to call and run a computer program from a memory, so that a communication device on which the chip system is installed performs the method and the embodiment according to any one of aspects 1 to 6.

DESCRIPTION OF EMBODIMENTS

The following describes technical solutions of this application with reference to the accompanying drawings.

The technical solutions in embodiments of this application may be applied to various communication systems, for example: long term evolution (LTE) system, 5th generation (5G) system, new radio (NR), future mobile communication system, and the like.

Figure 1:
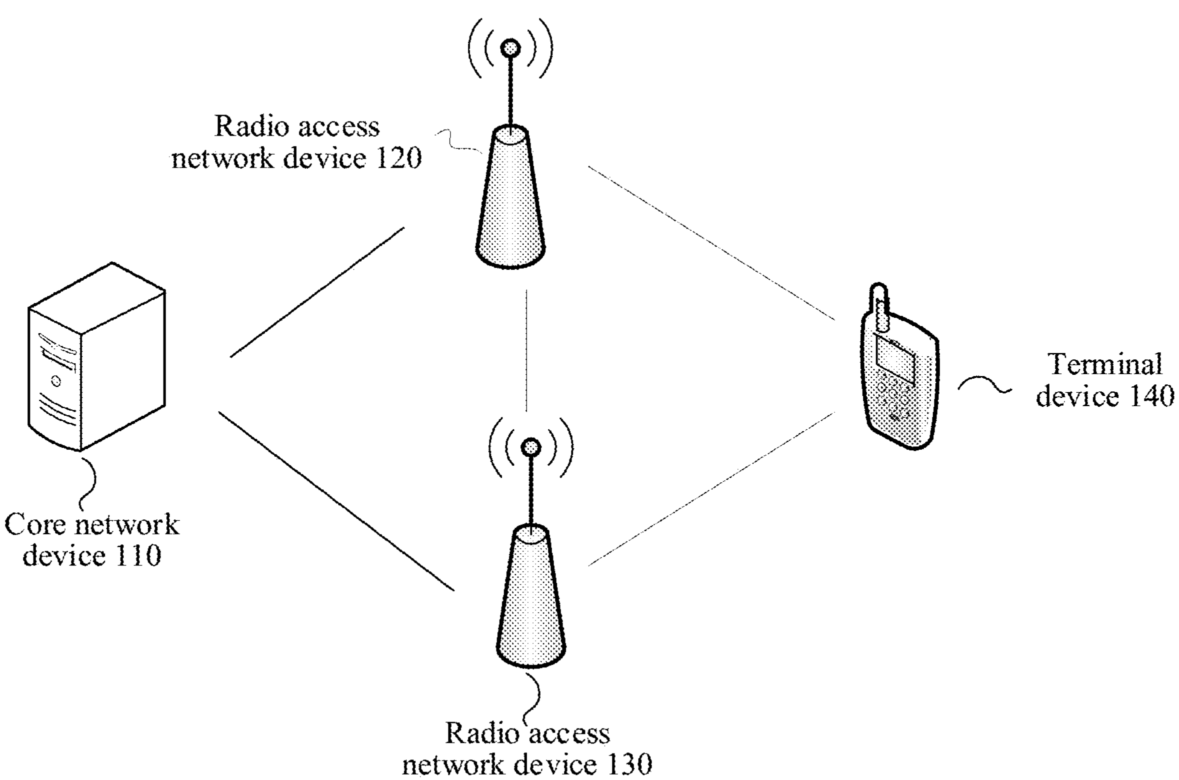
FIG. 1 is a schematic architectural diagram of a communication system applicable to this application.

FIG. 1 is a schematic diagram of an architecture of mobile communication system to which an embodiment of this application is applied. As shown in FIG. 1, the mobile communication system includes a core network device 110, a radio access network (RAN) device 120, and at least one terminal device (for example, a terminal device 140 in FIG. 1). Optionally, one terminal device may communicate with a plurality of radio access network devices, that is, dual-connectivity (DC). For example, a terminal device 140 may communicate with a radio access network device 120 and a radio access network device 130. It should be understood that a plurality of radio access network devices communicating with a same terminal device may be radio access network devices of a same standard (for example, all are radio access network devices in a 5G network), and may not be radio access network devices of a same standard (for example, one is a radio access network device in a 4G network, and the other is a radio access network device in a 5G network).

A terminal device is connected to a radio access network device in a wireless manner, and a radio access network device is connected to a core network device in a wireless or wired manner. A core network device and a radio access network device may be independent and different physical devices, or functions of the core network device and logical functions of the radio access network device are integrated into a same physical device, or a part of functions of the core network device and a part of functions of the radio access network device are integrated into one physical device. The terminal device may be located at a fixed location, or may be mobile. FIG. 1 is only a schematic diagram. The communication system may further include other network devices, for example, a wireless relay device and a wireless backhaul device, which are not shown in FIG. 1. Quantities of core network devices, radio access network devices, and terminal devices included in the mobile communication system are not limited in embodiments of this application. It should be understood that the core network device in FIG. 1 may be replaced with an OAM.

A terminal, which may also be referred to as a user equipment (UE), a mobile station (mobile station, MS), a mobile terminal (MT), or the like, is a device that provides voice and/or data connectivity to a user. For example, a handheld device or a vehicle-mounted device having a wireless connection function. Currently, examples of some terminals are as follows: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in a smart city, a wireless terminal in a smart home (smart home), and the like. A specific technology and a specific device form used by a terminal device are not limited in embodiments of this application.

The terminal may have a plurality of subscriber identity modules (SIM) or dual universal subscriber identity modules (USIM). In this application, the SIM may be a physical SIM card, a software SIM, a virtual SIM, or an embedded-SIM (eSIM). In this application, one SIM is installed on a terminal device, which is considered as the terminal device supporting one user identity. For example, a terminal device on which two SIMS are installed can support two user identities. It can be understood that a SIM card and a user identity are in a one-to-one correspondence. The installation of a SIM may be that a physical SIM card is installed inside a terminal device, or may be implemented by configuring a terminal device through software. Embodiments of this application, mainly take a terminal device supporting two user identities as an example. The two user identities are respectively referred to as a first user identity and a second user identity. The first user identity may be understood as a user identity obtained after the first SIM is installed on the terminal device, and the second user identity may be understood as a user identity obtained after the second SIM is installed on the terminal device. In other possible embodiments, if two or more SIM cards are installed on a terminal device, the terminal device supports two or more user identities. For example, a terminal device supports three user identities, four user identities, or more user identities, and may be registered with two or more networks, or each user identity may be registered with one network. Embodiments of this application mainly describe based on the fact that a terminal device supports two user identities. When a terminal device supports two or more user identities, the specific implementation may refer to the related description that a terminal device supports two user identities, and some simple adaptations may need to be performed. However, this also falls within the protection scope of embodiments of this application.

When the user identity of a terminal device is a first user identity, from a perspective of a network device, the terminal device may be understood as a user (from a protocol perspective, which is a terminal device, for example, which is referred to as a first user). When the user identity of a terminal device is a second user identity, from a perspective of a network device, the terminal device may be understood as another user (for example, it is referred to as a second user). A terminal device may be registered with a first network as a first user identity, and registered with a second network as a second user identity. In embodiments of this application, a terminal device supports one user identity, which may also be described as that a terminal device has one user identity. Similarly, a terminal device supports two user identities, which may also be described as that a terminal device has or corresponds to two user identities.

An access network device is a radio access network (RAN) node (or device) that connects a terminal to a wireless network, and may also be referred to as a base station. Currently, examples of some RAN nodes are: a next generation NodeB, (gNB), a transmission reception point (TRP), an evolved NodeB (eNB), a radio network controller (RNC), NodeB (NB), a base station controller (BSC), a base transceiver station (BTS), a home base station, (for example, home evolved NodeB, or home NodeB, HNB), a base band unit (BBU), or a wireless fidelity (Wi-Fi) access point (access point, AP), or the like. In addition, in a network structure, an access network device may include a central unit (CU) node, a distributed unit (DU) node, or a RAN device including a CU node and a DU node. The RAN device including a CU node and a DU node splits protocol layers of the gNB in an NR system. The functions of some protocol layers are controlled by the CU in a centralized manner, and the functions of some or all of remaining protocol layers are distributed in the DU, and the CU controls the DU in a centralized manner. As an implementation, a radio resource control (RRC) layer, a PDCP layer, and a service data adaptation protocol (SDAP) layer in a protocol stack are deployed in the CU. A radio link control (RLC) layer, a media access control (MAC) layer, and a physical layer (PHY) in a protocol stack are deployed in the DU. Therefore, the CU has processing capabilities of RRC, PDCP, and SDAP. The DU has processing capabilities of RLC, MAC, and PHY. It may be understood that the foregoing function division is merely an example, and constitutes no limitation on the CU and the DU. In other words, there may be other function division manners between a CU and a DU. Details are not described in embodiments of this application. The functions of a CU may be implemented by one entity, or may be implemented by different entities. For example, the functions of a CU may be further divided. For example, a control plane (CP) is separated from a user plane (UP), in other words, a CU control plane (CU-CP) and a CU user plane (CU-UP) are obtained. For example, a CU-CP and a CU-UP may be implemented by different functional entities, and the CU-CP and the CU-UP may be coupled to a DU to jointly complete the functions of a base station. In a possible manner, the CU-CP is responsible for the functions of a control plane, mainly including an RRC and a PDCP-C. The PDCP-C layer is mainly responsible for data encryption and decryption, integrity protection, data transmission, and the like on the control plane. The CU-UP is responsible for the functions of a user plane, mainly including a SDAP and a PDCP-U. The SDAP is mainly responsible for processing the data of a core network and mapping the data flow (flow) to a bearer. The PDCP-U layer is mainly responsible for encryption and decryption, integrity protection, header compression, serial number maintenance, data transmission, and the like on a data plane. The CU-CP is connected to the CU-UP through an E1 interface. The CU-CP indicates that a gNB is connected to a core network through an Ng interface. Connect to a DU through an F1-C (control plane). The CU-UP is connected to a DU through an F1-U (user plane). Certainly, in another possible implementation, the PDCP-C is implemented on the CU-UP.

A core network device is a device in a core network (core network, CN) that provides service support for a terminal. Currently, examples of some core network devices are as follows: an access and mobility management function (AMF) entity, a session management function (SMF) entity, a user plane function (UPF) entity, and the like, which are not enumerated herein. The AMF entity may be responsible for access management and mobility management of a terminal. The SMF entity may be responsible for session management, for example, user session establishment. The UPF entity may be a user plane function entity, and is mainly responsible for connecting to an external network. It should be noted that an entity in this application may also be referred to as a network element or a functional entity. For example, an AMF entity may also be referred to as an AMF network element or an AMF functional entity. For another example, an SMF entity may also be referred to as an SMF network element or an SMF functional entity. In a later system, a core network device may have another name, or may have another function. Details are not described in this application.

A radio access network device and a terminal device may be deployed on land, including indoor or outdoor, handheld or vehicle-mounted; or may be deployed on the water surface; or may be deployed on aircrafts, balloons and satellites in the air. Application scenarios of a radio access network device and a terminal device are not limited in embodiments of this application.

In addition, it should be understood that the terminal device in this application may be an apparatus, a chip, a circuit, or the like that has the functions of a terminal device. A network device refers to an apparatus, a chip, a circuit, or the like that has the functions of a network device.

A terminal device or a network device includes a hardware layer, an operating system layer running above the hardware layer, and an application layer running above the operating system layer. The hardware layer includes hardware such as a central processing unit (CPU), a memory management unit (MMU), a memory (also referred to as a main memory), and the like. The operating system may be any one or more types of computer operating systems, for example, a Linux operating system, a Unix operating system, an Android operating system, an iOS operating system, or a Windows operating system, that implement service processing with a process. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be a terminal device or a network device, or a function module that can call and execute a program in a terminal device or a network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry an instruction and/or data.

To facilitate understanding of this application, some related concepts are first described.

A basic idea of a minimization of drive-tests (MDT) technology is that an operator partially replaces a conventional drive test work by performing measurement reporting by a commercial terminal device of a subscribed user, and implements automatic collection of terminal device measurement data, so as to detect and optimize problems and faults in a wireless network. Measurement types of existing MDT technologies can be classified into the following types:

1. Signal level measurement: A terminal device measures the signal level of a radio signal, and reports measurement results to an access network device or an access network device controller.
2. Quality of service (QoS) measurement: Generally, an access network device performs QoS measurement. For example, an access network device may measure traffic of a service, a throughput of a service, a service delay, and the like. In addition, a terminal device may also perform QoS measurement. For example, a terminal device may measure an uplink processing delay. Alternatively, a terminal device and an access network device may jointly perform QoS measurement, for example, may perform air interface delay measurement. For example, a downlink air interface delay measurement may be defined as the time of a measurement data packet passing through a service data adaptation protocol (SDAP)/packet data convergence protocol (PDCP) layer of an access network device to the SDAP/PDCP layer of a terminal device.

3. Accessibility measurement: A terminal device records information about an RRC connection setup failure, and reports the information to an access network device or an access network device controller.

MDT includes logged MDT and immediate MDT. The immediate MDT mainly measures a terminal device in an RRC connected (RRC_CONNECTED) state. The logged MDT mainly measures a terminal device in an idle (RRC_IDLE) state or a terminal device in an RRC inactive (RRC_INACTIVE) state. For example, the terminal device in the idle state or the terminal device in the inactive state measures a cell at a frequency corresponding to a cell currently camped on and an inter-frequency/inter-system neighboring cell corresponding to cell reselection broadcast in the cell currently camped on. The immediate MDT is generally used to measure signal quality of a current serving cell, a data volume of a terminal device, an IP throughput rate, a packet transmission delay, a packet loss rate, a processing delay, and the like. The logged MDT generally refers to the measurement of received signal strength by a terminal device.

In two scenarios, an access network device initiates an MDT measurement collection task. One is to initiate signaling based MDT and the other is to initiate management based MDT. The signaling based MDT refers to the MDT for a specific terminal device. Specifically, an access network device receives, from a core network device, a message for performing MDT on a terminal device, and then the access network device initiates MDT measurement for the specific terminal device. The management based MDT is not the MDT for a specific terminal device. Specifically, an access network device receives, from an OAM, a message for performing MDT, and then the access network device selects, based on a specific policy, a terminal device from terminal devices under the access network device to perform an MDT measurement. For the signaling based MDT, a core network device does not initiate a signaling based MDT for the terminal device unless a user has already agreed to perform the MDT. For the management based MDT, when selecting a terminal device, an access network device may consider whether the terminal device agrees to perform MDT. For example, only terminal devices that have agreed to perform MDT are selected to perform an MDT measurement. For example, a core network device may notify an access network device whether a terminal device agrees to perform MDT. For example, a core network device may further notify a public land mobile network (PLMN) list of the management based MDT. Both MDTs may include a logged MDT and an immediate MDT. For the signaling based MDT, a core network device notifies an access network device of some MDT configuration information, an IP address of a trace collection entity (TCE), or a uniform resource identifier (URI) of the TCE. For the management based MDT, an OAM notifies an access network device of some MDT configuration information, an IP address of a TCE, or a URI of the TCE. The MDT configuration information may include one or more of the following: MDT activation type (for example, immediate MDT only, logged MDT only, immediate MDT and trace), MDT area range, MDT mode, and configuration parameters of a corresponding mode (for example, immediate MDT measurement events and logged MDT recording interval and duration), a public land mobile network (PLMN) list of the signaling based MDT. The TCE in this application may be replaced with a measurement collector entity (measurement collector entity, MCE).

For some streaming services or voice services, for example, a streaming service, and a multimedia technology service (multimedia telephony service for IMS, MTSI) used in an IP multimedia subsystem (IMS), signal quality alone cannot reflect user experience when a user uses these services. Operators want to know user experience so that they can optimize networks to improve user experience. This type of measurement collection is referred to as QoE measurement collection, and may also be referred to as application layer measurement collection. Such measurement can also be initiated using signaling based MDT and management based MDT procedures, or using other procedures. QoE measurement collection may also be classified into signaling based QoE measurement collection and management based QoE measurement collection. For specific differentiation, refer to the description of the MDT above. In addition, a base station may also actively initiate QoE measurement collection according to its own requirement.

Figure 2:
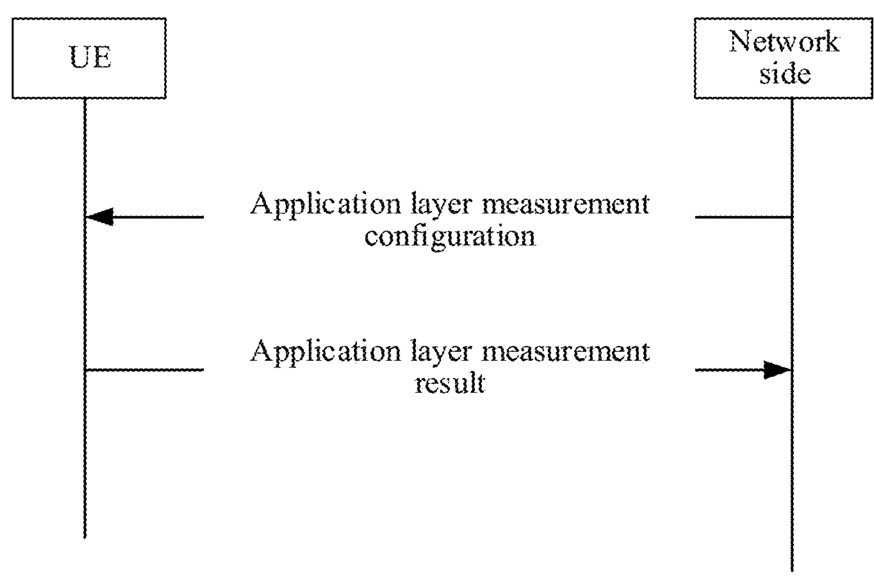
FIG. 2 is a schematic flowchart of performing a quality of experience measurement by a terminal device.

FIG. 2 is a schematic flowchart of performing QoE measurement by a terminal device. As shown in the figure, a network side sends application layer measurement configuration information to a terminal device, and the terminal device feeds back a QoE measurement report to the network side after performing QoE measurement.

Specifically, an access network device may receive the QoE measurement configuration information from a core network device or an OAM. For example, the configuration information includes application layer measurement configuration information for a terminal device, area range information for instructing an access network device to perform QoE measurement, and services for which QoE measurement is performed. The application layer measurement configuration information may be sent to an access network device in a transparent container manner.

An access network device may generate the measurement configuration information according to its own requirement, and the access network device sends a part of the configuration information (for example, an application layer measurement configuration information and services for which QoE measurement is performed) to a terminal device with an RRC message. After receiving measurement results of an application layer from an upper layer of a terminal device, the RRC layer of the terminal device sends the measurement results to an access network device. For example, the measurement results are encapsulated in a transparent container or sent to the access network device in a form in which the non-transparent access network device can perceive specific meanings. In embodiments of this application, perception means that an access network device can interpret all received information, and perception may be replaced with visibility, learning, detection, or the like. This is not limited in this application.

The QoE measurement configuration information received by an access network device from a CN, an OAM, or an EM includes other information except the foregoing application layer measurement configuration information, for example, a QoE measurement area range and a QoE measurement service type. A method in which an access network device selects UE to perform QoE measurement is basically the same as that in an MDT measurement. An access network device sends application layer measurement configuration information to the UE with an RRC message. Generally, a transmission priority of a QoE measurement result is lower than those of other signaling radio bearers (SRB) (the signaling radio bearer may also be referred to as a signaling bearer for short). Therefore, an access network device configures a signaling radio bearer for UE to transmit the QoE measurement result (the signaling radio bearer configured by a base station and the QoE measurement configured by a base station may be notified to UE with different RRC messages, or may be configured with a same message). The measurement result of the UE may be sent with the signaling radio bearer (for example, with an SRB4).

It should be noted that due to mobility of a terminal device, the access network device that transmits QoE measurement related configuration to the UE and the access network device that sends a QoE measurement result by the UE may be different base stations. The access network device sends the application layer measurement configuration to the terminal device, and the configuration information received by the access network device from the CN, the OAM, or the EM may include some other information in addition to the application layer measurement configuration.

Figure 3:
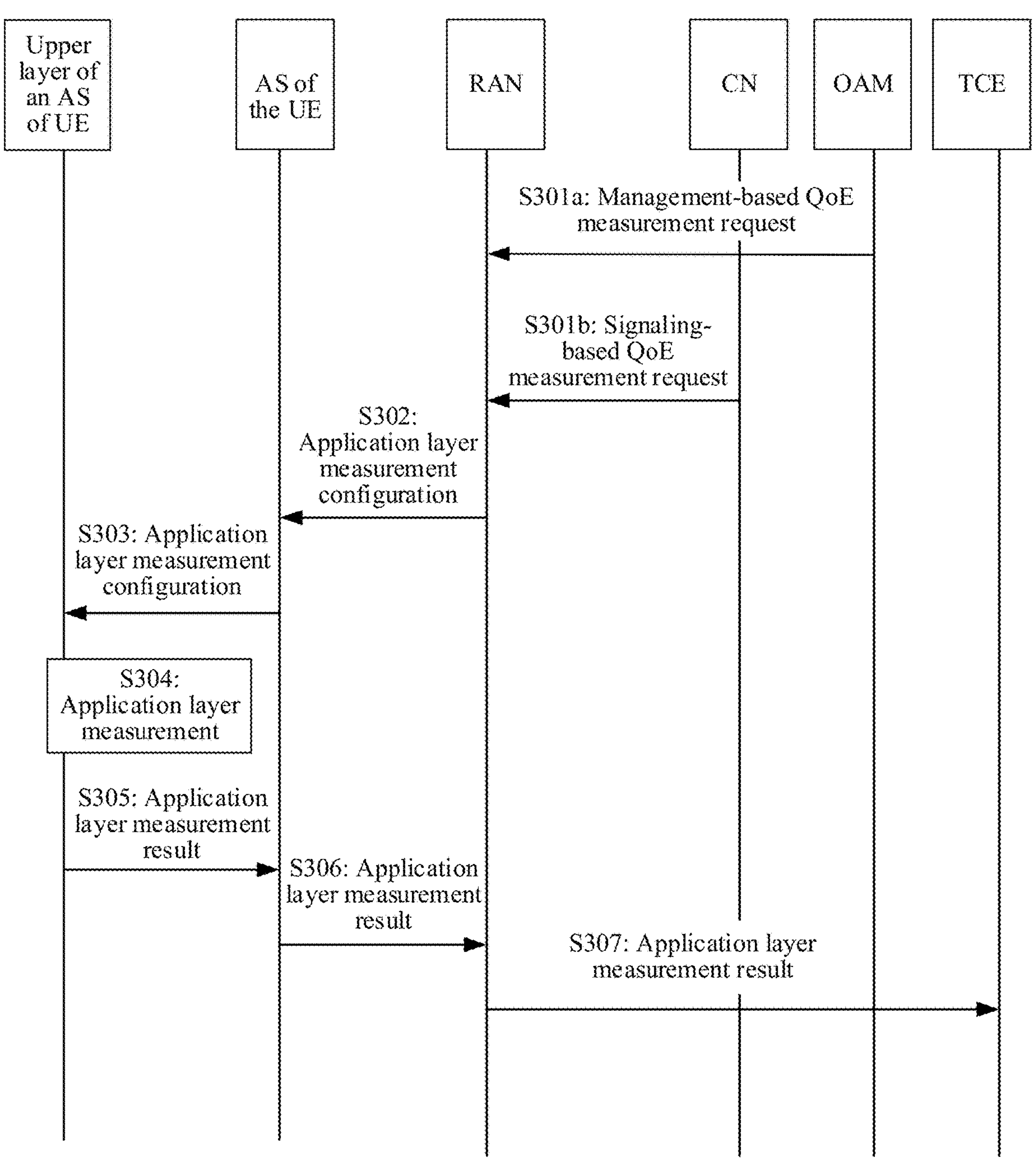
FIG. 3 is an interaction diagram of a basic procedure in which a terminal device currently performs a quality of experience measurement.

FIG. 3 is an interaction diagram of a basic procedure in which a terminal device currently performs QoE measurement.

S301. A RAN receives QoE measurement configuration information.

Step S301 may be specifically implemented in a plurality of manners, for example, the following S301*a* or S301*b*, and both S301*a* and S301*b* may be performed.

S301*a*. A RAN receives QoE measurement configuration information from a CN.

For a signaling-based QoE measurement, a RAN obtains QoE measurement configuration information from a CN. The QoE measurement configuration information includes application layer measurement configuration information.

For example, the QoE measurement configuration information includes a container (container), and the container includes the application layer measurement configuration information. A CN notifies the QoE measurement configuration information for a specific UE. For example, the QoE measurement configuration information is sent with an interface message between the RAN and the CN for UE.

S301*b*. A RAN receives QoE measurement configuration information from an OAM.

For a management-based QoE measurement, a RAN obtains QoE measurement configuration information from an OAM or an EM. The QoE measurement configuration information includes application layer measurement configuration information. For example, the QoE measurement configuration information may be carried with an information element (IE), where the IE includes a container, and the container includes the application layer measurement configuration information. The OAM or EM does not notify the RAN of QoE measurement configuration information for a specific UE, but the RAN determines to send the QoE measurement configuration information to UE.

Unless otherwise specified, the QoE measurement configuration information in this application is QoE measurement configuration information sent by the CN, the OAM, or the EM to the RAN. The application layer measurement configuration information refers to the application layer measurement configuration in a container in the QoE measurement configuration information. It should be understood that the application layer measurement configuration in this application also includes configuration information that is actively initiated by the RAN based on its own requirement and that is corresponding to the application layer measurement of the measurement result reported by the UE that the RAN can perceive.

In addition, the CN or the OAM may further notify a base station that the application layer measurement configuration information for the UE includes enabling the UE to report the following application layer indicators, where the application layer indicators may be the following indicators:

(1) Average throughput: This indicator indicates the total number of bits received at the application layer of UE in a measurement interval. For example, for a streaming service. For details, refer to a 3GPP streaming media-related protocol, for example, TS26.247. The measurement interval is, for example, a preset time interval such as 5 ms, 10 ms, 1 s, or 5 s.

(2) Initial playback delay: This indicator indicates the initial playback delay when the streaming media starts to be presented. For example, it may be specifically defined as from a time point of acquiring the first segment of the media to a time point of extracting the streaming media from the buffer of the client. For details, refer to a 3GPP streaming media-related protocol, for example, TS26.247.

(3) Buffer level: This indicator indicates the duration or amount of media data that can be played from the current playback moment. For details, refer to a 3GPP streaming media-related protocol, for example, TS26.247.

(4) Playback delay: This indicator indicates the playback delay in starting streaming media. For example, it may be specifically defined as a delay from the time when a dynamic adaptive streaming over HTTP (DASH) player receives a playback or rollback or starts triggering to the time when the media is played. For details, refer to a 3GPP streaming media-related protocol, for example, TS26.247.

(5) Duration of deterioration: This indicator indicates the interval between the Nepal Time (Nepal Time, NPT) corresponding to the last good frame (good frame) before deterioration and the Nepal Time corresponding to the first subsequent good frame. A good frame is a frame that is completely received (complete reception means that all bits of the frame are correctly received), and all parts of the frame contain correct content, or the frame is a new frame (that is, it does not depend on any previously decoded frame) or only depends on a previously decoded good frame. For details, refer to a 3GPP multimedia telephony-related protocol, for example, TS26.114.

(6) Number of consecutive packet losses: This indicator indicates the number of consecutively lost real-time transport protocol (RTP) messages. For details, refer to a 3GPP multimedia telephony-related protocol, for example, TS26.114.

(7) Jitter duration: Jitter means that the difference between the actual playback moment and the expected playback moment of a frame exceeds a threshold. The expected playback moment of a frame is a playback moment of a previous playback frame plus (the difference between the NPT of the current frame and the NPT of the previous playback frame). For details, refer to a 3GPP multimedia telephony-related protocol, for example, TS26.114.

(8) Out-of-frame duration: Out-of-frame means that the absolute time difference between a value A and a value B exceeds a threshold. The value A herein means a difference between a playback moment of a previous playback frame of a video streaming and a playback moment of a previous playback frame of a voice streaming. The value B herein refers to a difference between a wanted playout moment of the previous playout frame of the video stream and a wanted playout moment of the previous playout frame of the voice stream. For details, refer to a 3GPP multimedia telephony-related protocol, for example, TS26.114.

(9) Round-trip delay: This indicator indicates the round-trip time at the RTP level, plus the extra two-way delay caused by buffering and other processing in a client (RTP Level>Speaker>Microphone>RTP Level). For details, refer to a 3GPP multimedia telephony-related protocol, for example, TS26.114.

(10) Average bit rate: This indicator indicates a bitrate at which codec media information is valid in a measurement period. For details, refer to a 3GPP multimedia telephony-related protocol, for example, TS26.114.

(11) Comparable quality viewport switching latency (comparable quality viewport switching latency): This indicator reports the delay and quality-related factors when the quality deteriorates due to angle movement. Quality-related factors include quality ranking value (quality ranking value) and resolution. For details, refer to a 3GPP VR-related protocol, for example, TS26.118.

(12) Freezing: This indicator indicates whether freezing occurs during video streaming playback or the duration of freezing. For details, refer to 3GPP streaming media-related protocols, such as TS26.247.

S302. A RAN sends an application layer measurement configuration to UE.

For a signaling-based QoE measurement, the RAN sends the application layer measurement configuration information to the corresponding UE. The RAN also determines whether to configure QoE measurement for the UE based on whether the UE supports QoE measurement.

For a management-based QoE measurement, the RAN selects an appropriate UE to perform QoE measurement according to the QoE measurement configuration sent by an OAM or an EM, whether the UE supports a corresponding QoE measurement, and some other factors. After selecting the UE, the RAN sends the application layer measurement configuration information to the UE.

The RAN sends, to the UE with an RRC message, the application layer measurement configuration information obtained from the CN, the OAM, or the EM, where the message also carries a service type corresponding to the application layer measurement configuration information. As an example, the RAN sends the application layer measurement configuration information to the UE in a form of a container. However, a sending form of the application layer measurement configuration information is not limited in this application.

It should be noted that the RAN may also trigger, by itself, the configuration of the application layer measurement configuration information for the UE, which is not limited to triggering when the command of step S301*a* or S301*b* needs to be received.

Further, in addition to sending the application layer measurement configuration information to the UE, the RAN may further transmit some configuration information about the measurement results perceived by the RAN to the UE, and indicate that the UE reports some application layer indicators in a form (for example, a form of an information element) that can be perceived by the RAN. In this way, the RAN can know corresponding application layer indicator measurement results, or the RAN may indicate that the UE reports a comprehensive score of an application layer indicator, a comprehensive score of an access stratum indicator, or a comprehensive score obtained by combining an application layer indicator and an access stratum indicator, or an indicator indicating the quality of an application layer indicator (for example, a value may be good, medium, or poor). In this case, the application layer measurement configuration information may also be referred to as including some configuration information about the measurement result perceived by the RAN. In addition, the RAN may not need to transmit some configuration information about the measurement result perceived by the RAN to the UE. After the UE obtains the application layer indicators, the UE reports to the RAN some application layer indicators that are specified in the protocol and can be obtained by the UE currently, or a comprehensive score of an application layer indicator, or a comprehensive score of an access stratum indicator, or a comprehensive score obtained by combining an application layer indicator and an access stratum indicator, or an indicator indicating whether an application layer indicator is good or bad.

S303. The access stratum AS of the UE sends the application layer measurement configuration information to an upper layer of the AS of the UE.

The AS of the UE herein may be an RRC layer, or may be an SDAP layer or a PDCP layer.

An upper layer of the AS of the UE herein may be an application layer, or may be a layer having a QoE measurement function.

The AS of the UE sends the application layer measurement configuration information and the service type to an upper layer of the AS of the UE.

The upper layer of the AS of the UE performs QoE measurement according to the application layer measurement configuration information.

Further, in addition to sending the application layer measurement configuration information to the upper layer of the AS, the AS of the UE further sends, to the upper layer of the AS of the UE, some application layer indicator configuration information that is received from the RAN and reported in a form that can be perceived by the RAN.

S304. An upper layer of the AS of the UE performs application layer measurement.

S305. The upper layer of the AS of the UE sends the application layer measurement result to the AS of the UE.

The application layer measurement result includes the measurement result corresponding to the foregoing application layer indicator.

The upper layer of the AS of the UE follows a rule (for example, the rule is contained in the application layer measurement configuration information) to report the application layer measurement result. For example, the upper layer of the AS of the UE periodically reports the application layer measurement result. Alternatively, for example, the UE may report the application layer measurement result only after a session ends.

When the upper layer of the AS of the UE needs to report the application layer measurement results according to the application layer measurement configuration information, the upper layer of the AS of the UE sends the application layer measurement results to the AS of the UE, and the upper layer of the AS of the UE indicates a service type corresponding to the QoE measurement result.

In addition, in addition to reporting an application layer measurement result invisible to the RAN, an upper layer of the AS of the UE may further report a measurement result visible to the RAN (for example, an application layer indicator, a comprehensive score, or an indicator of an application layer indicator reported in a form of an information element).

S306. The AS of the UE sends the application layer measurement result to the RAN.

The AS of the UE sends the application layer measurement result and the corresponding service type to the RAN. For example, the information is carried in a sent uplink RRC message. For example, the application layer measurement result is sent to the RAN in a form of a container.

It should be noted that the RAN that sends the application layer measurement configuration information to the UE and the RAN that receives the application layer measurement result may not be a same RAN, or may be a same RAN.

In addition, in addition to reporting an application layer measurement result invisible to the RAN, the AS of the UE may further report a measurement result visible to the RAN (for example, an application layer indicator, a comprehensive score, or an indicator of an application layer indicator reported in a form of an information element).

S307. The RAN sends the application layer measurement result to a TCE.

In addition, the RAN may optimize radio resources according to a measurement result that is visible to the RAN and reported by the UE (for example, when a measurement result of an application layer indicator is not ideal, a base station can allocate more resources to the UE, or increase a scheduling priority of the UE).

A scenario in which a terminal device supports two SIMS is also referred to as supporting two user identities by the terminal device in this application. According to 3GPP specifications, dual SIM cards are classified into the following types:

(1) Passive: Two cards share one transceiver. Only one SIM card can be selected for use at any time (similar to mobile phone users who can only manually switch which card is currently used).

(2) Dual SIM dual standby (DSDS): Two cards share one transceiver. Two SIM cards can be in the RRC_IDLE mode (RRC_IDLE) at the same time. However, because only one transceiver is configured in the DSDS mobile phone, the DSDS mobile phone can only realize dual SIM dual standby, but cannot realize dual card communication at the same time.

For example, when a SIM performs voice data transmission with a transceiver, because the SIM completely occupies the transceiver, another SIM cannot receive a paging (paging) request because no transceiver is available, and cannot answer a call.

(3) Dual SIM dual active (DSDA): Each card has a dedicated separate transceiver and is not dependent on each other. The two cards can be RRC_IDLE or RRC_CONNECTED at the same time.

According to the requirements of 3GPP, the upper layer of the AS of the UE verifies the application layer measurement configuration only at the beginning of each session. Therefore, the application layer measurement configuration of the started session is not affected by any application layer measurement configuration change received during the session period. Currently, when the UE supporting a single SIM performs QoE measurement, if the application layer measurement configuration is received twice successively, an upper layer of the AS of the terminal device performs application layer measurement according to the first received application layer measurement configuration, and then receives the second application layer measurement configuration. Application layer measurement that has been started according to the first application layer measurement configuration is not affected, and application layer measurement that has not been started yet adopts a later received second application layer measurement configuration. The foregoing case, the second application layer measurement configuration may be described as covering the first application layer measurement configuration. In addition, in a single SIM scenario, the management-based QoE measurement configuration cannot cover the signaling-based QoE measurement configuration.

When QoE measurement is performed on the UE in a multi-SIM scenario, if a regulation or principle of the UE supporting a single-SIM scenario is used, a plurality of SIMs may affect each other, so that a network side cannot collect an accurate QoE measurement result, and even cannot collect a QoE measurement result. Specifically, the possible problems are as follows:

(1) The QoE measurement configuration of the first SIM may be covered by the measurement configuration of the second SIM.

As an example, Base station 1 configures QoE measurement for a first SIM, and Base station 2 may also configure QoE measurement for a second SIM. The base station 1 and the base station 2 herein may be a same base station, or may be different base stations. Even if they are a same base station, the base station does not know that the two SIMs are corresponding to a same terminal device. When the first SIM of the terminal device has received the QoE measurement configuration, if another second SIM also receives the QoE measurement configuration subsequently, the QoE measurement configuration in the first SIM may be covered by the QoE measurement configuration of the second SIM (the QoE measurement configuration herein mainly means the QoE measurement configuration corresponding to the subsequent sessions), or more specifically, as a result, the management-based QoE measurement configuration of the second SIM may cover the signaling-based QoE measurement configuration of the first SIM. In this way, the QoE measurement configuration corresponding to the first SIM is discarded or covered, and the QoE measurement result of a related service in the first SIM cannot be collected. It should be noted that the "QoE measurement of the first SIM" in this application refers to the QoE measurement for a first identity; the "QoE measurement of the second SIM" refers to the QoE measurement for a second identity. Similarly, similar expressions mentioned in this application also express corresponding meanings.

(2) A network side may fail to obtain a desired measurement result.

A terminal device first performs QoE measurement on the session of the first SIM based on the application layer measurement configuration received with the first SIM, and then receives the application layer measurement configuration with the second SIM. If the application layer measurement configuration first received by the terminal device with the first SIM is different from the application layer measurement configuration later received with the second SIM, the subsequent QoE measurement of a new session in the first SIM may be performed according to the QoE measurement configuration received with the second SIM. In this way, a QoE measurement result subsequently reported with the first SIM may not be performed according to a QoE measurement configuration transmitted by the network side to the first SIM. In this case, the network side cannot obtain a desired measurement result. As an example, the QoE measurement configuration transmitted by the network side with the first SIM is to enable the terminal device to collect a throughput related to the streaming media service, but a buffer level related to the streaming media is reported with the QoE measurement result reported by the first SIM.

(3) A network side cannot know that QoE measurement of a first SIM is interrupted, suspended, or stopped due to a service of a second SIM.

For example, when the terminal device supports the DSDS function and the mobile phone performs application layer measurement corresponding to the first SIM, the RRC state corresponding to the first SIM may enter the inactive (RRC_INACTIVE) state due to a service of the second SIM, so that the application layer measurement corresponding to the first SIM is paused, interrupted, or even terminated. The terminal device may subsequently restart the application layer measurement corresponding to the first SIM. For another example, when the terminal device supports the DSDA function and performs the application layer measurement corresponding to the first SIM, the terminal device receives the application layer measurement corresponding to the second SIM, which may cause the application layer measurement corresponding to the first SIM to suspend, interrupt, or even terminate.

However, when a network side sends the QoE measurement result of the first SIM to a TCE, the TCE does not know that a service of the first SIM is interrupted, suspended, or terminated. In this way, when the QoE measurement result is analyzed, the QoE measurement result does not show what happened during this period. As a result, analysis errors may occur. As an example, if the foregoing case occurs during the QoE measurement of a streaming media service, the TCE may consider that freezing occurs in the streaming media during subsequent analysis of the result.

Figure 4:
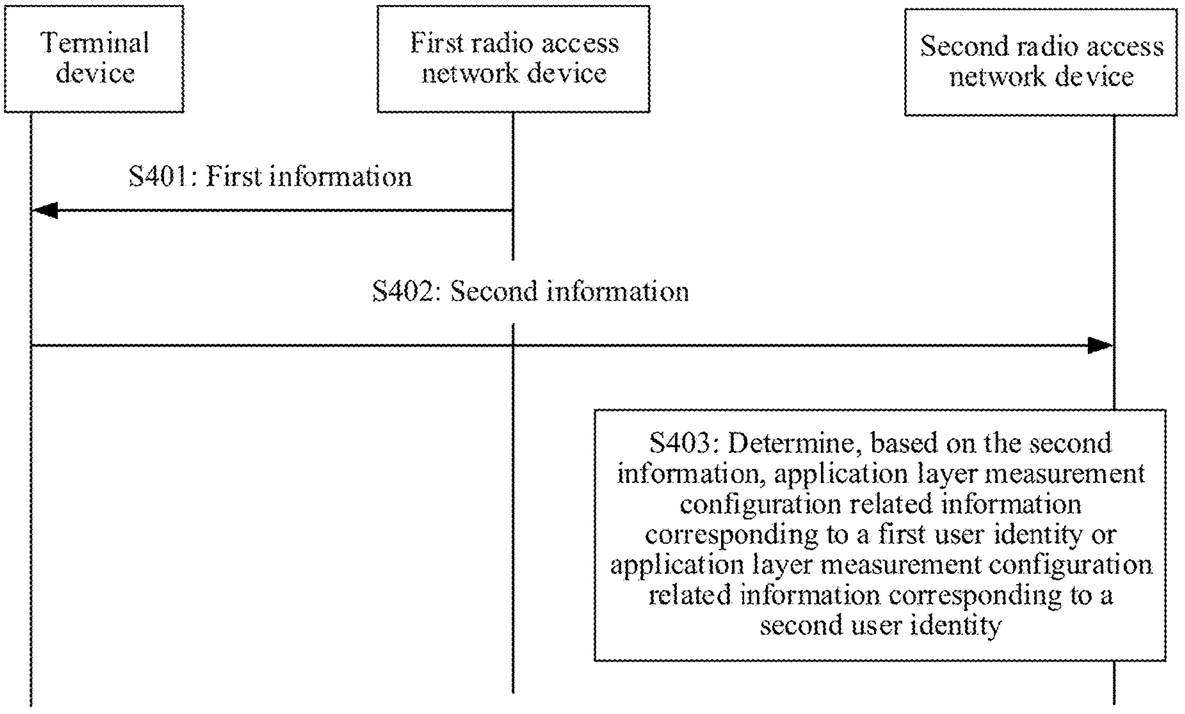
FIG. 4 is a schematic flowchart of a QoE measurement method according to this application.

FIG. 4 is a schematic flowchart of a QoE measurement method according to this application. As shown in FIG. 4, the method 400 includes the following steps:

S401. A terminal device receives first information from a first radio access network device.

Specifically, a terminal device receives the first information with a first user identity, where the first information includes first related information of application layer measurement corresponding to the first user identity. The first related information may include an application layer measurement configuration. Further, the measurement type and/or service type corresponding to the application layer measurement configuration may be included. It should be understood that the terminal device is connected to the first radio access network device with a first user identity. Alternatively, the connection between the terminal device and the first radio access network device may be described as a connection that provides a service for the first user identity.

S402. A terminal device sends second information to a second radio access network device.

Specifically, a terminal device determines second information based on first information, and the terminal device sends the second information with a second user identity, where the second information includes the second related information of application layer measurement corresponding to a first user identity or a second user identity.

"A terminal device determines second information based on first information" includes the following several possible implementations.

In a possible manner 1, the terminal device directly sends the content indicated by the first information to a second radio access network device without processing or determining the first information. Specifically, if the first information received by the terminal device indicates the application layer measurement related information corresponding to the first user identity, the second information sent by the terminal device also includes only the application layer measurement configuration related information corresponding to the first user identity. That is, the first related information is consistent with the second related information.

In a possible manner 2, the terminal device processes and determines the first information, determines the second information, and then sends the second information to the second radio access network device. Specifically, the terminal device determines, based on the application layer measurement related information that is corresponding to a first user identity and that is indicated by first information, an application layer measurement configuration related information corresponding to a second user identity. That is, the first related information is related to the application layer measurement corresponding to the first user identity, and the second related information is related to the application layer measurement corresponding to the second user identity.

The "second related information" corresponding to the first user identity may be whether the terminal device configures application layer measurement with the first user identity, or a service type and/or a measurement type corresponding to application layer measurement configured by the terminal device with the first user identity, or a service type and/or a measurement type corresponding to application layer measurement that the terminal device may configure with the first user identity, or a service type and/or a measurement type corresponding to application layer measurement that the terminal device may not configure with the first user identity.

Specifically, "whether the terminal device configures application layer measurement with the first user identity" herein is that the terminal device configures application layer measurement with the first user identity, or the terminal device does not configure application layer measurement with the first user identity.

The "second related information" corresponding to the second user identity may be whether the terminal device can configure application layer measurement with the second user identity, or a service type and/or a measurement type corresponding to application layer measurement that the terminal device can configure with the second user identity; or a service type and/or a measurement type corresponding to application layer measurement that the terminal device cannot configure with the second user identity. Specifically, "whether the terminal device can configure application layer measurement with the second user identity" herein is that the terminal device is allowed to configure application layer measurement with the second user identity, or the terminal device is prohibited from configuring application layer measurement with the second user identity. It should be noted that the second information may further indicate whether the terminal device configures application layer measurement, or a service type and/or a measurement type that are/is corresponding to application layer measurement configured by the terminal device, or a service type and/or a measurement type that are/is corresponding to application layer measurement that may be configured by the terminal device.

It should be noted that in this application, the meaning of "the terminal device is allowed" to perform a first event is the same as that of "the terminal device may" perform a first event. In this application, the meaning of "the terminal device is prohibited from" performing a first event is the same as that of "the terminal device cannot" perform a first event.

It should be understood that the connection between the terminal device and the second radio access network device with the second user identity may also be described as a connection between the terminal device and the second radio access network device that provides a service for the second user identity. The first radio access network device and the second radio access network device may be a same access network device, or may be different access network devices.

Optionally, step S402 may be replaced with the following step:

Step 1: sending, by the terminal device, identification information corresponding to a target cell to a first radio access network device, where the target cell is a cell that is managed by a second radio access network device and that serves the terminal device. For example, the identification information corresponding to the foregoing target cell may be a cell identifier of the target cell, such as, a cell global identifier (CGI) of a primary serving cell corresponding to the second user identity, or a physical cell identifier (PCI) of a primary serving cell corresponding to the second user identity.

Step 2: a first radio access network device sends second information to a second radio access network device.

Specifically, the first radio access network device determines, based on the identification information that is corresponding to the target cell sent by the terminal device, the second radio access network device corresponding to the second user identity. Then, the first radio access network device sends the second information to the second radio access network device.

The content of the second information is the same as that in step S402, and details are not described herein again.

S403. The second radio access network device determines, according to the second information, third related information of application layer measurement corresponding to the first user identity or the second user identity.

It should be understood that the foregoing content determined by the second radio access network device based on the second information in step S403 includes several possible implementations.

In a possible manner 1, when the second radio access network device does not determine the second information, the content determined by the second radio access network device in step S403 is directly determined based on the second information. For example, if the second information indicates the second related information of application layer measurement corresponding to the first user identity, the second radio access network device can determine only the third related information of application layer measurement corresponding to the first user identity. That is, the content indicated by the second related information is consistent with the content indicated by the third related information.

In a possible manner 2, when the second radio access network device determines the second information, the second radio access network device may determine, based on application layer measurement related information corresponding to one user identity, an application layer measurement related information corresponding to another user identity. For example, if the second information indicates the second related information of application layer measurement corresponding to the first user identity, the second radio access network device may determine the third related information of application layer measurement corresponding to the second user identity.

In embodiments of this application, a terminal device reports application layer measurement related information corresponding to a first user identity or a second user identity to a network side corresponding to a second user identity. The network side may determine application layer measurement configuration that can be configured for the second user identity based on the information reported by the terminal device. Mutual impact on application layer measurement corresponding to two user identities can be reduced, thereby avoiding a problem that a network side cannot collect a quality of experience measurement result or the collected quality of experience measurement result is inaccurate.

Figure 5:
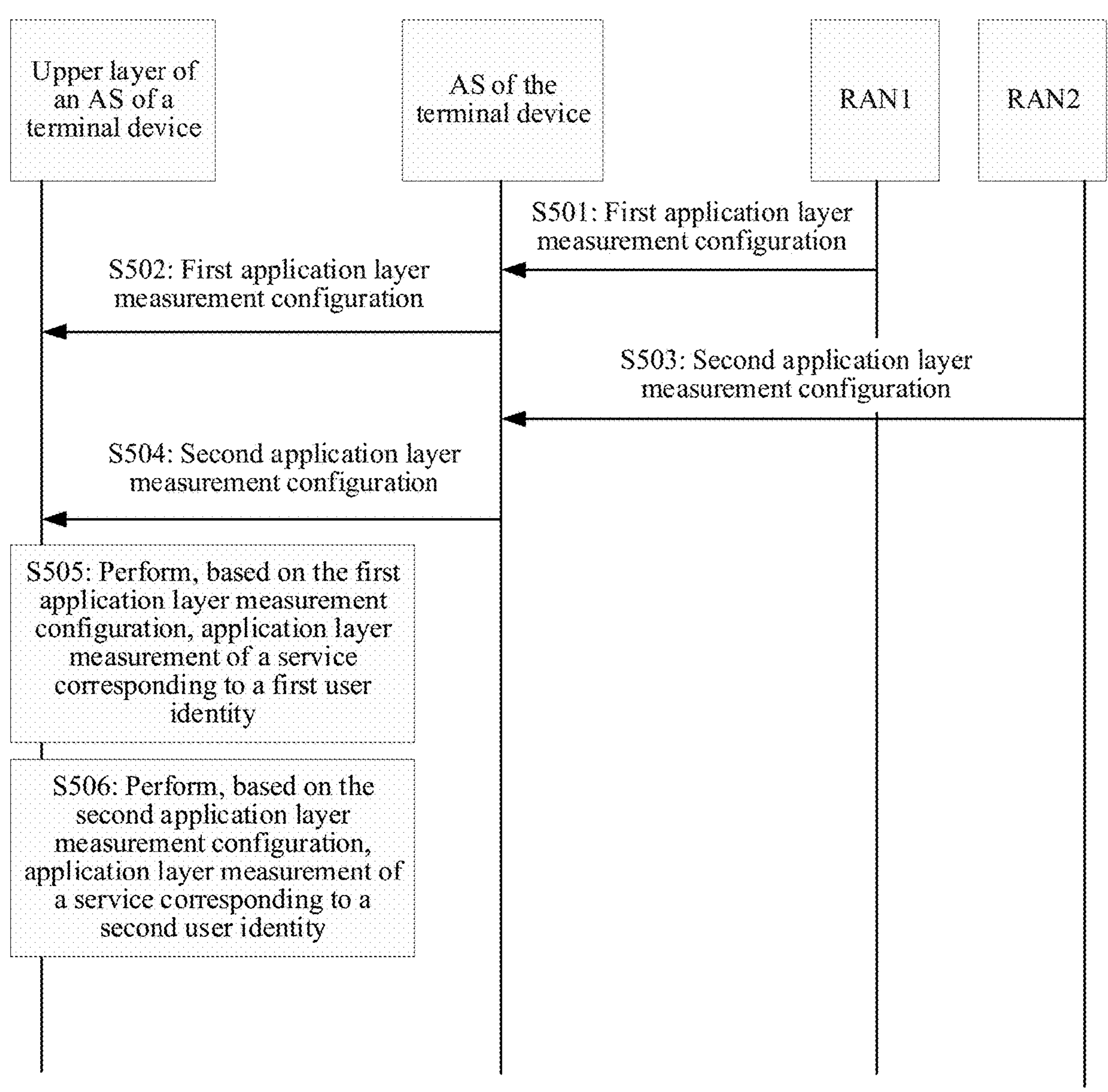
FIG. 5 is a schematic flowchart of another QoE measurement method according to this application.

FIG. 5 is a schematic flowchart of another QoE measurement method according to this application. As shown in FIG. 5, the method 500 includes the following steps:

S501. A RAN1 sends first application layer measurement configuration to an AS of a terminal device.

Specifically, the first application layer measurement configuration is corresponding to the first user identity, and the terminal device is connected to the RAN1 with the first user identity. It may also be understood that the RAN1 sends the first application layer measurement configuration to the AS of the terminal device with the connection to the first user identity.

S502. The AS of the terminal device sends first application layer measurement configuration to an upper layer of the AS of the terminal device.

It should be understood that an upper layer of the AS may be an application layer, or a layer between the AS and an application layer.

S503. The RAN2 sends second application layer measurement configuration to the AS of the terminal device.

Specifically, the second application layer measurement configuration is corresponding to the second user identity, and the terminal device is connected to the RAN2 with the second user identity. It may also be understood that the RAN2 sends the second application layer measurement configuration to the AS of the terminal device with the connection to the second user identity.

The RAN1 and the RAN2 are the first access network and the second access network respectively. The RAN1 and the RAN2 may be a same RAN, or may be different RANs.

S504. The AS of the terminal device sends second application layer measurement configuration to an upper layer of the AS of the terminal device.

S505. The upper layer of the AS performs, based on the first application layer measurement configuration, an application layer measurement of the service corresponding to the first user identity.

S506. The upper layer of the AS performs, based on the second application layer measurement configuration, an application layer measurement of the service corresponding to the second user identity.

It should be understood that, in this solution, regardless of whether application layer measurement of a service performed by the terminal device based on the first application layer measurement configuration starts when the upper layer of the AS receives the second application layer measurement configuration, the first application layer measurement configuration is not covered by the second application layer measurement configuration. In other words, the first application layer measurement configuration and the second application layer measurement configuration are independent of each other.

In embodiments of this application, through specifying that application layer measurement configurations corresponding to a plurality of user identities is independent of each other in an upper layer of an AS of a terminal device, mutual impact on application layer measurement corresponding to a plurality of user identities of a terminal device can be reduced, thereby avoiding a problem that a network side cannot collect a quality of experience measurement result or the collected quality of experience measurement result is inaccurate.

Figure 6:
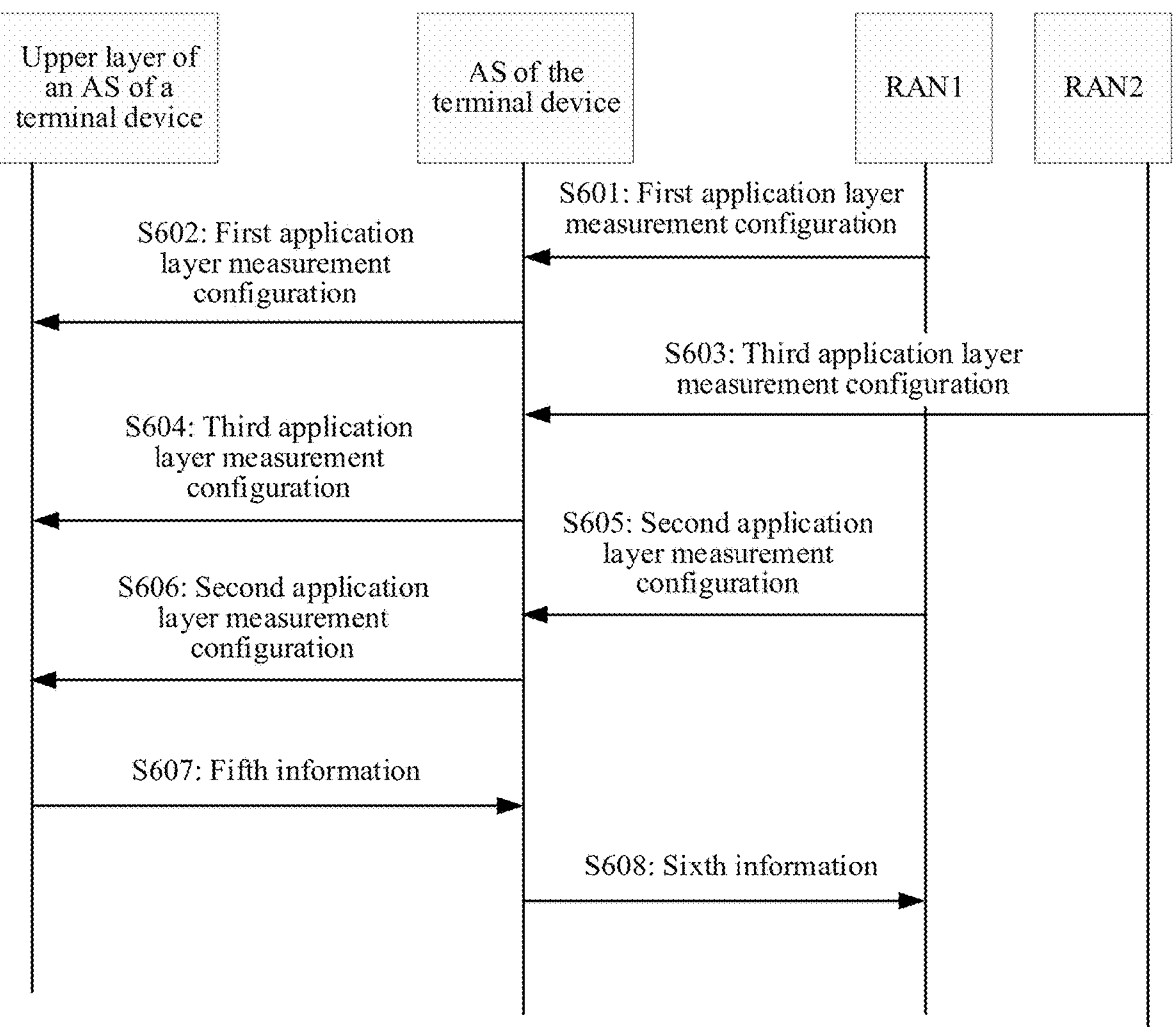
FIG. 6 is a schematic flowchart of another QoE measurement method according to this application.

FIG. 6 is a schematic flowchart of another QoE measurement method according to this application. As shown in FIG. 6, the method 600 includes the following steps:

S601. A RAN1 sends first application layer measurement configuration to an AS of a terminal device.

Specifically, the terminal device is connected to the RAN1 with a first user identity, and the first application layer measurement configuration is corresponding to the first user identity.

S602. The AS sends first application layer measurement configuration to an upper layer of the AS of the terminal device.

S603. The RAN2 sends third application layer measurement configuration to the AS.

Specifically, the terminal device is connected to the RAN2 with a second user identity, and the third application layer measurement configuration is corresponding to the second user identity.

S604. The AS sends third application layer measurement configuration to an upper layer of the AS.

S605. The RAN1 sends second application layer measurement configuration to the AS.

Specifically, the terminal device is connected to the RAN1 with a first user identity, and the second application layer measurement configuration is corresponding to the first user identity.

S606. The AS sends the second application layer measurement configuration to an upper layer of the AS.

S607. An upper layer of the AS sends fifth information to the AS.

In a possible case 1, step S603 and step S604, and step S605 and step S606 are performed before step S607. In this case, the fifth information indicates that application layer measurement that uses the first application layer measurement configuration is suspended or terminated, or application layer measurement using the second application layer measurement configuration is started, or the fifth information indicates that application layer measurement of the first user identity is suspended or terminated due to application layer measurement of another user identity, or indicate application layer measurement of another user identity is started.

In a possible case 2, step S607 is performed before step S603 and step S604, and the fifth information indicates that application layer measurement that uses the first application layer measurement configuration is suspended or terminated, or the fifth information indicates that application layer measurement of the first user identity is suspended or terminated due to application layer measurement of another user identity.

S608. The AS sends sixth information to the RAN1.

Specifically, the content indicated by the sixth information is the same as the content indicated by the fifth information.

In embodiments of this application, when application layer measurement corresponding to a first user identity is interrupted, terminated, or restarted due to a service corresponding to a second user identity, a terminal device reports to a network side that application layer measurement is affected, thereby reducing errors in subsequent analysis of application layer measurement results by the network side.

Figure 7:
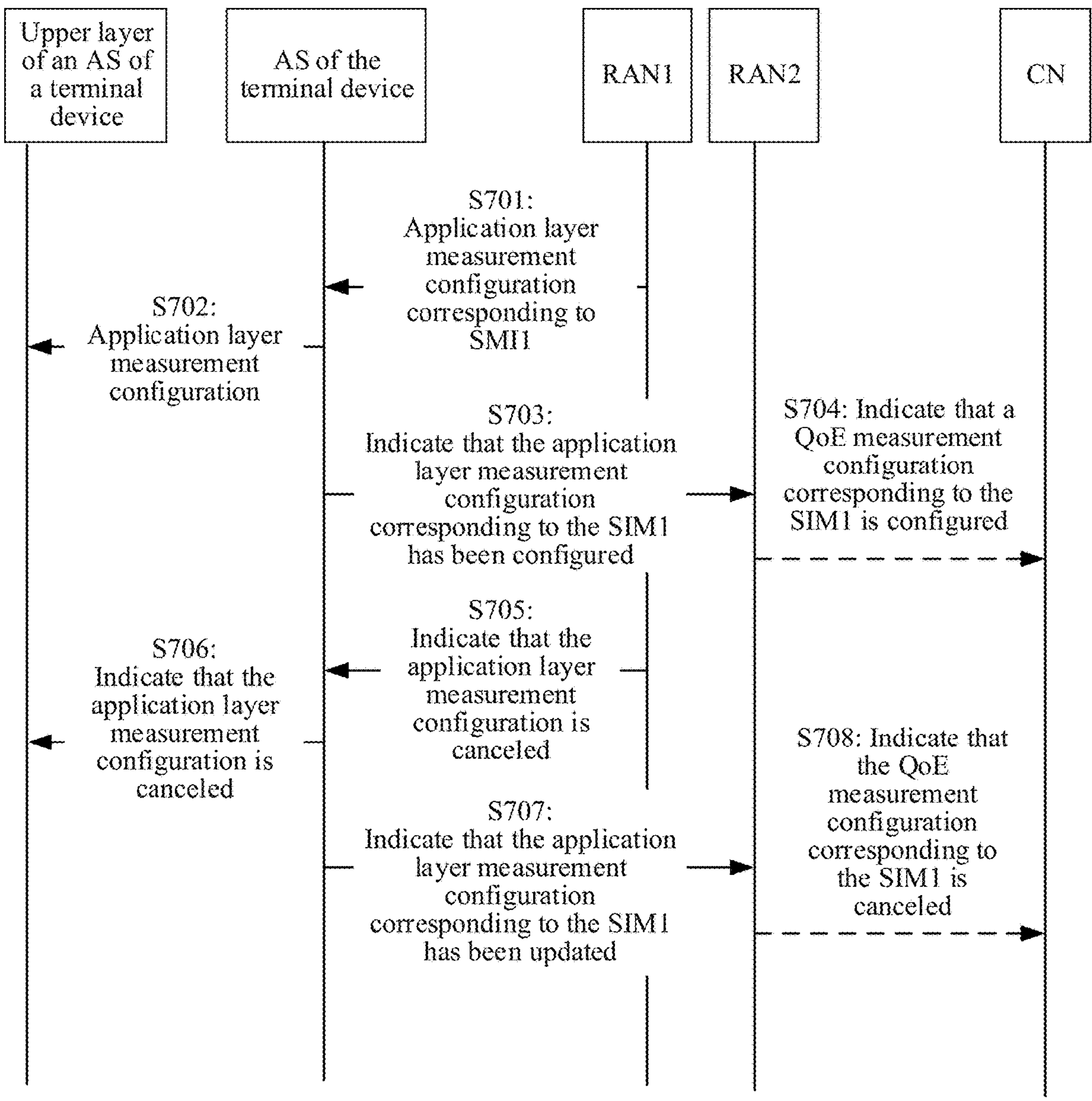
FIG. 7 is a schematic flowchart of another QoE measurement method according to this application.

FIG. 7 is a schematic flowchart of another QoE measurement method according to this application. As shown in FIG. 7, the method 700 includes the following steps:

S701. The RAN1 sends an application layer measurement configuration corresponding to the SIM1 to the terminal device.

The RAN1 may obtain signaling-based QoE measurement configuration information from a CN, or obtain management-based QoE measurement configuration information from an OAM or an EM, so as to trigger sending of the application layer measurement configuration information to the terminal device, or triggers by itself sending of the application layer measurement configuration information to the terminal device. For specific implementations, refer to steps S301*a*, S301*b*, and S302 in FIG. 3.

When sending the application layer measurement configuration to the terminal device, Base station 1 further notifies the service type corresponding to the application layer measurement configuration.

Further, when sending the application layer measurement configuration corresponding to the SIM1 to the terminal device, the RAN1 further notifies the QoE measurement type corresponding to the application layer measurement configuration, that is, whether the application layer measurement configuration corresponds to a management-based QoE measurement or a signaling-based QoE measurement, or QoE measurement triggered by the RAN itself.

It should be understood that, in all embodiments of this application, the terminal device is connected to the RAN1 with a user identity corresponding to the SIM1, and the terminal device is connected to the RAN2 with a user identity corresponding to the SIM2. The RAN1 and the RAN2 may be different or may be the same.

S702. The AS corresponding to the SIM1 of the terminal device sends application layer measurement configuration information to an upper layer of the AS.

For specific implementations, refer to step S303 in FIG. 3.

S703. The AS of the terminal device sends indication information to the RAN2, to notify the RAN2 that the terminal device has configured application layer measurement corresponding to the SIM1 or the terminal device has configured application layer measurement.

Further, the indication information may further carry a service type and/or a measurement type corresponding to application layer measurement (based on management or signaling, or triggered by the base station itself).

Specifically, the AS corresponding to the SIM2 in the terminal device notifies the base station 2 corresponding to the SIM2 that application layer measurement has been configured for the access stratum of the SIM1. The manners in which the AS corresponding to the SIM2 learns the information include but are not limited to the following several manners:

Manner 1: The ASs corresponding to the SIM1 and the SIM2 share a same entity or module, or the ASs corresponding to the SIM1 and the SIM2 are a same entity or module, and there is no interaction between the two SIMs, and the SIM2 may learn the configuration status of application layer measurement of the SIM1 through internal processing.

Manner 2: The ASs corresponding to two SIMs in the terminal device directly interact with each other. Specifically, the access stratum corresponding to SIM2 may learn, from the access stratum corresponding to SIM1, that the terminal device has received the application layer measurement configuration with the user identity corresponding to SIM1. Further, the service type and/or the measurement type corresponding to the application layer measurement configuration may be learned.

Manner 3: A layer or an application layer (referred to as an upper layer of the AS in this application) between the AS and the application layer learns that the terminal device has configured an application layer measurement configuration with a user identity corresponding to the SIM1, and then the layer notifies the foregoing information to an access stratum corresponding to the SIM2.

Alternatively, step S703 may be further as follows: The AS of the terminal notifies the base station 2 corresponding to the SIM2 that a service type and/or a measurement type corresponding to QoE measurement configuration that can be configured for the SIM2 of the UE or that QoE measurement cannot be configured for the SIM2 of the UE.

Specifically, the access stratum of the terminal determines, according to application layer measurement received with the connection corresponding to the SIM1, the service type and/or the measurement type corresponding to the application layer measurement configuration that can be received by the terminal device with the connection corresponding to the SIM2. The determining process includes the following possible implementations:

In a possible manner 1, if application layer measurement has been configured for SIM1, an application layer measurement cannot be configured for SIM2.

In a possible manner 2, if the SIM1 has configured application layer measurement corresponding to the first service type, the SIM2 cannot or is prohibited from configuring application layer measurement corresponding to the first service type, or the SIM2 may configure application layer measurement corresponding to a service type other than the first service type.

In a possible manner 3, if application layer measurement corresponding to the first measurement type has been configured for the SIM1, application layer measurement corresponding to the first measurement type cannot be configured for the SIM2, or application layer measurement corresponding to a measurement type whose priority is higher than that of the first measurement type may be configured for the SIM2.

In a possible manner 4, if the SIM1 has configured application layer measurement corresponding to the first service type and the first measurement type, the SIM2 cannot configure application layer measurement corresponding to the first service type and the first measurement type, or the SIM2 may configure application layer measurement corresponding to a service type other than the first service type, and application layer measurement corresponding to the first service type and a measurement type whose priority is higher than that of the first measurement type.

It should be understood that a specific determining process may further include another possible manner. This is not limited in this application.

It should be noted that there is no strict order between steps S702 and S703.

Optionally, step S703 may be replaced with the following steps:

Step 1: sending, by the terminal device, identification information corresponding to a target cell to a first radio access network device, where the target cell is a cell that is managed by a second radio access network device and that serves the terminal device. For example, the identification information corresponding to the foregoing target cell may be a cell identity of the target cell, such as, a CGI or a PCI of a primary serving cell corresponding to the second user identity.

Step 2: sending, by the first radio access network device, indication information to the second radio access network device.

Specifically, the first radio access network device determines, based on the identification information that is corresponding to the target cell sent by the terminal device, the second radio access network device corresponding to the second user identity. Then, the first radio access network device sends the indication information to the second radio access network device.

The content of the indication information is the same as that in step S703, and details are not described herein again.

S704. The RAN2 notifies a core network device corresponding to the SIM2 that QoE measurement configuration has been performed for the SIM1 or application layer measurement has been configured for the terminal device.

It should be understood that S704 is merely one of behaviors that can be performed by the RAN2, and the behaviors that can be specifically implemented by the RAN2 may include but are not limited to the following:

Manner 1: The RAN2 reports the application layer configuration status of the SIM1 and/or the SIM2 to the core network device.

In a possible case 1, in S703, the indication information sent by the terminal device to the RAN2 notifies the related information of application layer measurement of the SIM1 (that is, the terminal device has configured application layer measurement corresponding to the SIM1 or the terminal device has configured the application layer measurement).

The RAN2 directly reports the application layer measurement related information of the SIM1 to the core network device.

Specifically, the RAN2 may notify the core network device currently connected to the SIM2 that QoE measurement configuration has been configured for the SIM1 or application layer measurement has been configured for the terminal device. Further, the core network device may be notified of a service type and/or a measurement type corresponding to the QoE measurement configuration.

Alternatively, the RAN2 determines an application layer measurement configuration status of the SIM2 based on the indication information sent by the terminal device, and then reports, to the core network device, an application layer measurement configuration status that can be configured for the SIM2.

Specifically, the RAN2 may notify a core network currently connected to the SIM2 of a service type and/or a measurement type corresponding to QoE measurement configuration that can be configured for the SIM2.

In a possible case 2, in S703, the indication information sent by the terminal device to the RAN2 notifies the application layer measurement configuration status of the SIM2 (that is, a service type and/or a measurement type corresponding to QoE measurement configuration that can be configured for the SIM2).

The RAN2 directly reports the application layer measurement related information of the SIM2 to the core network device.

Specifically, the RAN 2 may notify a core network currently connected to the SIM 2 of a service type and/or a measurement type corresponding to QoE measurement configuration that can be configured for the SIM 2. Subsequently, the core network connected to the SIM2 may determine, according to a service type and/or a measurement type corresponding to QoE measurement configuration that can be configured for the SIM2, whether to configure QoE measurement for the SIM2.

Manner 2: The RAN2 does not actively report the application layer measurement configuration status of the SIM1 and/or the SIM2 to the core network device. When the core network device transmits the application layer measurement configuration, the RAN2 feeds back a rejection message to the core network device based on the application layer configuration status of the SIM2 determined by the received indication information.

Specifically, the RAN2 determines, based on the indication information received in step S703, the service type and/or the measurement type corresponding to the QoE measurement configuration that can be configured for the SIM2. When the received application layer measurement configuration sent by the core network device corresponding to the SIM2 exceeds the capability range of the application layer measurement configuration that can be configured for the SIM2, a rejection message is fed back to the core network device. Further, the rejection message may carry a rejection reason.

As an example, the RAN2 determines, based on the received indication information sent by the terminal, that the terminal device cannot configure the application layer measurement configuration corresponding to the SIM2. When the RAN2 receives the signaling-based QoE measurement configuration about the SIM2 from a CN, the base station 2 feeds back a rejection message to the CN.

Further, as an example, the RAN2 receives the indication information sent by the terminal, and determines that the terminal device can configure the application layer measurement configuration corresponding to the SIM2, and the measurement configuration cannot be based on signaling. When the RAN2 receives the signaling-based QoE measurement configuration about the SIM2 from a CN, the base station 2 feeds back a rejection message to the CN.

It should be noted that, when the SIM1 is configured with the management-based QoE measurement configuration, and the RAN2 receives a signaling-based QoE measurement from a CN, the RAN2 may configure QoE measurement received from the CN for the user identity corresponding to the SIM2. This is because the signaling-based QoE measurement configuration has a higher priority than the management-based QoE measurement configuration.

As an example, the RAN2 receives the indication information sent by the terminal, and determines that the terminal device can configure an application layer measurement configuration corresponding to the SIM2, and a service type corresponding to the measurement configuration cannot be the first service type. The RAN2 feeds back a rejection message to the CN only when the service type corresponding to the signaling-based QoE measurement of the SIM2 received from the CN is the first service type. Optionally, the rejection message may carry a reason that indicates because the SIM1 configures QoE measurement configuration corresponding to the first service type.

Further, as an example, the RAN2 receives the indication information sent by the terminal, and determines that the terminal device can configure the application layer measurement configuration corresponding to the SIM2, and a service type corresponding to the QoE measurement configuration cannot be the first service type. A priority of a measurement type corresponding to the QoE measurement configuration is higher than that of the first measurement type. The RAN2 feeds back a rejection message to the core network device only when the indication information of the core network device received by the RAN2 is sending, to the terminal device corresponding to the SIM2, QoE measurement configuration corresponding to the first service and having a priority lower than that of the first measurement type. Specifically, when the service type of a management-based QoE measurement that is received by the RAN2 from the OAM is the same as the service type of the QoE measurement configuration that has been configured for the SIM1, the base station 2 does not select the terminal device corresponding to the SIM2 to configure QoE measurement.

S705. The RAN1 sends indication information to the terminal device, to indicate that the terminal device cancels QoE measurement configuration corresponding to the SIM1.

It should be understood that the base station 1 may trigger, based on various purposes, cancellation of QoE measurement corresponding to the SIM1, which is not limited in this application.

In a possible case 1, the RAN1 instructs the terminal device to cancel application layer measurement performed on some services of the SIM1, or cancel application layer measurement corresponding to some service types of the SIM1.

In a possible case 2, the RAN1 instructs the terminal device to cancel application layer measurement performed on the SIM1, or cancel application layer measurement corresponding to all service types of the SIM1.

S706. The AS of the terminal device instructs an upper layer of the AS to cancel QoE measurement.

Corresponding to step S705, the access stratum may only indicate that the upper layer cancels QoE measurement corresponding to some service types corresponding to the SIM1, or indicate that the upper layer cancels application layer measurement corresponding to all service types of the SIM1.

Alternatively, step S706 may be that the access stratum of the terminal device determines, based on the QoE measurement configuration received by the SIM1, QoE measurement information that can be received by the SIM2, such as, a service type and a QoE measurement type that are corresponding to QoE measurement that can be received.

S707. The AS of the terminal device notifies the RAN2 corresponding to the SIM2 that the SIM1 of the UE has updated the QoE measurement configuration.

Corresponding to possible case 1 in step S705, the AS of the terminal may notify the RAN2 of a remaining service type and/or a measurement type corresponding to application layer measurement corresponding to SIM1 after application layer measurement corresponding to some service types is canceled. Alternatively, the AS of the terminal may notify the RAN2 of canceled service types and/or measurement types corresponding to some application layer measurement. Alternatively, the access stratum of the terminal determines, based on the QoE measurement received by the SIM1, QoE measurement information that can be received by the SIM2, such as, a service type and/or a QoE measurement type corresponding to the QoE measurement that can be received.

Corresponding to possible case 2 in step S705, the AS of the terminal device notifies the base station 2 corresponding to the SIM2 that the access stratum of the SIM1 has completely canceled application layer measurement, or the access stratum of the SIM1 or the terminal device does not configure application layer measurement.

Specifically, the access stratum corresponding to the SIM2 learns, in a manner similar to that in S703, that the access stratum of the SIM1 has canceled QoE measurement.

S708. The RAN2 notifies the core network device corresponding to the SIM2 that the SIM1 has configured QoE measurement.

It should be understood that S708 is merely one of behaviors that can be performed by the RAN2, and the behaviors that can be specifically implemented by the RAN2 may include but are not limited to the following:

Corresponding to the possible case 1 in step S705, an implementation of the RAN2 in step S708 is similar to that in step S704.

Corresponding to the possible case 2 in step S705, the RAN2 in step S708 includes several implementations:

Manner 1: The RAN2 reports, to the core network device, that the SIM1 completely cancels application layer measurement, or that the terminal device does not configure application layer measurement corresponding to the SIM1, or that the terminal device cancels all application layer measurement configurations.

Alternatively, the RAN2 reports, to the core network device, an application layer measurement that can be configured for the SIM2. Further, the service type and/or the measurement type corresponding to application layer measurement corresponding to the SIM2 may be reported.

It should be noted that steps S705 to S708 are optional.

In embodiments of this application, the QoE measurement that has been configured for the SIM1 is negotiated, so that the terminal device or the base station corresponding to the SIM2 may determine, based on the QoE measurement that has been configured for the SIM1, the QoE measurement that can be configured for the SIM2. In this way, it is ensured that QoE measurement configurations between the two SIM cards do not cover each other, thereby avoiding that a QoE measurement result of a related service in the SIM1 cannot be collected because the QoE measurement configuration in the SIM1 is discarded, and avoiding that the QoE measurement result reported with the connection of the SIM1 is not according to the QoE measurement configuration transmitted through the connection of the SIM1. Further, in a process of mutual negotiation between QoE measurement corresponding to the two SIMs, the RAN2 corresponding to the SIM2 is notified of a measurement type corresponding to the QoE measurement corresponding to the SIM1, realizing that only a signaling-based QoE measurement is allowed to cover a management-based QoE measurement between two SIMS.

Figure 8:
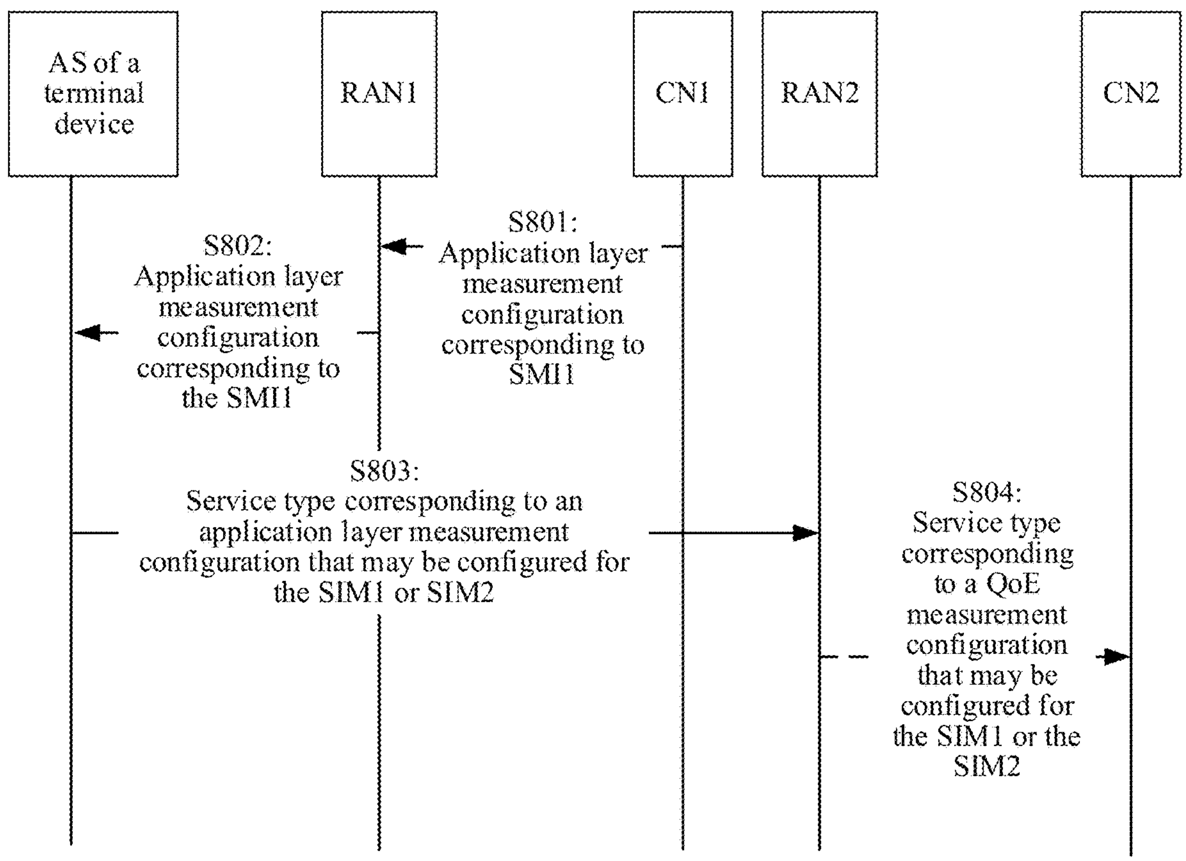
FIG. 8 is a schematic flowchart of another QoE measurement method according to this application.

FIG. 8 is a schematic flowchart of another QoE measurement method according to this application. As shown in FIG. 8, the method 800 includes the following steps:

S801. The RAN1 sends, to a terminal device, a service type and/or a measurement type that are/is corresponding to application layer measurement that can be configured for the SIM1 or the SIM2.

Specifically, the RAN1 may determine, based on its own algorithm, a service type and/or a measurement type corresponding to application layer measurement that can be configured for the SIM1 or the SIM2. Alternatively, the RAN1 receives, from the core network device, a message indicating a service type and/or a measurement type corresponding to application layer measurement that may be configured for the SMI1 or the SIM2.

S802. The access stratum of the terminal notifies the RAN2 corresponding to the SIM2 of a service type and/or a measurement type corresponding to application layer measurement that may be configured for the SIM1 or the SIM2 of the terminal device.

Specifically, the AS corresponding to the SIM2 in the terminal device notifies the RAN2 corresponding to the SIM2.

The access stratum corresponding to the SIM2 may obtain, in the following manners, the service type and/or the measurement type corresponding to QoE measurement that can be configured for the SIM1 or the SIM2:

Manner 1: The ASs corresponding to the SIM1 and the SIM2 share one entity or module, and there is no interaction between the two SIMS, and the SIM2 may learn the configuration status of application layer measurement of the SIM1 through internal processing.

Manner 2: The access stratum corresponding to the SIM2 in the terminal device may learn, from the access stratum corresponding to the SIM1, the service type and/or the measurement type corresponding to the QoE measurement that can be configured for the SIM1 or the SIM2.

As an example, if the access stratum of the SIM2 learns, from the access stratum of the SIM1, a service type and/or a measurement type corresponding to the QoE measurement that can be configured for the SIM1, the access stratum of the SIM2 may determine the service type and/or the measurement type corresponding to the QoE measurement that can be configured for the SIM2, so as to send the service type and/or the measurement type corresponding to the QoE measurement that can be configured for the SIM2 to the base station 2.

Manner 3: An upper layer (for example, an application layer) of the AS learns a service type and/or a measurement type corresponding to the QoE measurement that can be configured for the SIM1, and then the layer notifies an access stratum and/or a measurement type corresponding to the SIM2.

As an example, after the upper layer of the AS learns the service type and/or the measurement type corresponding to the QoE measurement that can be configured for the SIM1, the upper layer of the AS or the AS of the SIM2 determines the service type and/or the measurement type corresponding to the QoE measurement that can be configured for the SIM2. Therefore, a service type and/or a measurement type corresponding to the QoE measurement that can be configured for the SIM2 are/is sent to the base station 2.

S803. The RAN2 sends indication information to a core network device corresponding to the SIM2, to notify the core network device of a service type and/or a measurement type that can be configured for the SIM1 or the SIM2.

It should be understood that S803 is merely one of behaviors that may be performed by the RAN2, and a specific behavior that may be implemented by the RAN2 is similar to step S704 in the method 700.

In embodiments of this application, the QoE measurement that can be configured for each SIM is negotiated between the two SIMS. In this way, it is ensured that QoE measurement configurations between the two SIMs do not cover each other, thereby avoiding that a QoE measurement result of a related service in the SIM1 cannot be collected because the QoE measurement configuration in the SIM1 is discarded, and avoiding that the QoE measurement result reported with the SIM1 is not according to the QoE measurement configuration transmitted through the SIM1. Further, in a process of mutual negotiation between the two SIMS, the RAN2 corresponding to the SIM2 is notified of a measurement type corresponding to the QoE measurement corresponding to the SIM1, realizing that only a signaling-based QoE measurement is allowed to cover a management-based QoE measurement between two SIMs.

Figure 9:
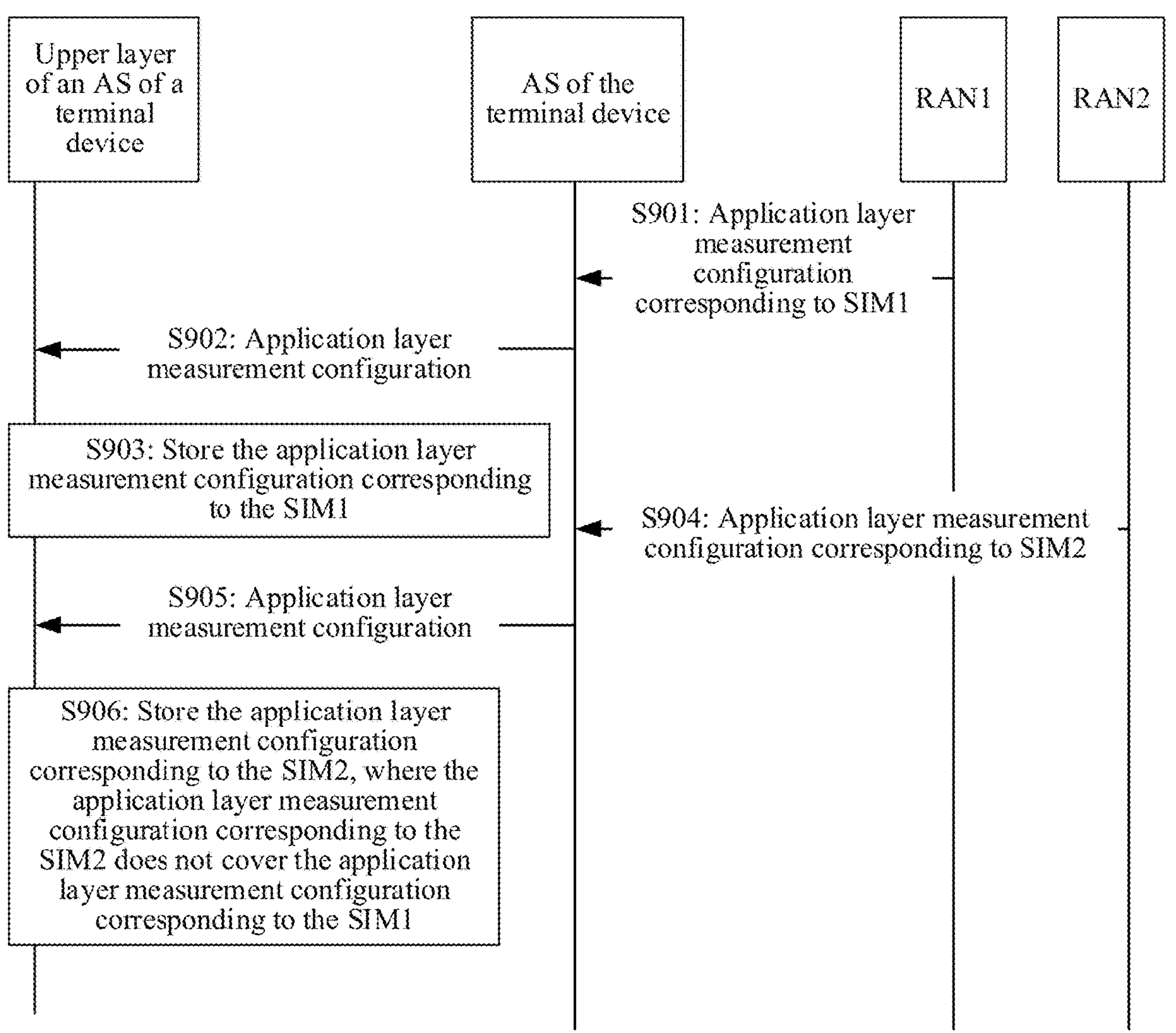
FIG. 9 is a schematic flowchart of another QoE measurement method according to this application.

FIG. 9 is a schematic flowchart of another QoE measurement method according to this application. As shown in FIG. 9, the method 900 includes the following steps:

S901. A base station 1 sends an application layer measurement configuration corresponding to the SIM1 to the terminal device.

This is the same as step S701 in the method 700.

S902. The AS corresponding to the SIM1 of the terminal device sends application layer measurement configuration information to an upper layer of the AS.

This is the same as step S702 in the method 700.

Further, the AS corresponding to the SIM1 of the terminal device may further notify an upper layer of the AS that the application layer measurement configuration corresponds to the SIM1. For example, the application layer measurement configuration sent by the AS carries indication information indicating that the application layer measurement configuration is corresponding to the SIM1.

Alternatively, if when sending the application layer measurement configuration information to an upper layer of the AS, the AS corresponding to the SIM does not send the indication information to indicate the corresponding SIM configuration, the upper layer of the AS may obtain the corresponding SIM configuration in the following manners:

Manner 1: Different interfaces are used to transmit information between the AS corresponding to each SIM and an upper layer of the AS, so that the upper layer of the AS determines, by receiving the SIM corresponding to the interface of the application layer measurement configuration, the SIM corresponding to the application layer measurement configuration. After the measurement is completed, the measurement result is also sent to the AS through the interface corresponding to the SIM, so that the measurement configuration corresponds to the measurement result.

Manner 2: The upper layer of the AS knows the SIM corresponding to the service type of each application service, so that the upper layer of the AS learns, according to the service type corresponding to the application layer measurement configuration, the SIM corresponding to the application layer measurement configuration, and can also determine which SIM the measurement result corresponds to after the measurement ends.

S903. An upper layer of the terminal device AS stores the application layer measurement configuration corresponding to the SIM1.

S904. The RAN2 sends the application layer measurement configuration to the SIM2 of the terminal device.

This is similar to step S701 in the method 700, but the RAN1 is replaced with the RAN2 in step S904, and the SIM1 is replaced with the SIM2 in step S904.

S905. The AS corresponding to the SIM2 of the terminal device sends the application layer measurement configuration information to an upper layer of the AS.

This is similar to step S702 in the method 700, but the SIM1 is replaced with the SIM2 in step S905.

Further, the AS corresponding to the SIM2 of the terminal device further notifies an upper layer of the AS that the application layer measurement configuration information corresponds to the configuration of the SIM2. For example, the application layer measurement configuration sent by the AS carries indication information indicating the configuration corresponding to the SIM2.

Alternatively, if when sending the application layer measurement configuration information to an upper layer of the AS, the AS corresponding to the SIM does not send the indication information to indicate the corresponding SIM configuration, the upper layer of the AS may obtain the corresponding SIM configuration in the manner in step S902.

S906. An upper layer of the AS of the terminal device stores the application layer measurement configuration corresponding to the SIM2, and the application layer measurement configuration corresponding to the SIM2 does not cover the application layer measurement configuration corresponding to the SIM1.

It should be understood that in this embodiment, two SIMS are used as an example to describe the solutions in this application. An upper layer of the AS of the terminal may store application layer measurement configurations corresponding to two or more SIMS, and the plurality of application layer measurement configurations are independent of each other and do not cover each other.

In embodiments of this application, it is specified that an upper layer of an AS of the UE is independent of each other for QoE measurement from a plurality of SIMS, thereby avoiding that a QoE measurement result of a related service in the SIM1 cannot be collected because the QoE measurement configuration in the SIM1 is discarded, and avoiding that the QoE measurement result reported with the SIM1 is not according to the QoE measurement configuration transmitted through the SIM1.

Figure 10:
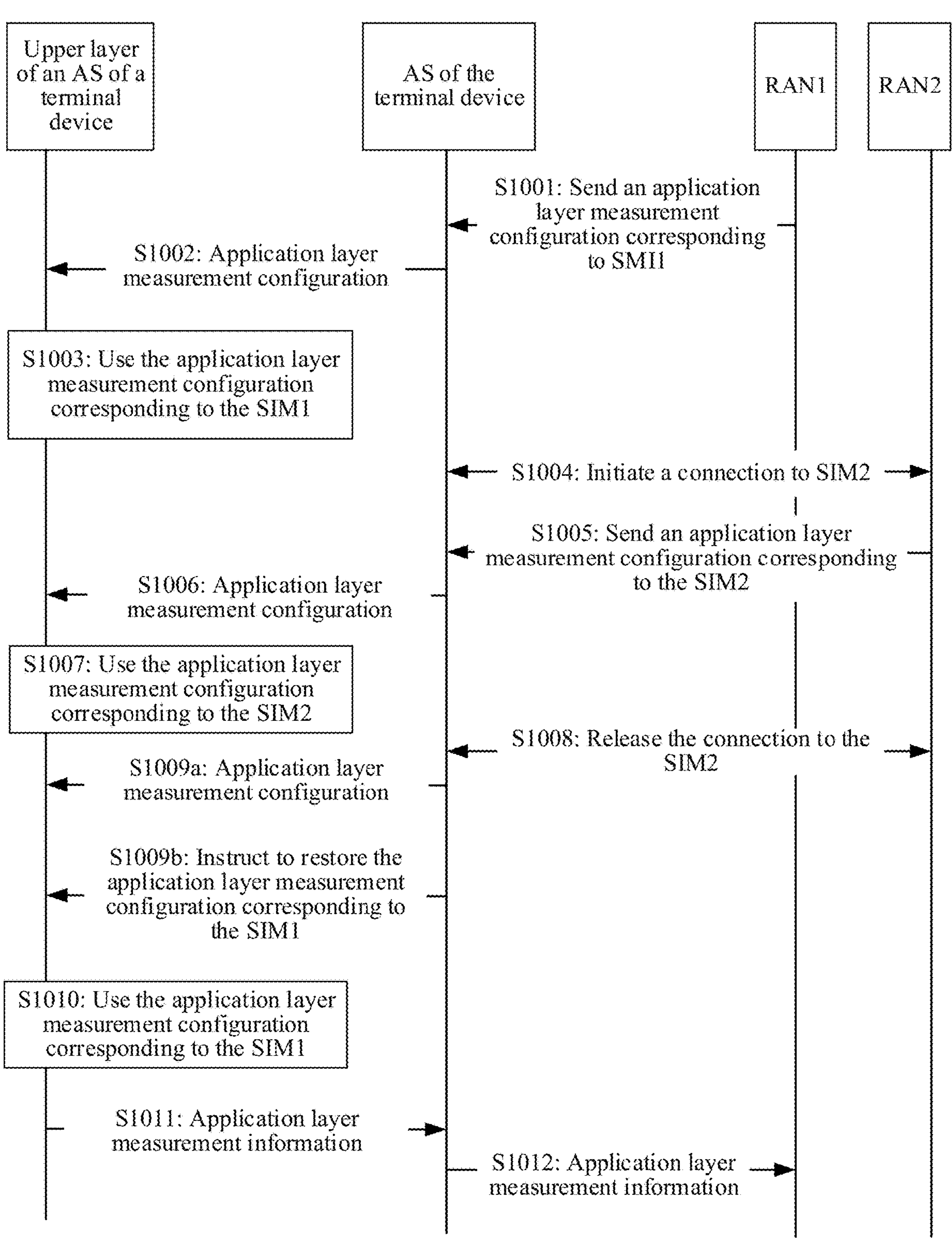
FIG. 10 is a schematic flowchart of another QoE measurement method according to this application.

FIG. 10 is a schematic flowchart of another QoE measurement method according to this application. As shown in FIG. 10, the method 1000 includes the following steps:

S1001. The RAN1 sends an application layer measurement configuration corresponding to the SIM1 to the terminal device.

This is the same as step S701 in the method 700.

S1002. The AS corresponding to the SIM1 of the terminal device sends application layer measurement configuration information to an upper layer of the AS.

This is the same as step S702 in the method 700.

S1003. An upper layer of the AS performs application layer measurement with application layer measurement configuration information corresponding to the SIM1.

S1004. An RRC connection of the SIM2 is established between the RAN2 and the terminal device.

It should be understood that because the terminal device needs to perform a service corresponding to the SIM2 or receive a resource corresponding to the SIM2, an RRC connection of the SIM2 needs to be established between the terminal device and the RAN2, or for another reason, which is not limited in this application.

S1005. The base station 2 sends an application layer measurement configuration to the SIM2 of the terminal device.

This is similar to step S701 in the method 700, but the RAN1 is replaced with the RAN2 in step S1005, and the SIM1 is replaced with the SIM2 in step S1005.

S1006. The AS corresponding to the SIM2 of the terminal device sends the application layer measurement configuration information to an upper layer of the AS.

This is similar to step S702 in the method 700, but the SIM1 is replaced with the SIM2 in step S1006.

S1007. An upper layer of the AS performs application layer measurement with application layer measurement configuration information corresponding to the SIM2.

S1008. The RRC connection of the SIM2 is released between the terminal device and the RAN2.

Optionally, when the RRC connection of the SIM2 is released between the terminal device and the RAN2, the AS corresponding to the SIM2 in the terminal device sends indication information to the AS corresponding to the SIM1 in the terminal device, to indicate that the RRC connection of the SIM2 is released.

S1009*a*. The AS of the terminal device sends an application layer measurement configuration to an upper layer of the AS. Alternatively, S1009*b*. The AS of the terminal device instructs an upper layer of the AS to restore the application layer measurement configuration.

Specifically, it means that the AS corresponding to the SIM1 in the terminal device sends an application layer measurement configuration to an upper layer of the AS. Alternatively, the AS corresponding to the SIM1 in the terminal device instructs an upper layer of the AS to restore the application layer measurement configuration.

In S1009*a*, it should be understood that in step S1009*a*, the AS resends an application layer measurement configuration to the upper layer of the AS, and the upper layer of the AS does not need to save the application layer measurement configuration after receiving the application layer measurement configuration in step S1002.

In a possible case 1, the application layer measurement configuration in step S1009*a* is the same as the application layer configuration in step S1002. It may be understood that the AS of the terminal device stores the application layer measurement configuration received in S1001. In step S1009*a*, the AS resends the application layer measurement configuration received in S1001 to an upper layer of the AS. After the application layer measurement performed by the upper layer of the AS after step S1002 is interrupted or suspended, the application layer measurement configuration received in step S1009*a* continues to start or restarts.

In a possible case 2, the application layer measurement configuration in step S1009*a* is different from the application layer configuration in step S1002. After the application layer measurement performed by the upper layer of the AS after step S1002 is interrupted or suspended, after receiving the application layer measurement configuration in step S1009*a*, an application layer measurement restarts according to the newly received application layer measurement configuration, and the application layer measurement configuration in step S1002 is terminated.

In S1009*b*, it should be understood that the AS of the terminal device does not need to resend the application layer measurement configuration. After receiving the instruction, the upper layer of the AS continues or re-performs application layer measurement based on the application layer measurement configuration received in step S1002. After receiving the application layer measurement configuration in step S1002, the upper layer of the AS needs to save the application layer measurement configuration. Because between step S1002 and step S1009*b*, the upper layer of the AS further receives the application layer measurement configuration corresponding to the SIM2 with the identity of the SIM2, therefore, when saving the application layer measurement configuration, the upper layer of the AS further needs to ensure that application layer measurement configurations corresponding to different SIMS do not cover each other. A specific implementation is similar to that of the foregoing method 800, and details are not described herein again.

S1010. An upper layer of the AS of the terminal device uses the application layer measurement configuration corresponding to the SIM1.

S1011. An upper layer of an access stratum of the terminal device sends QoE measurement information about the SIM1 to an access stratum corresponding to the SIM1 in the terminal device.

The QoE measurement information includes indication information.

Corresponding to the possible case 1 in step S1009*a*, the indication information indicates that a previous QoE measurement (namely, in step S1003) is suspended, or indicates that this QoE measurement (in step S1010) is restarted.

Corresponding to possible case 2 in step S1009*a*, the indication information indicates that a previous QoE measurement (namely, in step S1003) is terminated, or indicates that this QoE measurement (in step S1010) is restarted.

Optionally, the QoE measurement information includes a QoE measurement result corresponding to the application layer measurement corresponding to the SIM.

S1012. The AS corresponding to the SIM1 of the terminal device sends QoE measurement information of the SIM1 to the RAN1, and the measurement information includes indication information.

Specifically, the measurement information and the indication information correspond to step S1011, and details are not described herein again.

Further, the base station sends the QoE measurement information to a TCE.

It should be noted that step S1012 may be performed before step S1004, or may be performed after step S1008.

In a possible case 1, step S1012 is performed before step S1004, and the terminal device sends indication information to the RAN1, to indicate that the application layer measurement configuration corresponding to the RAN1 and the SIM1 is interrupted or suspended.

In a possible case 2, step S1012 is performed after step S1008, and the terminal device indicates to the RAN1, that the application layer measurement of the SIM1 is interrupted or suspended.

In the solution of embodiments of this application, when QoE measurement of SIM1 is interrupted, suspended, or terminated due to a service of SIM2, the terminal device is to notify the network side that QoE measurement of SIM1 is suspended, interrupted, terminated, or restarted. Therefore, when performing data analysis on the network side, it can be learned that the freezing of some services is caused by the impact of a plurality of SIM cards, rather than the service itself that needs to be optimized. Further, after the connection of the SIM1 is restored, the AS of the SIM1 resends the QoE measurement configuration information to an upper layer of the AS, so that the upper layer of the AS does not need to store the QoE measurement configuration information of the SIM1, thereby reducing complexity of the upper layer of the AS and reducing signaling overheads.

Figure 11:
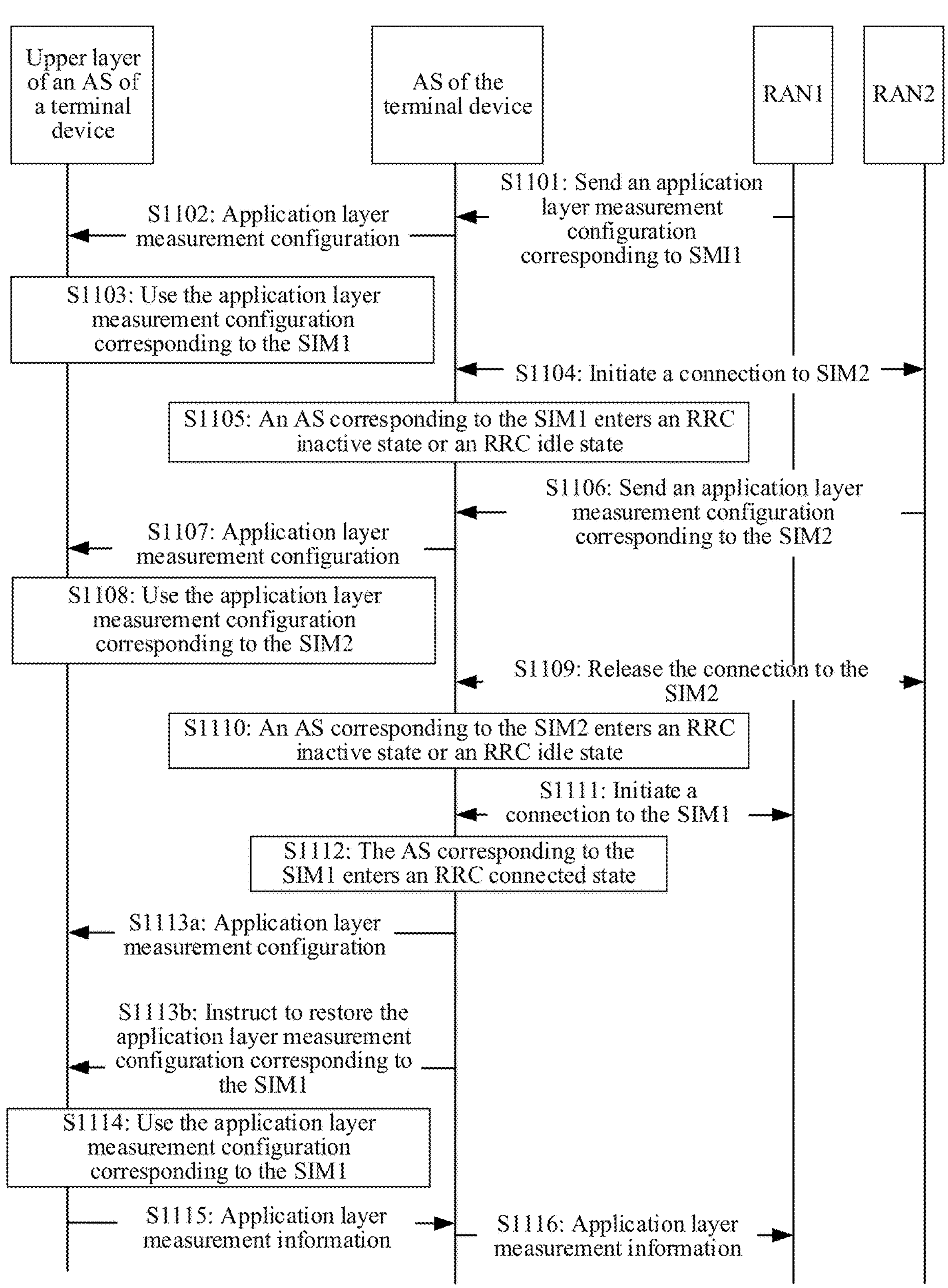
FIG. 11 is a schematic flowchart of another QoE measurement method according to this application.

FIG. 11 is a schematic flowchart of another QoE measurement method according to this application. As shown in FIG. 11, the method 1100 includes the following steps:

S1101. The RAN1 sends an application layer measurement configuration corresponding to the SIM1 to the terminal device.

This is the same as step S701 in the method 700.

S1102. The AS corresponding to the SIM1 of the terminal device sends application layer measurement configuration information to an upper layer of the AS.

This is the same as step S702 in the method 700.

S1103. An upper layer of the AS performs application layer measurement by using application layer measurement configuration information corresponding to the SIM1.

S1104. The connection of the SIM2 is established between the RAN2 and the terminal device.

It should be understood that because the terminal device needs to perform a service corresponding to the SIM2 or receive a resource corresponding to the SIM2, an RRC connection of the SIM2 needs to be established between the terminal device and the RAN2, or for another reason, which is not limited in this application.

S1105. The AS corresponding to the SIM1 enters RRC_INACTIVE or RRC_IDLE.

It should be understood that, when the terminal device supports only the DSDS function, after the terminal device initiates a connection to the SIM2, the SIM1 enters RRC_INACTIVE or RRC_IDLE, and the terminal device cannot perform communication with the SIM1.

S1106. The base station 2 sends the application layer measurement configuration to the SIM2 of the terminal device.

This is similar to step S701 in the method 700, but the RAN1 is replaced with the RAN2 in step S1106, and the SIM1 is replaced with the SIM2 in step S1106.

S1107. The AS corresponding to the SIM2 of the terminal device sends the application layer measurement configuration information to an upper layer of the AS.

This is similar to step S702 in the method 700, but the SIM1 is replaced with the SIM2 in step S1107.

S1108. An upper layer of the AS performs application layer measurement by using application layer measurement configuration information corresponding to the SIM2.

S1109. The connection of the SIM2 is released between the terminal device and the RAN.

S1110. The AS corresponding to the SIM2 enters RRC_INACTIVE or RRC_IDLE.

S1111. The terminal device initiates a connection to the SIM1.

S1112. The AS corresponding to the SIM1 enters RRC_CONNECTED.

It should be understood that, when the terminal device supports only the DSDS function, after the terminal device initiates a connection to the SIM1, the SIM1 correspondingly enters RRC_CONNECTED, and indication information can be sent to the RAN1.

S1113*a*. The AS of the terminal device sends the application layer measurement configuration to an upper layer of the AS. Alternatively, S1113*b*. The AS of the terminal device instructs an upper layer of the AS to restore the application layer measurement configuration.

Specifically, S1113*a* means that the AS corresponding to the SIM1 in the terminal device sends the application layer measurement configuration to an upper layer of the AS. Alternatively, S1113*b* means that the AS corresponding to the SIM1 in the terminal device instructs an upper layer of the AS to restore the application layer measurement configuration.

In S1113*a*, it should be understood that, in step S1113*a*, the AS resends the application layer measurement configuration to an upper layer of the AS corresponding to the SIM1, and the upper layer of the AS does not need to save the application layer measurement configuration after receiving the application layer measurement configuration in step S1102.

In a possible case 1, the application layer measurement configuration in step S1113*a* is the same as the application layer configuration in step S1102. After the application layer measurement performed by the upper layer of the AS after step S1102 is interrupted or suspended, the application layer measurement configuration received in step S1113*a* continues to start or restarts.

In a possible case 2, the application layer measurement configuration in step S1113*a* is different from the application layer configuration in step S1102. After the application layer measurement performed by the upper layer of the AS after step S1102 is interrupted or suspended, after receiving the application layer measurement configuration in step S1113*a*, an application layer measurement restarts according to the newly received application layer measurement configuration, and the application layer measurement configuration in step S1102 is terminated.

In S1113*b*, it should be understood that the AS of the terminal device does not need to resend the application layer measurement configuration. After receiving the instruction, the upper layer of the AS continues or re-performs application layer measurement based on the application layer measurement configuration received in step S1102. After receiving the application layer measurement configuration in step S1102, the upper layer of the AS needs to save the application layer measurement configuration. Because between step S1102 and step S1113*b*, the upper layer of the AS further receives the application layer measurement configuration corresponding to the SIM2 with the identity of the SIM2, therefore, when saving the application layer measurement configuration, the upper layer of the AS further needs to ensure that application layer measurement configurations corresponding to different SIMS do not cover each other. A specific implementation is similar to that of the foregoing method 800, and details are not described herein again.

S1114. An upper layer of the AS of the terminal device uses the application layer measurement configuration corresponding to the SIM1.

S1115. An upper layer of an access stratum of the terminal device sends QoE measurement information about the SIM1 to an access stratum corresponding to the SIM1 in the terminal device.

The QoE measurement information includes indication information.

Corresponding to possible case 1 in step S1113*a* and step S1113*b*, the indication information indicates that QoE measurement is paused last time (that is, in step S1103), or indicates that the QoE measurement is restarted this time (in step S913).

Corresponding to the possible case 2 in step S1113*a*, the indication information indicates that a previous QoE measurement (namely, in step S1103) is suspended, or indicates that this QoE measurement (in step S1114) is restarted.

Optionally, the QoE measurement information includes a QoE measurement result.

S1116. The AS corresponding to the SIM1 of the terminal device sends QoE measurement information of the SIM1 to the RAN1, and the measurement information includes indication information.

Specifically, the measurement information and the indication information correspond to step S1115, and details are not described herein again.

It should be noted that step S1116 may be performed before step S1104, or may be performed after step S1112.

In a possible case 1, step S1116 is performed before step S1104, and the terminal device sends indication information to the RAN1, to indicate that the application layer measurement configuration corresponding to the RAN1 and the SIM1 is interrupted or suspended.

It should be understood that, when the terminal device supports the DSDS function, because a service of the SIM2 causes the SIM1 to enter RRC_IDLE or RRC_INACTIVE, application layer measurement corresponding to the SIM1 is interrupted or suspended. Therefore, before the terminal device establishes the RRC connection with the SIM2 as a user identity, the access stratum corresponding to the SIM1 may notify the RAN1 to which it connects that the application layer measurement is interrupted or suspended.

In a possible case 2, step S1116 is performed after step S1112, and the terminal device indicates to the RAN1, that the application layer measurement of the SIM1 is interrupted or suspended.

Further, the base station sends the QoE measurement information to a TCE.

It should be noted that in all embodiments of this application, the radio access network device transmitting the QoE measurement configuration to UE and the radio access network device of the UE reporting the QoE measurement information may be different radio access network devices. The information about the QoE measurement includes a QoE measurement result or other related information.

In the solution in embodiments of this application, for the terminal device that supports the DSDS function, when only one SIM may be in the RRC_CONNECTED state, when QoE measurement of SIM1 is interrupted, suspended, or terminated due to a service of SIM2, the terminal device is to notify the network side that QoE measurement of SIM1 is suspended, interrupted, terminated, or restarted. Therefore, when performing data analysis on the network side, it can be learned that the freezing of some services is caused by the impact of a plurality of SIM cards, rather than the service itself that needs to be optimized. Further, after the connection of the SIM1 is restored, the AS of the SIM1 resends the QoE measurement configuration information to an upper layer of the AS, so that the upper layer of the AS does not need to store the QoE measurement configuration information of the SIM1, thereby reducing complexity of the upper layer of the AS and reducing signaling overheads.

The methods provided in embodiments of this application are described in detail above with reference to FIG. 4 to FIG. 11. An apparatus provided in embodiments of this application is described in detail below with reference to FIG. 12 to FIG. 14.

Figure 12:
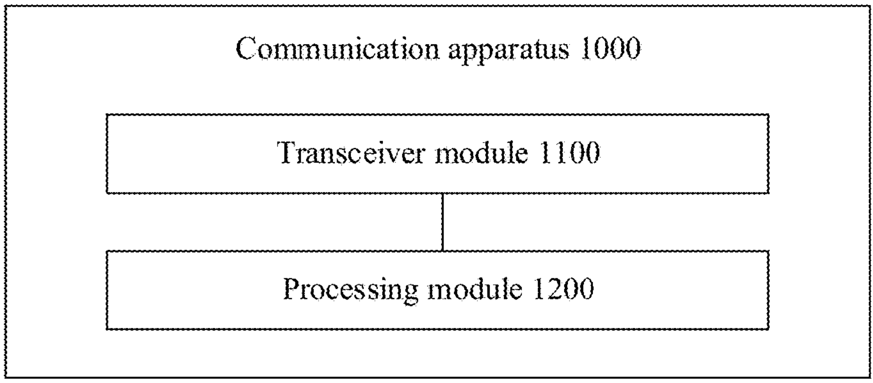
FIG. 12 is a schematic block diagram of a communication apparatus according to an embodiment of this application.

FIG. 12 is a schematic block diagram of a communication apparatus according to an embodiment of this application. As shown in FIG. 12, the communication apparatus 1000 may include a transceiver module 1100 and a processing module 1200.

The transceiver module 1100 may be configured to receive information sent by another apparatus, or may be configured to send information to another apparatus. For example, it can send second information or receive first information. The processing module 1200 may be configured to perform content processing of an apparatus, such as determining second related information of application layer measurement corresponding to a first user identity or a second user identity.

In a possible design, the communication apparatus 1000 may correspond to the terminal device in the foregoing method embodiment.

Specifically, the communication apparatus 1000 may correspond to the terminal device in any one of the methods 400, 700, or 800 according to embodiments of this application. The communication apparatus 1000 may include a module configured to perform an operation performed by the terminal device in the corresponding method. Each unit in the communication apparatus 1000 is separately used to implement an operation performed by a terminal device in a corresponding method.

For example, when the communication apparatus 1000 corresponds to the terminal device in the method 400, the transceiver module 1100 is configured to perform steps S401 and S402. For example, when the communication apparatus 1000 corresponds to the terminal device in the method 700, the transceiver module 1100 is configured to perform steps S701, S703, S705 and S707.

For example, when the communication apparatus 1000 corresponds to the terminal device in the method 800, the transceiver module 1100 is configured to perform steps S802 and S803.

Specifically, the transceiver module 1100 is configured to receive first information from a first radio access network device with a first user identity, where the first information includes first related information of application layer measurement corresponding to the first user identity. The transceiver module 1100 is further configured to send second information to a second radio access network device with a second user identity, where the second information indicates second related information of application layer measurement corresponding to the first user identity or the second user identity, where the first related information includes an application layer measurement configuration corresponding to the first user identity; and the second related information includes that the terminal device configures application layer measurement with the first user identity, or the terminal device is prohibited from configuring application layer measurement with the second user identity.

Alternatively, the first related information includes an application layer measurement configuration corresponding to the first user identity and a first service type corresponding to the application layer measurement configuration, and the second related information includes configuring, by the terminal device with the first user identity, application layer measurement corresponding to the first service type; or the second related information includes prohibiting the terminal device from configuring, with a second user identity, application layer measurement corresponding to the first service type, or allowing the terminal device to configure, with a second user identity, application layer measurement corresponding to a second service type, where the second service type is a service type other than a first service type.

Alternatively, the first related information indicates allowing the terminal device to configure, with the first user identity, application layer measurement corresponding to a first service type; and the second related information includes that the terminal device is allowed to configure, with the first user identity, application layer measurement corresponding to a first service type; or the second related information includes prohibiting the terminal device from configuring, with a second user identity, application layer measurement corresponding to a first service type, or allowing the terminal device to configure, with a second user identity, application layer measurement corresponding to a second service type, where the second service type is a service type other than a first service type.

Alternatively, the first related information includes an application layer measurement configuration and a first measurement type corresponding to the application layer measurement configuration; the second related information includes configuring, by the terminal device with the first user identity, application layer measurement corresponding to the first measurement type, or the second related information includes forbidding the terminal device to configure, with the second user identity, application layer measurement corresponding to the first measurement type; or allowing the terminal device to configure, with the second user identity, application layer measurement corresponding to the second measurement type, where a priority of the second measurement type is higher than that of the first measurement type.

Alternatively, the first related information indicates allowing the terminal device to configure, with the first user identity, application layer measurement corresponding to the first measurement type; and the second related information includes allowing the terminal device to configure, with the first user identity, application layer measurement corresponding to the first measurement type, or the second related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

Alternatively, the first related information includes an application layer measurement configuration, and a first service type and a first measurement type that are corresponding to the application layer measurement configuration; and the second related information includes configuring, by the terminal device with the first user identity, application layer measurement corresponding to both the first measurement type and the first service type; or the second related information includes prohibiting the terminal device from configuring, with the second user identity, application layer measurement corresponding to both the first measurement type and the first service type, or allowing the terminal device to configure, with the second user identity, application layer measurement corresponding to both the second measurement type and the first service type, where a priority of the second measurement type is higher than that of the first measurement type.

Alternatively, the first related information indicates allowing the terminal device to configure, with the first user identity, application layer measurement corresponding to both the first measurement type and the first service type; and the second related information includes allowing the terminal device to configure, with the first user identity, application layer measurement corresponding to both the first measurement type and the first service type, or the second related information includes prohibiting the terminal device from configuring, with the second user identity, application layer measurement corresponding to both the first measurement type and the first service type, or allowing the terminal device to configure, with the second user identity, application layer measurement corresponding to both the second measurement type and the first service type, where a priority of the second measurement type is higher than that of the first measurement type; and the measurement type includes a management-based application layer measurement, a signaling-based application layer measurement, and application layer measurement triggered by a radio access network device.

In another possible design, the communication apparatus 1000 may correspond to the second radio access network device or the RAN2 in the foregoing method embodiment, for example, may be the RAN2 or a chip configured in the second radio access network device.

Specifically, the communication apparatus 1000 may correspond to the second radio access network device or the RAN2 in any one of the methods 400 to 1100 according to embodiments of this application. The communication apparatus 1000 may include a unit configured to perform an operation performed by the second radio access network device or the RAN2 in the corresponding method. In addition, units in the communication apparatus 1000 are separately used to implement operations performed by the second radio access network device or the RAN2 in a corresponding method.

For example, when the communication apparatus 1000 corresponds to the second radio access network device in the method 400, the transceiver module 1100 is configured to perform step S402. The processing module 1200 is configured to perform step S403.

For example, when the communication apparatus 1000 corresponds to the RAN2 in the method 500, the transceiver module 1100 is configured to perform step S503.

For example, when the communication apparatus 1000 corresponds to the RAN2 in the method 600, the transceiver module 1100 is configured to perform step S603.

For example, when the communication apparatus 1000 corresponds to the RAN2 in the method 700, the transceiver module 1100 is configured to perform steps S703 and S707.

For example, when the communication apparatus 1000 corresponds to the RAN2 in the method 800, the transceiver module 1100 is configured to perform steps S803 and S804.

For example, when the communication apparatus 1000 corresponds to the RAN2 in the method 900, the transceiver module 1100 is configured to perform step S904.

For example, when the communication apparatus 1000 corresponds to the RAN2 in the method 1000, the transceiver module 1100 is configured to perform steps S1004, S1005, S1008 and S1012.

For example, when the communication apparatus 1000 corresponds to the RAN2 in the method 1100, the transceiver module 1100 is configured to perform steps S1104, S1105, S1109, S1111 and S1116.

Specifically, in an embodiment, the transceiver module 1100 is configured to receive second information from a terminal device, where the second information includes second related information of application layer measurement corresponding to a first user identity or a second user identity; and the processing module 1200 is configured to determine, based on the second information, third relevant information of application layer measurement corresponding to the first user identity or the second user identity, where the terminal device is connected to the second radio access network device with the second user identity.

The transceiver module 1100 is further configured to send third information to a core network device, where the third information indicates fourth related information of application layer measurement corresponding to the first user identity or the second user identity, and the core network device corresponds to the second user identity.

The second related information includes that the terminal device configures application layer measurement, or the terminal device is prohibited from configuring application layer measurement with the second user identity; and the fourth related information includes that the terminal device configures application layer measurement with the first user identity, or the terminal device is prohibited from configuring application layer measurement with the second user identity.

Alternatively, the second related information includes configuring, by the terminal device with the first user identity, application layer measurement corresponding to a first service type; or the second related information includes prohibiting the terminal device from configuring, with the second user identity, application layer measurement corresponding to the first service type; or allowing the terminal device to configure, with the second user identity, application layer measurement corresponding to a second service type; and the fourth related information includes configuring, by the terminal device with the first user identity, application layer measurement corresponding to a first service type; or the fourth related information includes prohibiting the terminal device from configuring, with the second user identity, application layer measurement corresponding to the first service type; or allowing the terminal device to configure, with the second user identity, application layer measurement corresponding to a second service type, where the second service type is a service type other than the first service type.

Alternatively, the second related information includes allowing the terminal device to configure, with the first user identity, application layer measurement corresponding to a first service type; or the second related information includes prohibiting the terminal device from configuring, with the second user identity, application layer measurement corresponding to a first service type, or allowing the terminal device to configure, with the second user identity, application layer measurement corresponding to a second service type. The fourth related information includes allowing the terminal device to configure, with the first user identity, application layer measurement corresponding to a first service type; or the fourth related information includes prohibiting the terminal device from configuring, with the second user identity, application layer measurement corresponding to a first service type; or allowing the terminal device to configure, with the second user identity, application layer measurement corresponding to a second service type, where the second service type is a service type other than the first service type.

Alternatively, the second related information includes configuring, by the terminal device with the first user identity, application layer measurement corresponding to the first measurement type, or the second related information includes forbidding the terminal device to configure, with the second user identity, application layer measurement corresponding to the first measurement type; or allowing the terminal device to configure, with the second user identity, application layer measurement corresponding to the second measurement type, where the fourth related information includes configuring, by the terminal device with the first user identity, application layer measurement corresponding to the first measurement type, or the fourth related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

Alternatively, the second related information includes allowing the terminal device to configure, with the first user identity, application layer measurement corresponding to the first measurement type, or the second related information includes prohibiting the terminal device from configuring, with the second user identity, application layer measurement corresponding to the first measurement type; or allowing the terminal device to configure, with the second user identity, application layer measurement corresponding to the second measurement type, where the fourth related information includes allowing the terminal device to configure, with the first user identity, application layer measurement corresponding to the first measurement type, or the fourth related information includes prohibiting the terminal device from configuring, with the second user identity, application layer measurement corresponding to the first measurement type; or allowing the terminal device to configure, with the second user identity, application layer measurement corresponding to the second measurement type, where a priority of the second measurement type is higher than that of the first measurement type.

Alternatively, the second related information includes configuring, by the terminal device with the first user identity, application layer measurement corresponding to both a first measurement type and a first service type, or the second related information includes prohibiting the terminal device from configuring, with the second user identity, application layer measurement corresponding to both a first measurement type and a first service type, or allowing the terminal device to configure, with the second user identity, application layer measurement corresponding to both a second measurement type and a first service type. The fourth related information includes configuring, by the terminal device with the first user identity, application layer measurement corresponding to both a first measurement type and a first service type, or the fourth related information includes the terminal device is prohibited from configuring application layer measurement corresponding to both the first measurement type and the first service type, or the terminal device is allowed to configure application layer measurement corresponding to both a second measurement type and a first service type, where a priority of the second measurement type is higher than that of the first measurement type.

Alternatively, the second related information includes allowing the terminal device to configure, with the first user identity, application layer measurement corresponding to both a first measurement type and a first service type, or the second related information includes prohibiting the terminal device from configuring, with the second user identity, application layer measurement corresponding to both a first measurement type and a first service type, or allowing the terminal device to configure, with the second user identity, application layer measurement corresponding to both a second measurement type and a first service type. The fourth related information includes allowing the terminal device to configure, with the first user identity; application layer measurement corresponding to both a first measurement type and a first service type, or the fourth related information includes prohibiting the terminal device from configuring application layer measurement corresponding to both a first measurement type and a first service type, or the terminal device can configure application layer measurement corresponding to both a second measurement type and a first service type, where a priority of the second measurement type is higher than that of the first measurement type.

Alternatively, the second radio access network device receives fourth information from a core network device; the second radio access network device sends a rejection message to the core network device, where the core network device corresponds to the second user identity.

Further, the processing module 1200 is further specifically configured to determine, based on the second information, prohibiting the terminal device from configuring an application layer measurement configuration corresponding to the second user identity, where the fourth information indicates that the second radio access network device configures application layer measurement configuration corresponding to the second user identity for the terminal device.

Alternatively, the processing module 1200 is further specifically configured to: determine, based on the second information, prohibiting the terminal device from configuring, with a second user identity, an application layer measurement configuration corresponding to a first service type, or allowing the terminal device to configure, with a second user identity, an application layer measurement configuration corresponding to a second service type, where the fourth information indicates that the second radio access network device configures an application layer measurement configuration corresponding to the first service type for the terminal device, where the second service type is a service type other than the first service type.

Alternatively, the processing module 1200 is further specifically configured to determine, based on the second information, prohibiting the terminal device from configuring, with a second user identity, application layer measurement corresponding to a first measurement type, where the fourth information indicates that the second radio access network device configures application layer measurement corresponding to the first measurement type for the terminal device, where a priority of the second measurement type is higher than that of the first measurement type.

Alternatively, the processing module is further specifically configured to determine, based on the second information, prohibiting the terminal device from configuring, with a second user identity, an application layer measurement configuration corresponding to both a first measurement type and a first service, where the fourth information indicates that the second radio access network device configures an application layer measurement configuration corresponding to both a first measurement type and a first service for the terminal device, where a priority of the second measurement type is higher than that of the first measurement type.

In a possible design, the communication apparatus 1000 may correspond to the access stratum of the terminal device in the foregoing method embodiment, for example, may be an access stratum or a chip configured in the access stratum.

Specifically, the communication apparatus 1000 may correspond to the access stratum of the terminal device in any one of the methods 500 to 1100 according to embodiments of this application. The communication apparatus 1000 may include a unit configured to perform an operation performed by the access stratum of the terminal device in the corresponding method. Each unit in the communication apparatus 1000 is separately used to implement an operation performed by an access stratum of a terminal device in a corresponding method.

For example, when the communication apparatus 1000 corresponds to the access stratum of the terminal device in the method 500, the transceiver module 1100 is configured to perform steps S501, S502, S503 and S504.

For example, when the communication apparatus 1000 corresponds to the access stratum of the terminal device in the method 600, the transceiver module 1100 is configured to perform steps S601, S602, S603, S604, S605, S606, S607 and S608.

For example, when the communication apparatus 1000 corresponds to the access stratum of the terminal device in the method 700, the transceiver module 1100 is configured to perform steps S701, S702, S703, S705, S706 and S707.

For example, when the communication apparatus 1000 corresponds to the access stratum of the terminal device in the method 800, the transceiver module 1100 is configured to perform steps S802 and S803.

For example, when the communication apparatus 1000 corresponds to the access stratum of the terminal device in the method 900, the transceiver module 1100 is configured to perform steps S901, S902, S904 and S905.

For example, when the communication apparatus 1000 corresponds to the access stratum of the terminal device in the method 1000, the transceiver module 1100 is configured to perform steps S1001, S1002, S1004, S1005, S1006, S1008, S1009*a*, S1009*b*, S1011 and S1012.

For example, when the communication apparatus 1000 corresponds to the access stratum of the terminal device in the method 1100, the transceiver module 1100 is configured to perform steps S1101, S1102, S1104, S1106, S1107, S1109, S1111, S1113*a*, S1113*b*, S1115 and S1116.

Specifically, as an example, the transceiver module 1100 is configured to receive a first application layer measurement configuration from a first radio access network device, where the first application layer measurement configuration corresponds to a first user identity. The transceiver module 1100 is further configured to receive a second application layer measurement configuration from the second radio access network device, where the second application layer measurement configuration corresponds to a second user identity. The transceiver module 1100 is further configured to send the first application layer measurement configuration to an upper layer of the AS of the terminal device. The transceiver module 1100 is further configured to send the second application layer measurement configuration to an upper layer of the AS.

In addition, the transceiver module 1100 is further configured to: send one or more pieces of indication information to an upper layer of the AS, where the one or more pieces of indication information indicates that the first application layer measurement configuration corresponds to the first user identity, and the second application layer measurement configuration corresponds to the second user identity.

The transceiver module 1100 is further configured to: send the first application layer measurement configuration and the second application layer measurement configuration to an upper layer of the AS through different interfaces.

Specifically, as another example, the transceiver module 1100 is configured to receive a first application layer measurement configuration and a second application layer measurement configuration from a first radio access network device, where both the first application layer measurement configuration and the second application layer measurement configuration correspond to a first user identity. The transceiver module 1100 is further configured to send the first application layer measurement configuration and the second application layer measurement configuration. The transceiver module 1100 is further configured to receive a third application layer measurement configuration from a second radio access network device, where the third application layer measurement configuration corresponds to a second user identity. The transceiver module 1100 is further configured to send a third application layer measurement configuration to an upper layer of the AS. The transceiver module 1100 is further configured to receive fifth information from an upper layer of the AS, where the fifth information indicates that application layer measurement using a first application layer measurement configuration is suspended or terminated, or application layer measurement using a second application layer measurement configuration is started. The transceiver module 1100 is further configured to send sixth information to the first radio access network device, where the sixth information is consistent with the content indicated by the fifth information, where the suspension or termination is triggered by application layer measurement corresponding to the second user identity.

In addition, the transceiver module 1100 is further configured to send seventh information to an upper layer of the AS, where the seventh information includes the second application layer measurement configuration, and the seventh information indicates that the upper layer of the AS performs application layer measurement with the second application layer measurement configuration. When the first application layer measurement configuration is the same as the second application layer measurement configuration, the fifth information indicates that the application layer measurement using a first application layer measurement configuration is suspended, or the fifth information indicates that the application layer measurement using a second application layer measurement configuration is started. When the first application layer measurement configuration is different from the second application layer measurement configuration, the fifth information indicates that the application layer measurement using a first application layer measurement configuration is terminated, or the fifth information indicates that the application layer measurement using the second application layer measurement configuration is started.

The transceiver module 1100 is further configured to send seventh information to an upper layer of the AS, where the seventh information indicates that the upper layer of the AS continues to perform application layer measurement with the first application layer measurement configuration; and the fifth information indicates that the application layer measurement using a first application layer measurement configuration is suspended, or the application layer measurement using a second application layer measurement configuration is started, where the first application layer measurement configuration is the same as the second application layer measurement configuration.

In a possible design, the communication apparatus 1000 may correspond to the upper layer of the access stratum of the terminal device in the foregoing method embodiment, for example, may be an application layer of the terminal device or a chip configured at the application layer of the terminal device. Alternatively, the communication apparatus 1000 may be a layer of an access stratum and an application layer, or a chip configured at the layer.

Specifically, the communication apparatus 1000 may correspond to the access stratum of the terminal device in any one of the methods 500 to 700 and the methods 900 to 1100 according to embodiments of this application. The communication apparatus 1000 may include a unit configured to perform an operation performed by the access stratum of the terminal device in the corresponding method. Each unit in the communication apparatus 1000 is separately used to implement an operation performed by an upper layer of an access stratum of the terminal device in a corresponding method.

For example, when the communication apparatus 1000 corresponds to the upper layer of the access stratum of the terminal device in the method 500, the transceiver module 1100 is configured to perform steps S502 and S504, and the processing module 1200 is configured to perform steps S505 and S506.

For example, when the communication apparatus 1000 corresponds to the upper layer of the access stratum of the terminal device in the method 600, the transceiver module 1100 is configured to perform steps S602, S604, S606 and S607.

For example, when the communication apparatus 1000 corresponds to the upper layer of the access stratum of the terminal device in the method 700, the transceiver module 1100 is configured to perform steps S702 and S706.

For example, when the communication apparatus 1000 corresponds to the upper layer of the access stratum of the terminal device in the method 900, the transceiver module 1100 is configured to perform steps S902 and S905. The processing module 1200 is configured to perform steps S903 and S906.

For example, when the communication apparatus 1000 corresponds to the upper layer of the access stratum of the terminal device in the method 1000, the transceiver module 1100 is configured to perform steps S1002, S1006, S1009*a*, S1009*b* and S1011. The processing module 1200 is configured to perform steps S1003, S1007 and S1010.

For example, when the communication apparatus 1000 corresponds to the upper layer of the access stratum of the terminal device in the method 1100, the transceiver module 1100 is configured to perform steps S1102, S1107, S1113*a*, S1113*b* and S1115. The processing module 1200 is configured to perform steps S1103, S1108 and S1114.

Specifically, as an example, the transceiver module 1100 is configured to receive a first application layer measurement configuration from an AS of the terminal device, where the first application layer measurement configuration corresponds to a first user identity. The transceiver module 1100 is further configured to receive a second application layer measurement configuration from the AS, where the second application layer measurement configuration corresponds to a second user identity. The processing module 1200 is configured to perform, based on the first application layer measurement configuration, an application layer measurement of a service corresponding to the first user identity. The processing module 1200 is configured to perform, based on the second application layer measurement configuration, an application layer measurement of a service corresponding to the second user identity.

In addition, the processing module 1200 is further configured to: determine that the first application layer measurement configuration corresponds to the first user identity, and that the second application layer measurement configuration corresponds to the second user identity.

In addition, the processing module 1200 is further configured to: receive, by an upper layer of the AS, one or more pieces of indication information from the AS; and determine, based on the one or more pieces of indication information, that the first application layer measurement configuration corresponds to the first user identity, and that the second application layer measurement configuration corresponds to the second user identity.

Alternatively, the processing module 1200 is further configured to: receive, by the upper layer of the AS, the first application layer measurement configuration and the second application layer measurement configuration from the AS through different interfaces; and determine, by the upper layer of the AS based on the different interfaces, that the first application layer measurement configuration corresponds to the first user identity, and that the second application layer measurement configuration corresponds to the second user identity.

Alternatively, the processing module 1200 is further configured to: determine, by the upper layer of the AS based on the correspondence between the first application layer measurement configuration and the second application layer measurement configuration and a service, that the first application layer measurement configuration corresponds to the first user identity, and that the second application layer measurement configuration corresponds to the second user identity.

Specifically, as an example, the transceiver module 1100 is configured to receive a first application layer measurement configuration and a second application layer measurement configuration from the AS of the terminal device, where both the first application layer measurement configuration and the second application layer measurement configuration correspond to a first user identity. The transceiver module 1100 is further configured to receive a third application layer measurement configuration from the AS, where the third application layer measurement configuration corresponds to a second user identity. The transceiver module 1100 is further configured to send fifth information to the AS of the terminal device, where the fifth information indicates that application layer measurement using a first application layer measurement configuration is suspended or terminated, or application layer measurement using a second application layer measurement configuration is started, where the suspension or termination is triggered by application layer measurement corresponding to the second user identity.

In addition, the transceiver module 1100 is further configured to: receive seventh information from the AS, where the seventh information includes the second application layer measurement configuration, and the seventh information indicates that the upper layer of the AS performs application layer measurement with the second application layer measurement configuration. When the first application layer measurement configuration is the same as the second application layer measurement configuration, the fifth information indicates that the application layer measurement using a first application layer measurement configuration is suspended, or the fifth information indicates that the application layer measurement using a second application layer measurement configuration is started. When the first application layer measurement configuration is different from the second application layer measurement configuration, the fifth information indicates that the application layer measurement using a first application layer measurement configuration is terminated, or the fifth information indicates that the application layer measurement using the second application layer measurement configuration is started.

The transceiver module 1100 is further configured to: receive seventh information from the AS, where the seventh information indicates that an upper layer of the AS continues to perform application layer measurement with the first application layer measurement configuration; and the fifth information indicates that the application layer measurement using a first application layer measurement configuration is suspended, or the application layer measurement using a second application layer measurement configuration is started, where the first application layer measurement configuration is the same as the second application layer measurement configuration.

In addition, the processing module 1200 is configured to perform, based on the first application layer measurement configuration or the second application layer measurement configuration, an application layer measurement of a service corresponding to the first user identity. The processing module 1200 is further configured to perform, based on the third application layer measurement configuration, an application layer measurement of a service corresponding to the second user identity.

It should be understood that a specific process in which each unit performs the foregoing corresponding step is described in detail in the foregoing method embodiment, and for brevity, details are not described herein.

Figure 13:
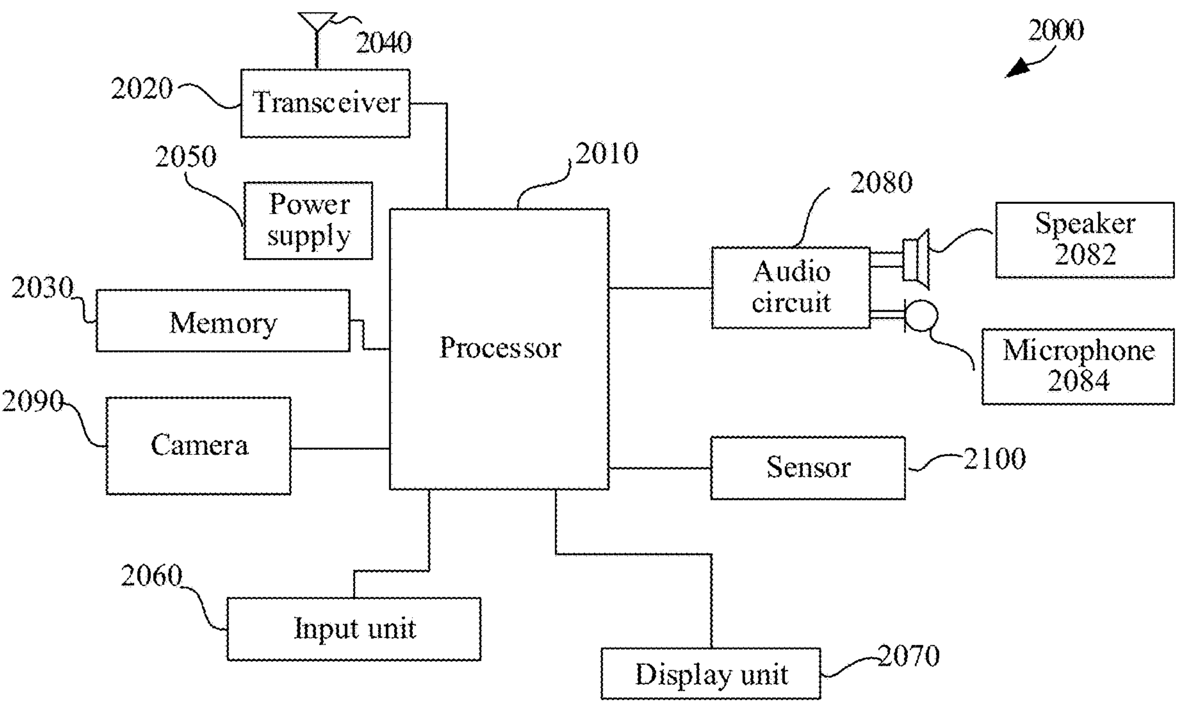
FIG. 13 is a schematic structural diagram of a terminal device 2000 according to an embodiment of this application.

It should be further understood that, when the communication apparatus 1000 is a terminal device, the transceiver module 1100 in the communication apparatus 1000 may correspond to the transceiver 2020 in the terminal device 2000 shown in FIG. 13. The processing module 1200 in the communication apparatus 1000 may correspond to the processor 2010 in the terminal device 2000 shown in FIG. 13.

It should be further understood that when the communication apparatus 1000 is a chip configured in a terminal device, the transceiver module 1200 in the communication apparatus 1000 may be an input/output interface.

Figure 14:
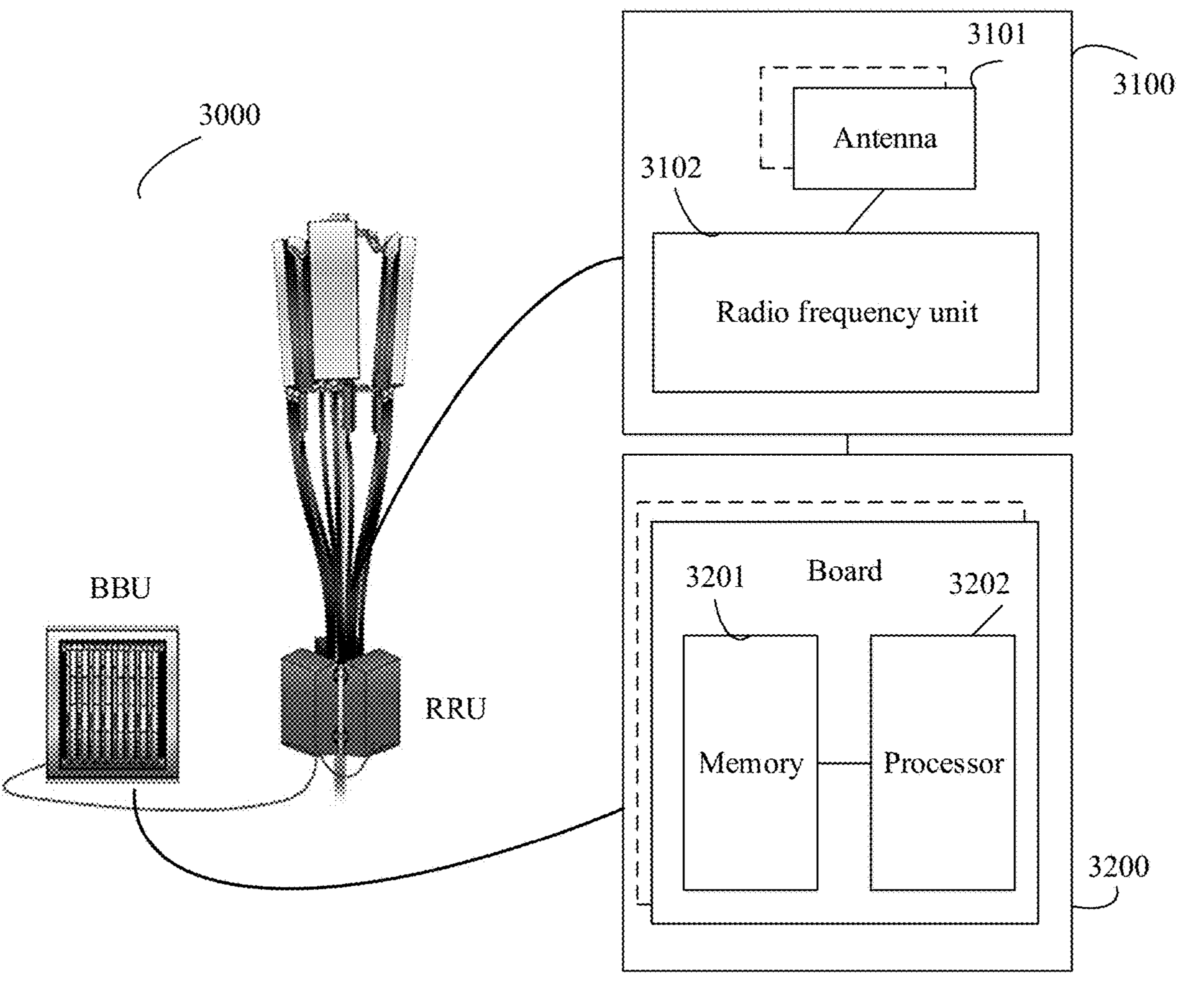
FIG. 14 is a schematic structural diagram of a second radio access network device according to an embodiment of this application.

It should be further understood that when the communication apparatus 1000 is a second access network device, the transceiver module 1100 in the communication apparatus 1000 may correspond to a transceiver 3200 in a network device 3000 shown in FIG. 14. The processing module 1200 in the communication apparatus 1000 may correspond to a processor 3100 in the network device 3000 shown in FIG. 14.

It should be further understood that when the communication apparatus 1000 is a chip configured in a second access network device, the transceiver module 1100 in the communication apparatus 1000 may be an input/output interface.

FIG. 13 is a schematic structural diagram of a terminal device 2000 according to embodiments of this application. The terminal device 2000 may be used in the system shown in FIG. 1, to perform the functions of the terminal device in the foregoing method embodiment. As shown in FIG. 13, the terminal device 2000 includes a processor 2010 and a transceiver 2020. Optionally, the terminal device 2000 further includes a memory 2030, where the processor 2010, the transceiver 2002, and the memory 2030 may communicate with each other with an internal connection path, to transmit a control signal or a data signal. The memory 2030 is configured to store a computer program. The processor 2010 is configured to call and run the computer program from the memory 2030, to control the transceiver 2020 to send and receive a signal. Optionally, the terminal device 2000 may further include an antenna 2040, configured to send, with a radio signal, uplink data or uplink control signaling that is output by the transceiver 2020.

The processor 2010 and the memory 2030 may form a processing apparatus, and the processor 2010 is configured to execute program code stored in the memory 2030 to implement the foregoing function. During specific implementation, the memory 2030 may alternatively be integrated into the processor 2010, or may be independent of the processor 2010. The processor 2010 may correspond to the processing module in FIG. 12.

The transceiver 2020 may correspond to the communication unit in FIG. 12, or may be referred to as a transceiver module. The transceiver 2020 may include a receiver (or referred to as a receiver machine or a receiving circuit) and a transmitter (or referred to as a transmitter machine or a transmitting circuit), where the receiver is configured to receive a signal, and the transmitter is configured to transmit a signal.

It should be understood that the terminal device 2000 shown in FIG. 13 can implement processes related to the terminal device in any one of the method embodiments shown in FIG. 4 to FIG. 11. Operations or functions of the modules in the terminal device 2000 are separately used to implement corresponding procedures in the foregoing method embodiment. For details, refer to descriptions in the foregoing method embodiment. To avoid repetition, detailed descriptions are appropriately omitted herein.

The foregoing processor 2010 may be configured to perform an action that is implemented inside the terminal device and that is described in the foregoing method embodiment. The transceiver 2020 may be configured to perform a sending action to a network device or a receiving action from a network device by the terminal device that is described in the foregoing method embodiment. For details, refer to the description in the foregoing method embodiment, and details are not described herein again.

Optionally, the foregoing terminal device 2000 may further include a power supply 2050, configured to supply power to various components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 14 is a schematic structural diagram of a second radio access network device according to embodiments of this application. For example, FIG. 14 may be a schematic structural diagram of a base station. The base station 3000 may be used in the system shown in FIG. 1, to perform the functions of the network device in the foregoing method embodiment. As shown in the figure, the base station 3000 may include one or more radio frequency units, such as a remote radio unit (RRU) 3100 and one or more baseband units (BBU) (also referred to as a distributed unit (DU)) 3200. The RRU 3100 may be referred to as a transceiver module or a communication unit, and is corresponding to the transceiver module 1100 in FIG. 7. Optionally, the BBU 3100 may also be referred to as a transceiver machine, a transceiver circuit, a transceiver, or the like, and may include at least one antenna 3101 and a radio frequency unit 3102. Optionally, the BBU 3100 may include a receiving unit and a sending unit. The receiving unit may correspond to a receiver (or referred to as a receiver machine or a receiving circuit), and the sending unit may correspond to a transmitter (or referred to as a transmitter machine or a transmitting circuit). The RRU 3100 is mainly configured to send and receive a radio frequency signal and convert a radio frequency signal and a baseband signal. The BBU 3200 is mainly configured to perform baseband processing, control a base station, and so on. The RRU 3100 and the BBU 3200 may be physically disposed together, or may be physically disposed separately, that is, a distributed base station.

The BBU 3200 is a control center of the base station, and may also be referred to as a processing module. It may correspond to the processing module 1200 in FIG. 12, and is mainly configured to implement a baseband processing function such as channel coding, multiplexing, modulation, or spreading. For example, the BBU (processing module) may be configured to control the base station to perform an operation procedure of the network device in the foregoing method embodiment.

In an example, the BBU 3200 may be formed by one or more boards. The plurality of boards may jointly support a radio access network (such as an LTE network) of a single access standard, or may separately support radio access networks of different access standards (such as LTE, 5G, or another network). The BBU 3200 further includes a memory 3201 and a processor 3202. The memory 3201 is configured to store necessary instructions and data. The processor 3202 is configured to control the base station to perform a necessary action, for example, configured to control the base station to perform an operation procedure of the network device, the first network device, or the second network device in the foregoing method embodiment. The memory 3201 and the processor 3202 may serve one or more boards. That is, a memory and a processor may be separately disposed on each board. Alternatively, a plurality of boards may share a same memory and a same processor. In addition, necessary circuits may be disposed on each board.

It should be understood that the base station 3000 shown in FIG. 14 can implement processes related to a second access network device in the foregoing method embodiment. Operations or functions of the modules in the base station 3000 are separately used to implement corresponding procedures in the foregoing method embodiment. For details, refer to descriptions in the foregoing method embodiment. To avoid repetition, detailed descriptions are appropriately omitted herein.

The foregoing BBU 3200 may be configured to perform an action that is implemented inside the device of the second access network device and that is described in the foregoing method embodiment, and the RRU 3100 may be configured to perform a sending action to a terminal device or a receiving action from a terminal device by a second access network device that is described in the foregoing method embodiment. For details, refer to the description in the foregoing method embodiment, and details are not described herein again.

According to the method provided in embodiments of this application, this application further provides a computer program product. The computer program product includes: computer program code. When the computer program code is run on a computer, the computer is enabled to perform the method on the terminal device side in any one of the foregoing method embodiments.

According to the method provided in embodiments of this application, this application further provides a computer-readable medium. The computer readable medium stores program code. When the program code is run on a computer, the computer is enabled to perform the method on the second access network device side in the foregoing method embodiment.

According to the method provided in embodiments of this application, this application further provides a system, including one or more foregoing terminal devices and at least one of one or more access network devices.

Embodiments of this application further provide a processing apparatus, including a processor and an interface. The processor is configured to perform the communication method in any of the foregoing method embodiments.

It should be understood that the foregoing processing apparatus may be a chip. For example, the processing apparatus may be a field programmable gate array (FPGA), or may be a general-purpose processor, a digital signal processor (DSP), an application-specific integrated circuit ASIC), a field programmable gate array (FPGA) or another programmable logic device, a discrete gate or transistor logic device, a discrete hardware component, may be a system on chip (SoC), may be a central processor unit (CPU), may be a network processor (NP), may be a digital signal processor (DSP), may be a micro controller unit (MCU), and may be a programmable logic device (PLD) or another integrated chip. It may implement or perform the methods, the steps, and logical block diagrams that are disclosed in embodiments of this application. The general purpose processor may be a microprocessor, or the processor may be any conventional processor or the like. The steps of the methods disclosed with reference to embodiments of this application may be directly performed by a hardware decoding processor, or may be performed with a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example but not limitation, many forms of RAMs are available, such as a static RAM (static RAM, SRAM), a dynamic RAM (dynamic RAM, DRAM), a synchronous DRAM (synchronous DRAM, SDRAM), a double data rate SDRAM (double data rate SDRAM, DDR SDRAM), an enhanced SDRAM (enhanced SDRAM, ESDRAM), a synchlink DRAM (synchlink DRAM, SLDRAM), and a direct rambus RAM (direct rambus RAM, DR RAM). It should be noted that the memories of the system and the method described herein are intended to include, but are not limited to, these and any other suitable types of memories.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

The network devices in the foregoing apparatus embodiments are completely corresponding to the terminal devices and the network devices or the terminal devices in the method embodiments, and corresponding modules or units perform corresponding steps. For example, a communication unit (transceiver) performs receiving or sending steps in the method embodiments. Other steps other than sending and receiving may be performed by a processing module (processor). For the functions of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, a thread of execution, a program, or a computer. As shown in figures, both a computing device and an application that runs on a computing device may be components. One or more components may reside within a process or an execution thread, and a component may be located on one computer or distributed between two or more computers. In addition, these components may be executed from various computer-readable media that store various data structures. For example, the components may communicate with a local or remote process and based on, for example, a signal having one or more data packets (for example, data from two components interacting with another component in a local system, a distributed system or across a network such as the internet interacting with other systems with the signal).

It should be understood that the "embodiment" mentioned in the specification means that specific features, structures, or characteristics related to the embodiment is included in at least one embodiment of this application. Therefore, embodiments in the specification may not necessarily refer to a same embodiment. In addition, these particular features, structures, or characteristics may be combined in one or more embodiments in any appropriate manner.

It should be understood that in embodiments of this application, numbers such as "first" and "second" are merely used to distinguish between different objects, for example, to distinguish between different network devices, and constitute no limitation on the scope of embodiments of this application. Embodiments of this application are not limited thereto.

It should be further understood that in this application, "when", "provided that", and "if" all mean that a network element performs corresponding processing in an objective case, and are not intended to limit a time, and do not require a determining action during implementation by a network element, and do not imply that there is any other limitation.

It should be further understood that, in embodiments of this application, "B corresponding to A" indicates that B is associated with A, and B may be determined based on A. However, it should further be understood that determining B according to A does not mean that B is determined according to A only; that is, B may also be determined according to A and/or other information.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In this application, the expression similar to "the project includes one or more of the following: A, B, and C", unless otherwise specified, usually means that the item can be any of the following: A; B; C; A and B; A and C; B and C; A, B and C; A and A; A, A, and A; A, A, and B; A, A, and C, A, B, and B; A, C, and C; B and B; B, B, and B; B, B, and C; C and C; C, C, and C, and other combinations of A, B and C. The above uses three elements A, B, and C as an example to illustrate the optional items of the project. When expressed as "the project includes at least one of the following: A, B, . . . , and X", that is, when there are more elements in the expression, the items applicable to the project can also be obtained according to the foregoing rule.

It may be understood that in embodiments of this application, a terminal device and/or a network device may perform some or all of the steps in embodiments of this application. These steps or operations are merely examples. In embodiments of this application, other operations or variations of various operations may be further performed.

In addition, the steps may be performed in different sequences presented in embodiments of this application, and it is possible that not all operations in embodiments of this application need to be performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented with some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing module, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A quality of experience measurement method, comprising:

receiving, by a radio access network device, second information from a terminal device, wherein the second information comprises second related information of application layer measurement corresponding to a first user identity or a second user identity;

determining, by the radio access network device based on the second information, third related information of the application layer measurement corresponding to the first user identity or the second user identity; and sending, by the radio access network device, third information to a core network device, wherein the third information indicates fourth related information of the application layer measurement corresponding to the first user identity or the second user identity, and the second user identity corresponds to the core network device, wherein the terminal device is connected to the radio access network device with the second user identity.

2. The method according to claim 1, wherein the second related information comprises information configuring application layer measurement by the terminal device, or information prohibiting the terminal device from configuring application layer measurement with the second user identity; and the fourth related information comprises information configuring application layer measurement by the terminal device with the first user identity, or information prohibiting the terminal device from configuring application layer measurement with the second user identity.

3. The method according to claim 1, wherein the second related information comprises information configuring, by the terminal device with the first user identity, application layer measurement corresponding to a first service type; or the second related information comprises information prohibiting the terminal device from configuring, with the second user identity, application layer measurement corresponding to the first service type, or information allowing the terminal device to configure, with the second user identity, application layer measurement corresponding to a second service type;

and the fourth related information comprises information allowing the terminal device to configure, with the first user identity, the application layer measurement corresponding to the first service type; or the fourth related information comprises information prohibiting the terminal device from configuring, with the second user identity, application layer measurement corresponding to the first service type, or information allowing the terminal device to configure, with the second user identity, application layer measurement corresponding to a second service type, wherein the second service type is a service type other than the first service type.

4. The method according to claim 1, wherein the second related information comprises information allowing the terminal device to configure, with the first user identity, application layer measurement corresponding to a first service type; or the second related information comprises information prohibiting the terminal device from configuring, with the second user identity, application layer measurement corresponding to the first service type, or information allowing the terminal device to configure, with the second user identity, application layer measurement corresponding to a second service type;

and the fourth related information comprises information allowing the terminal device to configure, with the first user identity, application layer measurement corresponding to a first service type; or the fourth related information comprises information prohibiting the terminal device from configuring, with the second user identity, application layer measurement corresponding to the first service type, or information allowing the terminal device to configure, with the second user identity, application layer measurement corresponding to a second service type, wherein the second service type is a service type other than the first service type.

5. The method according to claim 1, wherein the method further comprises:

receiving, by the radio access network device, fourth information from a core network device; and sending, by the radio access network device, a rejection message to the core network device, wherein the core network device corresponds to the second user identity.

6. The method according to claim 5, wherein the determining, by the radio access network device based on the second information, third related information of the application layer measurement corresponding to the first user identity or the second user identity comprises:

determining, by the radio access network device based on the second information, to prohibit the terminal device from configuring application layer measurement corresponding to the second user identity, wherein the fourth information indicates that the radio access network device configures, for the terminal device, the application layer measurement corresponding to the second user identity.

7. The method according to claim 5, wherein the determining, by the radio access network device based on the second information, third related information of the application layer measurement corresponding to the first user identity or the second user identity comprises:

determining, by the radio access network device based on the second information, to prohibit the terminal device from configuring, with the second user identity, application layer measurement corresponding to a first service type, or to allow the terminal device to configure, with the second user identity, application layer measurement corresponding to a second service type, wherein the fourth information indicates that the radio access network device configures, for the terminal device, the application layer measurement corresponding to the first service type; and the second service type is a service type other than the first service type.

8. A communication apparatus applied in a second radio access network device, wherein the communication n apparatus comprises:

at least one processor; and one or more memories including computer instructions that, when executed by the at least one processor, cause the communication apparatus to perform operations comprising:

receiving second information from a terminal device, wherein the second information comprises second related information of application layer measurement corresponding to a first user identity or a second user identity;

determining based on the second information, third related information of the application layer measurement corresponding to the first user identity or the second user identity; and sending third information to a core network device, wherein the third information indicates fourth related information of the application layer measurement corresponding to the first user identity or the second user identity, and the core network device corresponds to the second user identity, wherein the terminal device is connected to the second radio access network device with the second user identity.

9. The communication apparat us according to claim 8, wherein the second related information comprises information configuring application layer measurement by the terminal device, or prohibiting the terminal device from configuring application layer measurement with the second user identity; and the fourth related information comprises information configuring application layer measurement by the terminal device with the first user identity, or prohibiting the terminal device from configuring application layer measurement with the second user identity.

10. The communication apparatus according to claim 8, wherein the second related information comprises information configuring, by the terminal device with the first user identity, application layer measurement corresponding to a first service type; or the second related information comprises information prohibiting the terminal device from configuring, with the second user identity, application layer measurement corresponding to the first service type, or information allowing the terminal device to configure, with the second user identity, application layer measurement corresponding to a second service type;

and the fourth related information comprises information allowing the terminal device to configure, with the first user identity, the application layer measurement corresponding to the first service type; or the fourth related information comprises information prohibiting the terminal device from configuring, with the second user identity, application layer measurement corresponding to the first service type, or allowing the terminal device to configure, with the second user identity, application layer measurement corresponding to a second service type, wherein the second service type is a service type other than the first service type.

11. The communication apparatus according to claim 8, wherein the second related information comprises information allowing the terminal device to configure, with the first user identity, application layer measurement corresponding to a first service type; or the second related information comprises information prohibiting the terminal device from configuring, with the second user identity, application layer measurement corresponding to the first service type, or information allowing the terminal device to configure, with the second user identity, application layer measurement corresponding to a second service type;

and the fourth related information comprises information allowing the terminal device to configure, with the first user identity, application layer measurement corresponding to a first service type; or the fourth related information comprises information prohibiting the terminal device from configuring, with the second user identity, application layer measurement corresponding to the first service type, or information allowing the terminal device to configure, with the second user identity, application layer measurement corresponding to a second service type, wherein the second service type is a service type other than the first service type.

12. The communication apparatus according to claim 8, wherein the operations further comprise:

receiving fourth information from a core network device; and sending a rejection message to the core network device, wherein the core network device corresponds to the second user identity.

13. The communication apparatus according to claim 12, wherein the determining based on the second information, third related information of the application layer measurement corresponding to the first user identity or the second user identity comprises:

determining based on the second information, to prohibit the terminal device from configuring application layer measurement corresponding to the second user identity, wherein the fourth information indicates that the second radio access network device configures, for the terminal device, the application layer measurement corresponding to the second user identity.

14. The communication apparatus according to claim 12, wherein the determining based on the second information, third related information of the application layer measurement corresponding to the first user identity or the second user identity comprises:

determining based on the second information, to prohibit the terminal device from configuring, with the second user identity, application layer measurement corresponding to a first service type, or to allow the terminal device to configure, with the second user identity, application layer measurement corresponding to a second service type, wherein the fourth information indicates that the second radio access network device configures, for the terminal device, the application layer measurement corresponding to the first service type; and the second service type is a service type other than the first service type.

* * * * *